US012561661B2

(12) United States Patent
Gotlieb et al.

(10) Patent No.: US 12,561,661 B2
(45) Date of Patent: Feb. 24, 2026

(54) SYSTEMS AND METHODS FOR COMPLETING A REMOTE LOTTERY TICKET SALES TRANSACTION VIA RECEIVING PAYMENT AT A POINT OF SALE

(71) Applicant: Blackhawk Network, Inc., Pleasanton, CA (US)

(72) Inventors: Richard A. Gotlieb, Alamo, CA (US); Prashant Nedungadi, San Jose, CA (US); Vipin Das Anantha Mohandas, Pleasanton, CA (US); Ryan Koop, Dover Centre (CA); Gino Giunti, Sault Ste. Marie (CA); Melissa Murillo, Tracy, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 235 days.

(21) Appl. No.: 18/271,375

(22) PCT Filed: Jan. 21, 2022

(86) PCT No.: PCT/US2022/013287
§ 371 (c)(1),
(2) Date: Jul. 7, 2023

(87) PCT Pub. No.: WO2022/159682
PCT Pub. Date: Jul. 28, 2022

(65) Prior Publication Data
US 2024/0062179 A1      Feb. 22, 2024

Related U.S. Application Data

(60) Provisional application No. 63/140,233, filed on Jan. 21, 2021.

(51) Int. Cl.
*G06Q 20/20* (2012.01)
*G06Q 20/40* (2012.01)
(Continued)

(52) U.S. Cl.
CPC ............. *G06Q 20/20* (2013.01); *G06Q 20/40* (2013.01); *G06Q 50/34* (2013.01); *G07F 17/3225* (2013.01); *G07F 17/329* (2013.01)

(58) Field of Classification Search
CPC ........ G06Q 20/20; G06Q 20/40; G06Q 50/34; G06Q 30/06; G07F 17/3225; G07F 17/329; G07F 17/326
See application file for complete search history.

(56) References Cited

U.S. PATENT DOCUMENTS 6,267,670 B1 * 7/2001 Walker ..................... G07G 5/00
902/23
9,779,397 B2 * 10/2017 Warner .................. G06Q 50/34
(Continued)

FOREIGN PATENT DOCUMENTS

KR     1020190018292 A     2/2019
WO     WO-2019217915 A1 * 11/2019   ......... G06Q 30/0241

OTHER PUBLICATIONS

Korean Patent Office, International Search Report issued in PCT/US2022/013287, May 19, 2022, 8 pages.
(Continued)

*Primary Examiner* — Michael Jared Walker
(74) *Attorney, Agent, or Firm* — Barnes & Thornburg LLP; Jerry C. Harris, Jr.

(57) ABSTRACT

Systems and methods for completing a transaction request via receiving payment at a point of sale comprising: a lottery ticket provider, wherein the lottery ticket provider is remote from an originating location of the transaction request and wherein the lottery ticket provider comprises: a processing
(Continued)

device; a user device; a fulfilment computer device; a lottery ticket; and a lottery ticket approved sales location database.

14 Claims, 50 Drawing Sheets

(51) Int. Cl.
*G06Q 50/34* (2012.01)
*G07F 17/32* (2006.01)

(56) References Cited

U.S. PATENT DOCUMENTS

| 10,769,894 | B2 * | 9/2020 | Giunti | G06Q 50/34 |
|---|---|---|---|---|
| 11,200,784 | B2 * | 12/2021 | Gotlieb | G06Q 20/202 |
| 2003/0220132 | A1 * | 11/2003 | Walker | G06Q 20/387 |
| | | | | 463/17 |
| 2008/0110980 | A1 * | 5/2008 | Hogg | G06Q 20/357 |
| | | | | 235/380 |
| 2008/0146345 | A1 * | 6/2008 | Hardy | G07F 17/3255 |
| | | | | 463/42 |
| 2009/0065573 | A1 * | 3/2009 | Potts | G07F 17/3223 |
| | | | | 235/379 |
| 2010/0222125 | A1 * | 9/2010 | Nyman | G07F 17/32 |
| | | | | 463/25 |
| 2012/0089468 | A1 * | 4/2012 | Guziel | G06Q 20/20 |
| | | | | 705/16 |
| 2013/0217462 | A1 * | 8/2013 | Cage | G07F 19/20 |
| | | | | 463/17 |
| 2014/0040137 | A1 * | 2/2014 | Carlson | G06Q 20/00 |
| | | | | 705/44 |
| 2017/0256133 | A1 * | 9/2017 | Cooper | G06Q 50/34 |
| 2020/0043278 | A1 * | 2/2020 | Gotlieb | G06Q 50/34 |

OTHER PUBLICATIONS

Korean Patent Office, Written Opinion issued in PCT/US2022/013287, May 19, 2022, 5 pages.

* cited by examiner

100

230

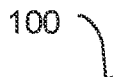

CONFIRM YOUR DRAW DATE:

VISIT:        TEXT:        CALL:
Drawdate.info    DRAWDATE TO 1234    1-234-567-8900

How it works:

Your ticket is your valid receipt and must be provided to claim winnings.

- Check your ticket to ensure the information is correct
- Sign the back of your ticket to indicate ownership
- Prizes must be claim and later than 180 days after Draw date
- Prices greater than $600 must be claimed at a Lottery office
- Must be 18 or older to purchase a Lottery ticket or claim a prize

240

201

Claimant Signature (required)
_____

Printed Name
_____

Mailing Address
_____

City       State       Zip

123-VOID456-785 (123)

TRIPLE JACKPOT

WINNING NUMBERS

$5

TEXT 1856 TO 5115478 TO RECEIVE
YOUR WINNING NUMBERS BY TEXT

YOUR NUMBERS

| 4 | 38 | 22 | 33 |
|---|---|---|---|
| $10.00 | $1000.00 | $6.00 | $10,000.00 |

| 2 | 38 | 22 | 33 |
|---|---|---|---|
| $300.00 | $200,000.00 | $2.00 | $500.00 |

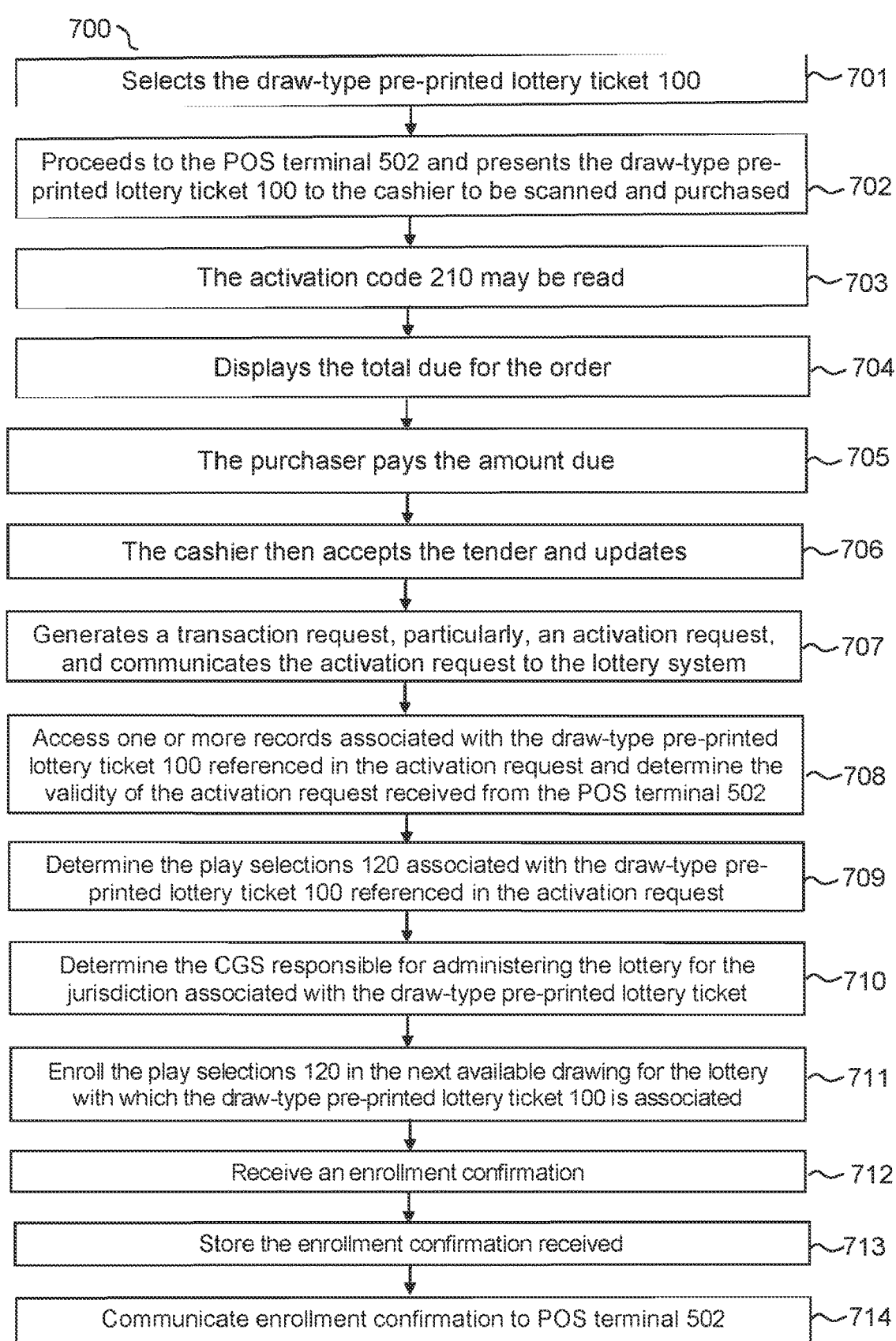

700

Selects the draw-type pre-printed lottery ticket 100 —701

Proceeds to the POS terminal 502 and presents the draw-type pre-printed lottery ticket 100 to the cashier to be scanned and purchased —702

The activation code 210 may be read —703

Displays the total due for the order —704

The purchaser pays the amount due —705

The cashier then accepts the tender and updates —706

Generates a transaction request, particularly, an activation request, and communicates the activation request to the lottery system —707

Access one or more records associated with the draw-type pre-printed lottery ticket 100 referenced in the activation request and determine the validity of the activation request received from the POS terminal 502 —708

Determine the play selections 120 associated with the draw-type pre-printed lottery ticket 100 referenced in the activation request —709

Determine the CGS responsible for administering the lottery for the jurisdiction associated with the draw-type pre-printed lottery ticket —710

Enroll the play selections 120 in the next available drawing for the lottery with which the draw-type pre-printed lottery ticket 100 is associated —711

Receive an enrollment confirmation —712

Store the enrollment confirmation received —713

Communicate enrollment confirmation to POS terminal 502 —714

Figure 7A

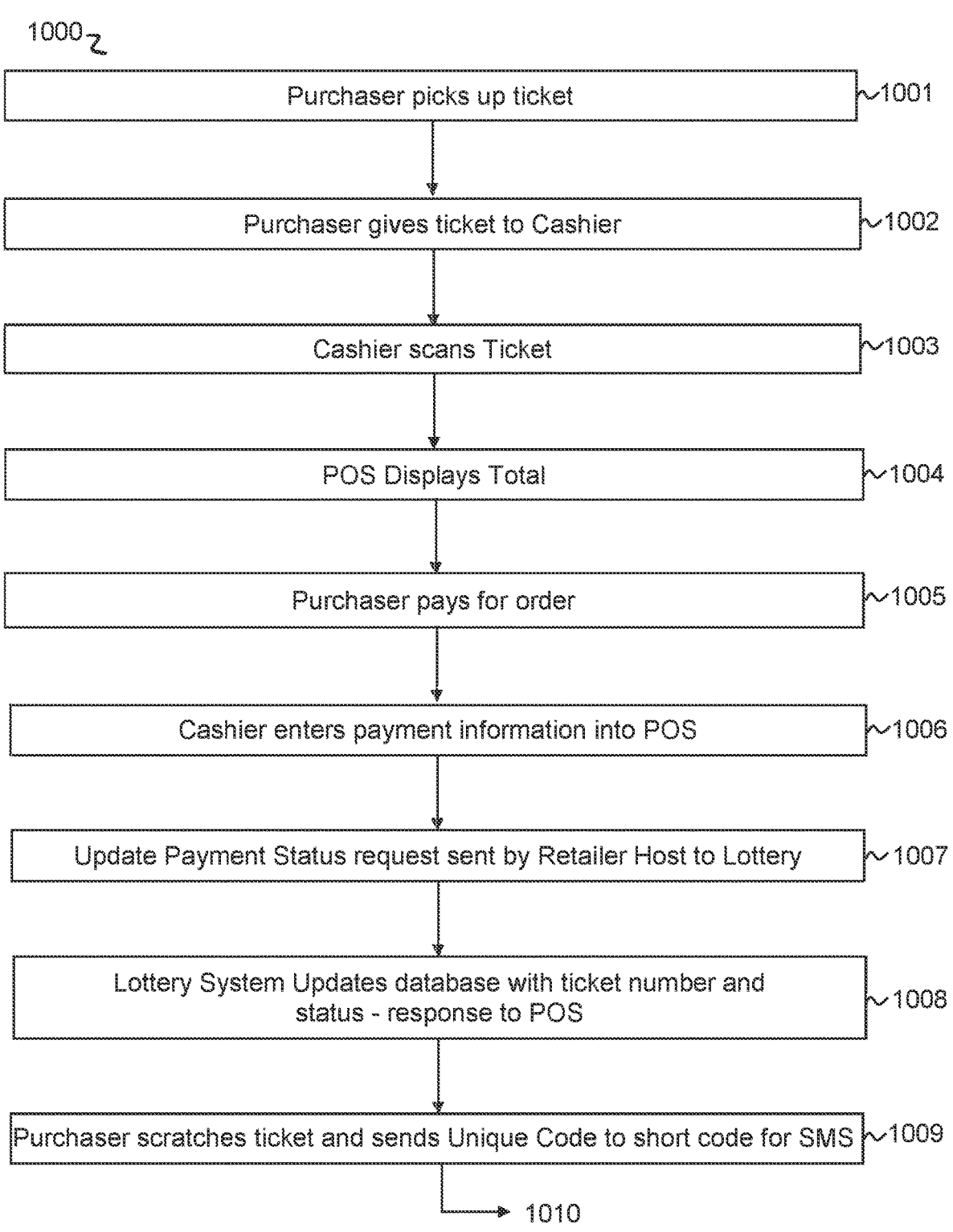

1000

| | |
|---|---|
| Purchaser picks up ticket | ~1001 |

| | |
|---|---|
| Purchaser gives ticket to Cashier | ~1002 |

| | |
|---|---|
| Cashier scans Ticket | ~1003 |

| | |
|---|---|
| POS Displays Total | ~1004 |

| | |
|---|---|
| Purchaser pays for order | ~1005 |

| | |
|---|---|
| Cashier enters payment information into POS | ~1006 |

| | |
|---|---|
| Update Payment Status request sent by Retailer Host to Lottery | ~1007 |

| | |
|---|---|
| Lottery System Updates database with ticket number and status - response to POS | ~1008 |

| | |
|---|---|
| Purchaser scratches ticket and sends Unique Code to short code for SMS | ~1009 |

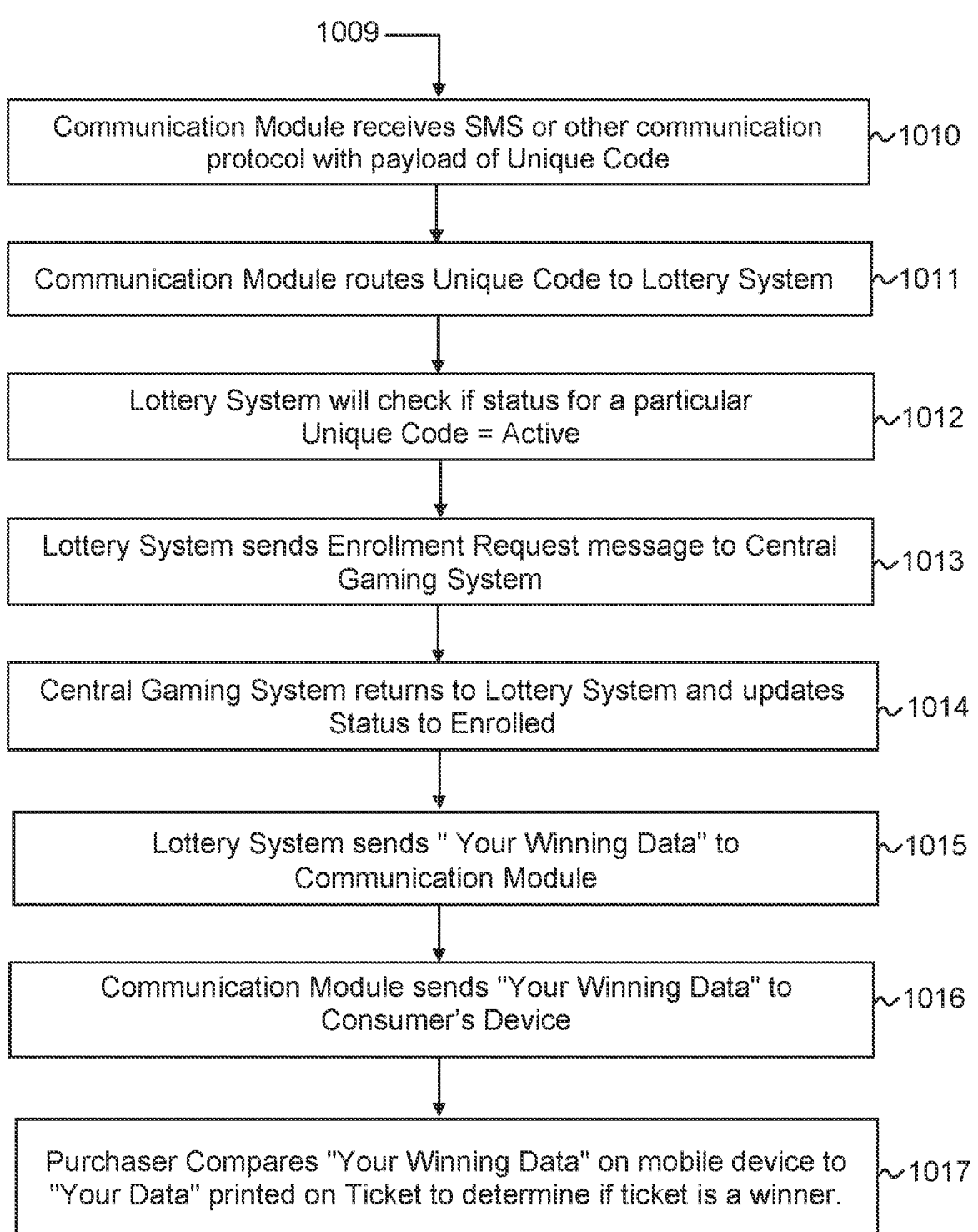

1009

| | |
|---|---|
| Communication Module receives SMS or other communication protocol with payload of Unique Code | ~1010 |
| Communication Module routes Unique Code to Lottery System | ~1011 |
| Lottery System will check if status for a particular Unique Code = Active | ~1012 |
| Lottery System sends Enrollment Request message to Central Gaming System | ~1013 |
| Central Gaming System returns to Lottery System and updates Status to Enrolled | ~1014 |
| Lottery System sends " Your Winning Data" to Communication Module | ~1015 |
| Communication Module sends "Your Winning Data" to Consumer's Device | ~1016 |
| Purchaser Compares "Your Winning Data" on mobile device to "Your Data" printed on Ticket to determine if ticket is a winner. | ~1017 |

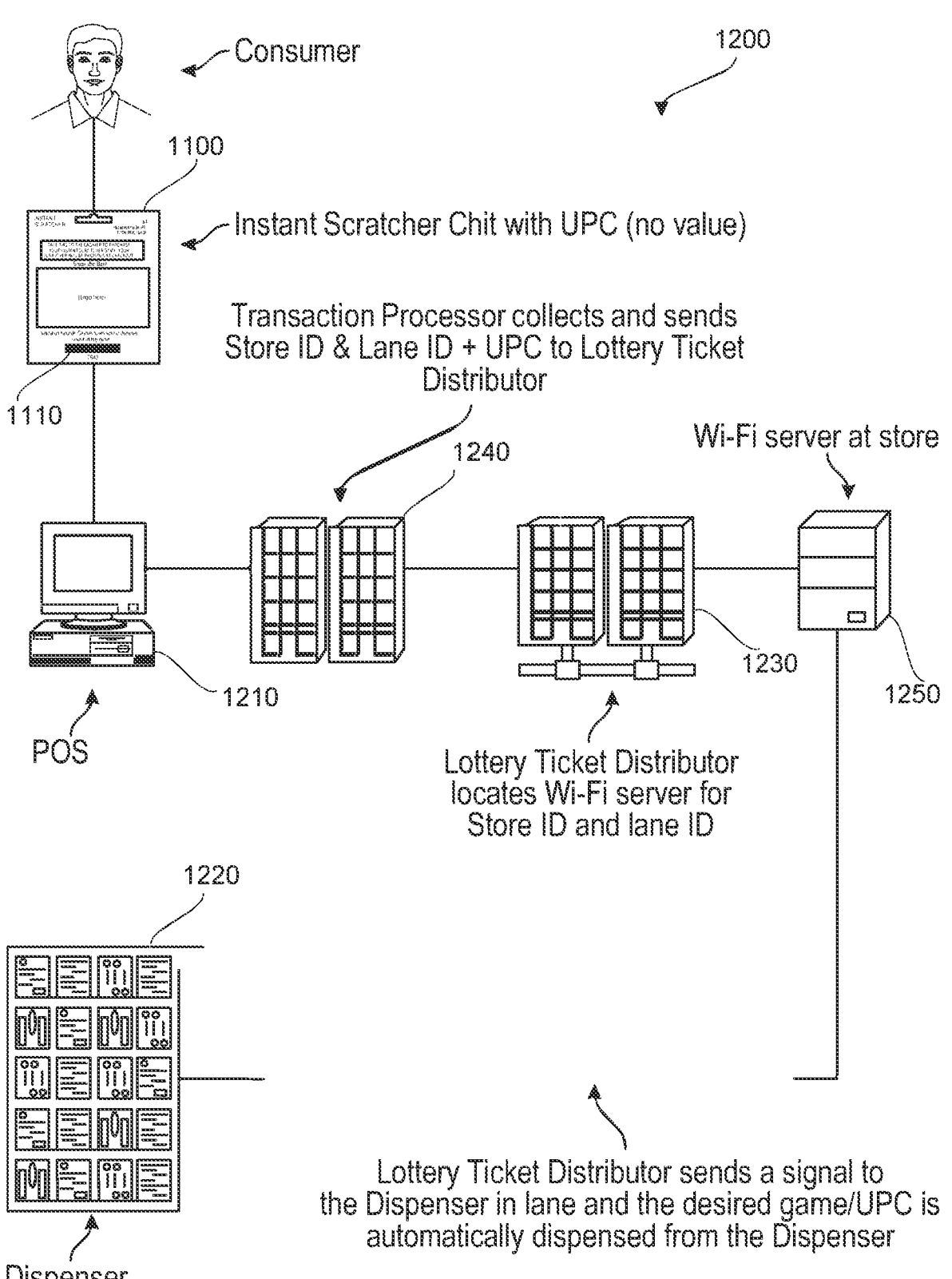

Consumer

1100

1200

Instant Scratcher Chit with UPC (no value)

Transaction Processor collects and sends
Store ID & Lane ID + UPC to Lottery Ticket
Distributor

1240

Wi-Fi server at store

1110

1210

POS

1230

1250

Lottery Ticket Distributor
locates Wi-Fi server for
Store ID and lane ID

1220

Dispenser

Lottery Ticket Distributor sends a signal to
the Dispenser in lane and the desired game/UPC is
automatically dispensed from the Dispenser

YOU CHOOSE HOW YOU PLAY:

VISIT:
MyLottery.info

TEXT:
DRAWDATE TO 1234

CALL:
1-234-567-8900

● For Game Rules and Instructions, visit: MyLottery.info

123-VOID456-785 (123)

1310

1410

1500

1603

1625

1306

1630

1635

1601

1605

1610

1800

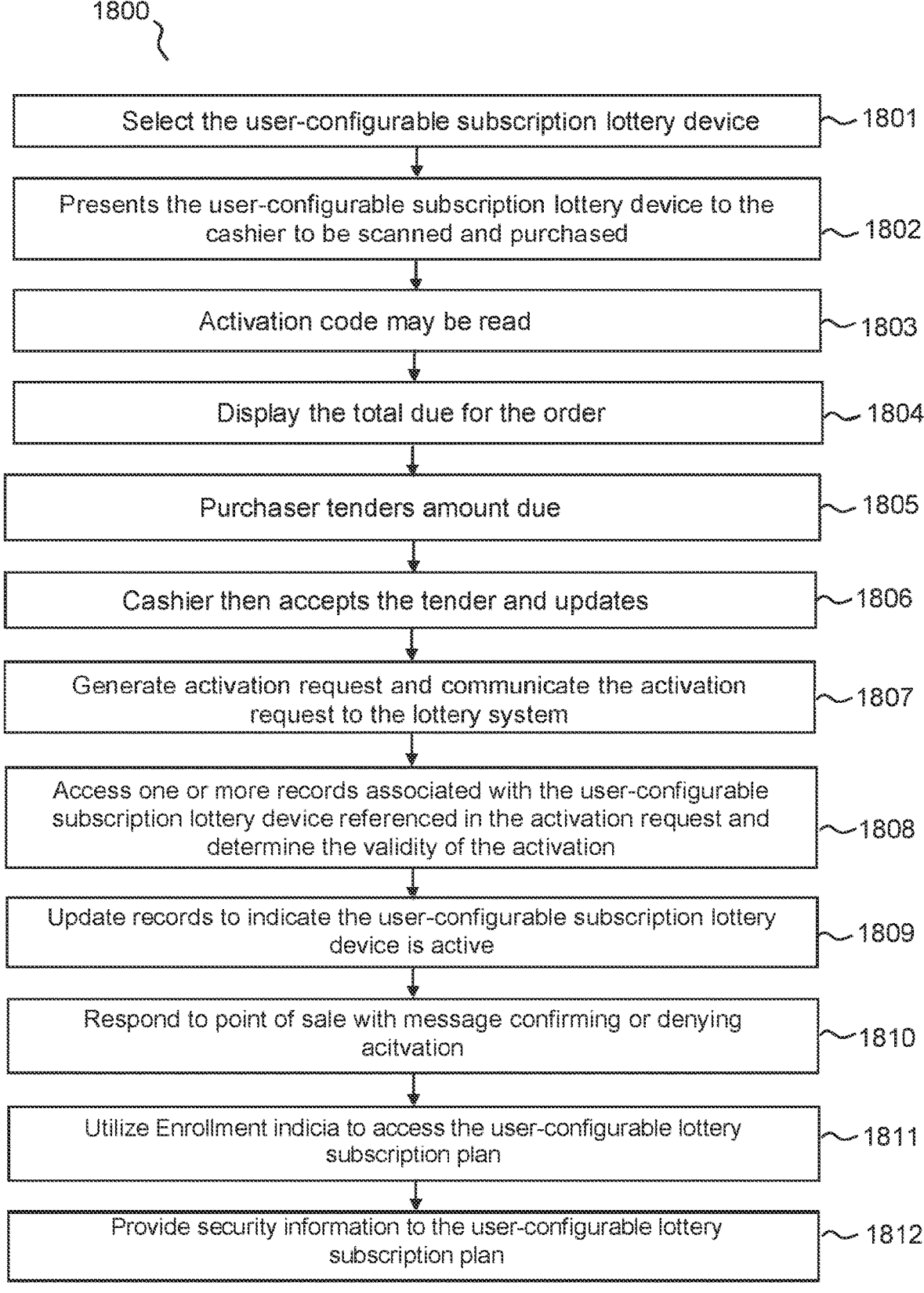

Select the user-configurable subscription lottery device ~1801

Presents the user-configurable subscription lottery device to the cashier to be scanned and purchased ~1802

Activation code may be read ~1803

Display the total due for the order ~1804

Purchaser tenders amount due ~1805

Cashier then accepts the tender and updates ~1806

Generate activation request and communicate the activation request to the lottery system ~1807

Access one or more records associated with the user-configurable subscription lottery device referenced in the activation request and determine the validity of the activation ~1808

Update records to indicate the user-configurable subscription lottery device is active ~1809

Respond to point of sale with message confirming or denying acitvation ~1810

Utilize Enrollment indicia to access the user-configurable lottery subscription plan ~1811

Provide security information to the user-configurable lottery subscription plan ~1812

Figure 18A

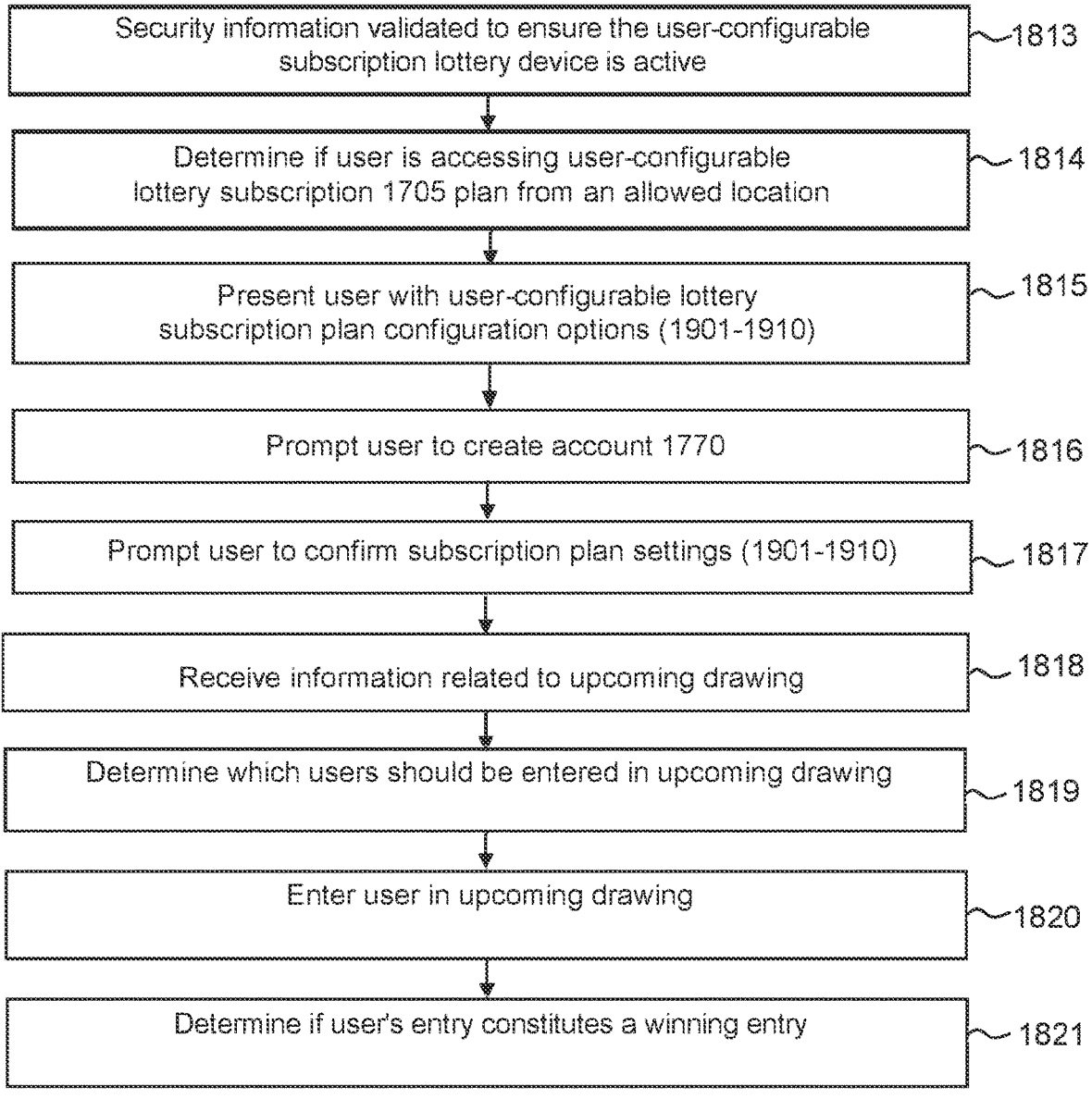

| | |
|---|---|
| Security information validated to ensure the user-configurable subscription lottery device is active | 1813 |
| Determine if user is accessing user-configurable lottery subscription 1705 plan from an allowed location | 1814 |
| Present user with user-configurable lottery subscription plan configuration options (1901-1910) | 1815 |
| Prompt user to create account 1770 | 1816 |
| Prompt user to confirm subscription plan settings (1901-1910) | 1817 |
| Receive information related to upcoming drawing | 1818 |
| Determine which users should be entered in upcoming drawing | 1819 |
| Enter user in upcoming drawing | 1820 |
| Determine if user's entry constitutes a winning entry | 1821 |

1901 — • Which lottery game(s) into which the user wishes to be entered
1902 — • Minimum Jackpot Size
1903 — • Number of Entries
1904 — • Number of Entries for Particular Jackpot Sizes
1905 — • Play Selections and/or Game Attributes
1906 — • Notification of Entry in a Drawing
1907 — • Notification of Winnings
1908 — • Notification of Drawing Results
1909 — • Optional Games
1910 — • Redemptions 2100
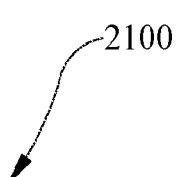
SCAN'NPLAY
DOWNLOAD LOTTERY APP TO SCAN THIS CODE
AND BEGIN YOUR MOBILE GAME EXPERIENCE.
YOU COULD WIN UP TO $1,000,000.
DOWNLOAD THE
LOTTERY APP
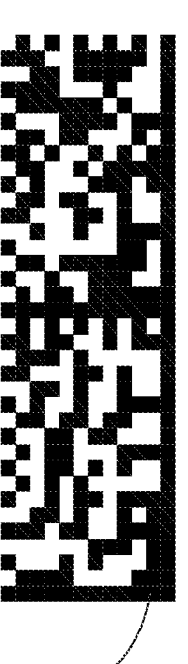
2120
Figure 21C

2200

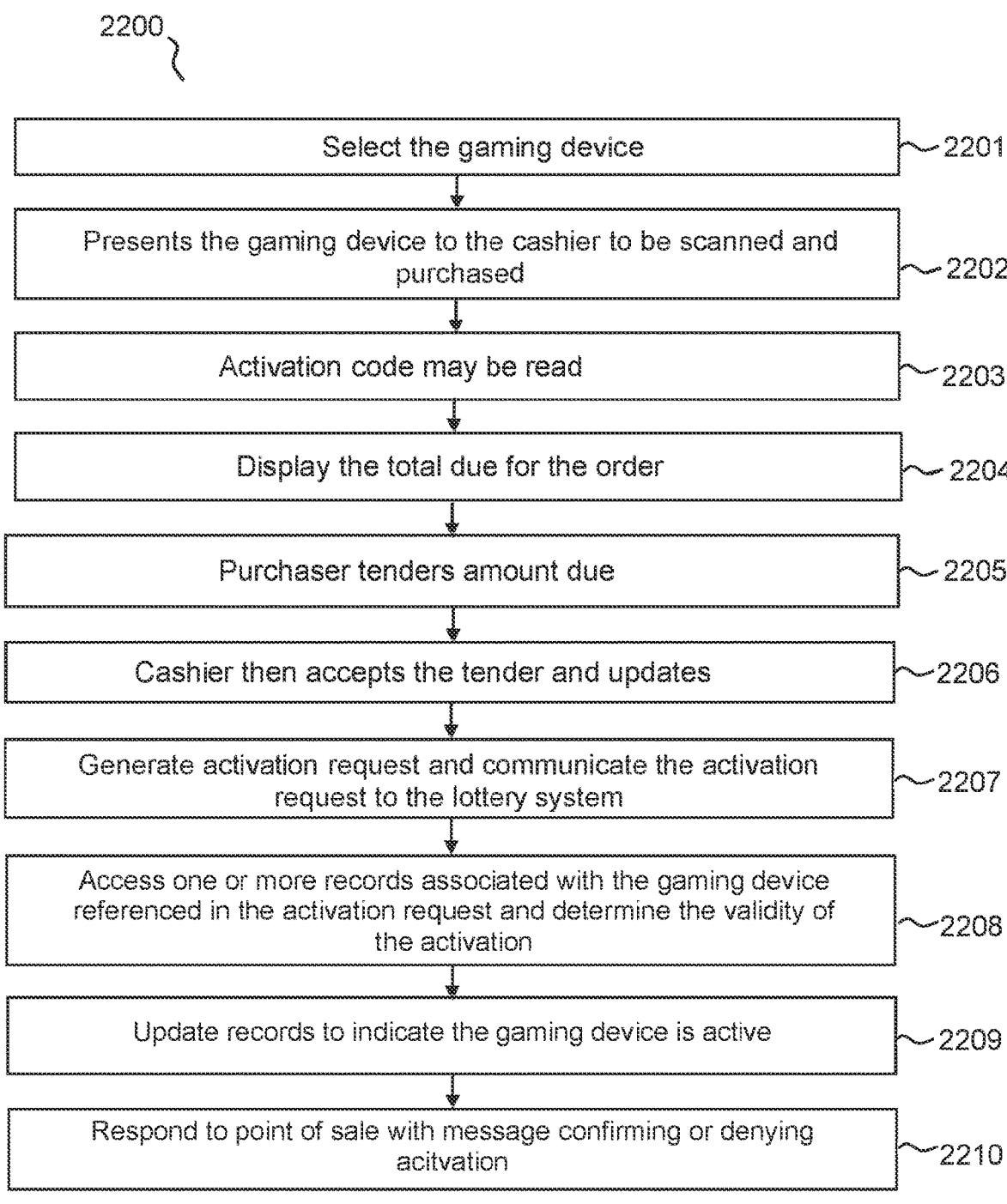

Select the gaming device ~2201

Presents the gaming device to the cashier to be scanned and purchased ~2202

Activation code may be read ~2203

Display the total due for the order ~2204

Purchaser tenders amount due ~2205

Cashier then accepts the tender and updates ~2206

Generate activation request and communicate the activation request to the lottery system ~2207

Access one or more records associated with the gaming device referenced in the activation request and determine the validity of the activation ~2208

Update records to indicate the gaming device is active ~2209

Respond to point of sale with message confirming or denying acitvation ~2210

Utilize user device to interact with user-device interface　　2251

Validate user-device interface　　2252

Purchaser accesses, loads, or funds game(s)　　2253

Purchaser plays game(s)　　2254

Purchaser redeems win rings　　2255

Figure 23:
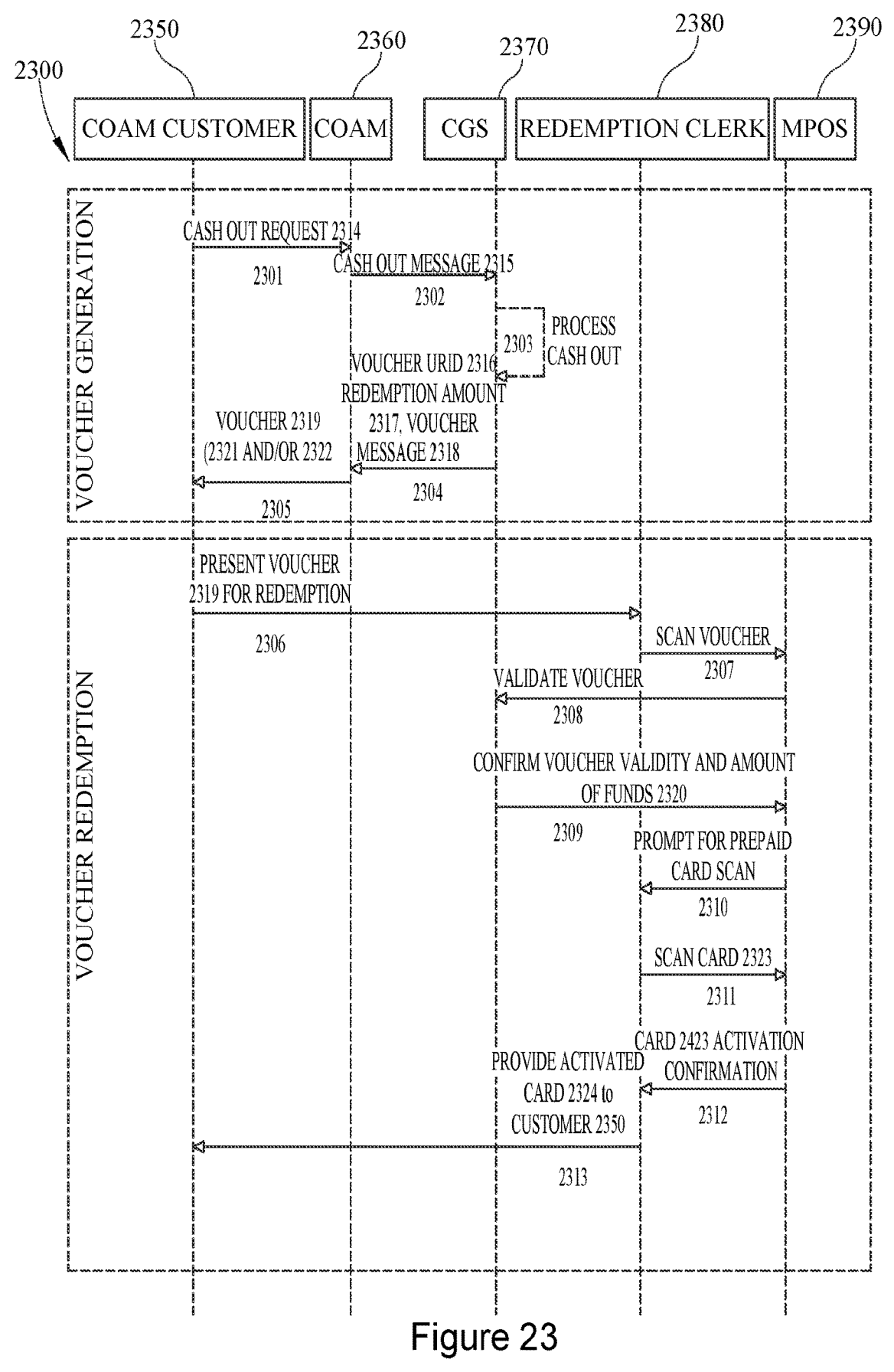

2300

2350    2360    2370    2380    2390

| COAM CUSTOMER | COAM | CGS | REDEMPTION CLERK | MPOS |

VOUCHER GENERATION

CASH OUT REQUEST 2314
2301

CASH OUT MESSAGE 2315
2302

PROCESS CASH OUT
2303

VOUCHER URID 2316
REDEMPTION AMOUNT

VOUCHER 2319    2317, VOUCHER
(2321 AND/OR 2322    MESSAGE 2318
2304

2305

VOUCHER REDEMPTION

PRESENT VOUCHER
2319 FOR REDEMPTION
2306

SCAN VOUCHER
2307

VALIDATE VOUCHER
2308

CONFIRM VOUCHER VALIDITY AND AMOUNT
OF FUNDS 2320
2309

PROMPT FOR PREPAID
CARD SCAN
2310

SCAN CARD 2323
2311

CARD 2423 ACTIVATION
PROVIDE ACTIVATED    CONFIRMATION
CARD 2324 to    2312
CUSTOMER 2350

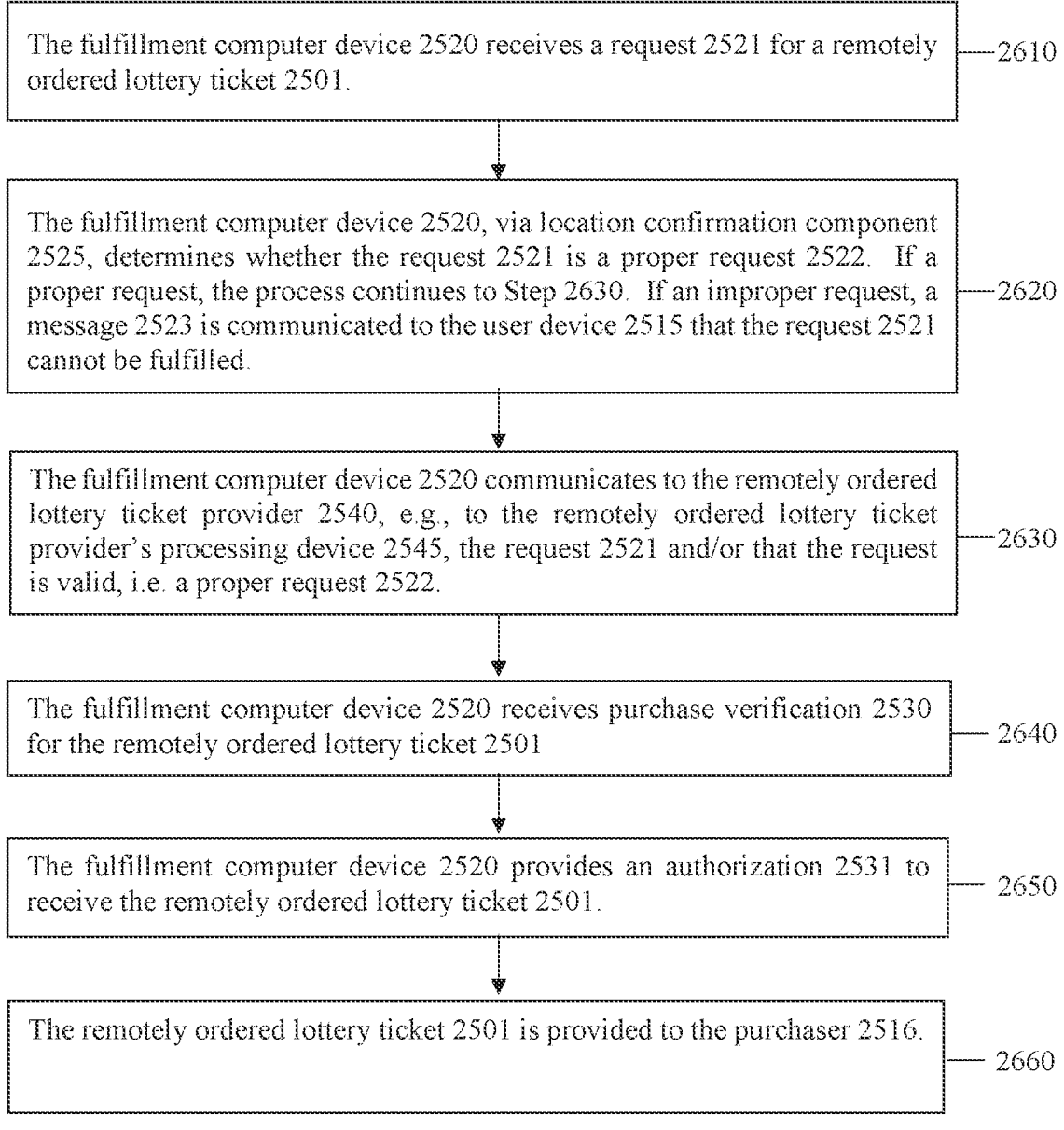

The fulfillment computer device 2520 receives a request 2521 for a remotely ordered lottery ticket 2501. —2610

The fulfillment computer device 2520, via location confirmation component 2525, determines whether the request 2521 is a proper request 2522. If a proper request, the process continues to Step 2630. If an improper request, a message 2523 is communicated to the user device 2515 that the request 2521 cannot be fulfilled. —2620

The fulfillment computer device 2520 communicates to the remotely ordered lottery ticket provider 2540, e.g., to the remotely ordered lottery ticket provider's processing device 2545, the request 2521 and/or that the request is valid, i.e. a proper request 2522. —2630

The fulfillment computer device 2520 receives purchase verification 2530 for the remotely ordered lottery ticket 2501 — 2640

The fulfillment computer device 2520 provides an authorization 2531 to receive the remotely ordered lottery ticket 2501. — 2650

The remotely ordered lottery ticket 2501 is provided to the purchaser 2516. — 2660

Figure 26

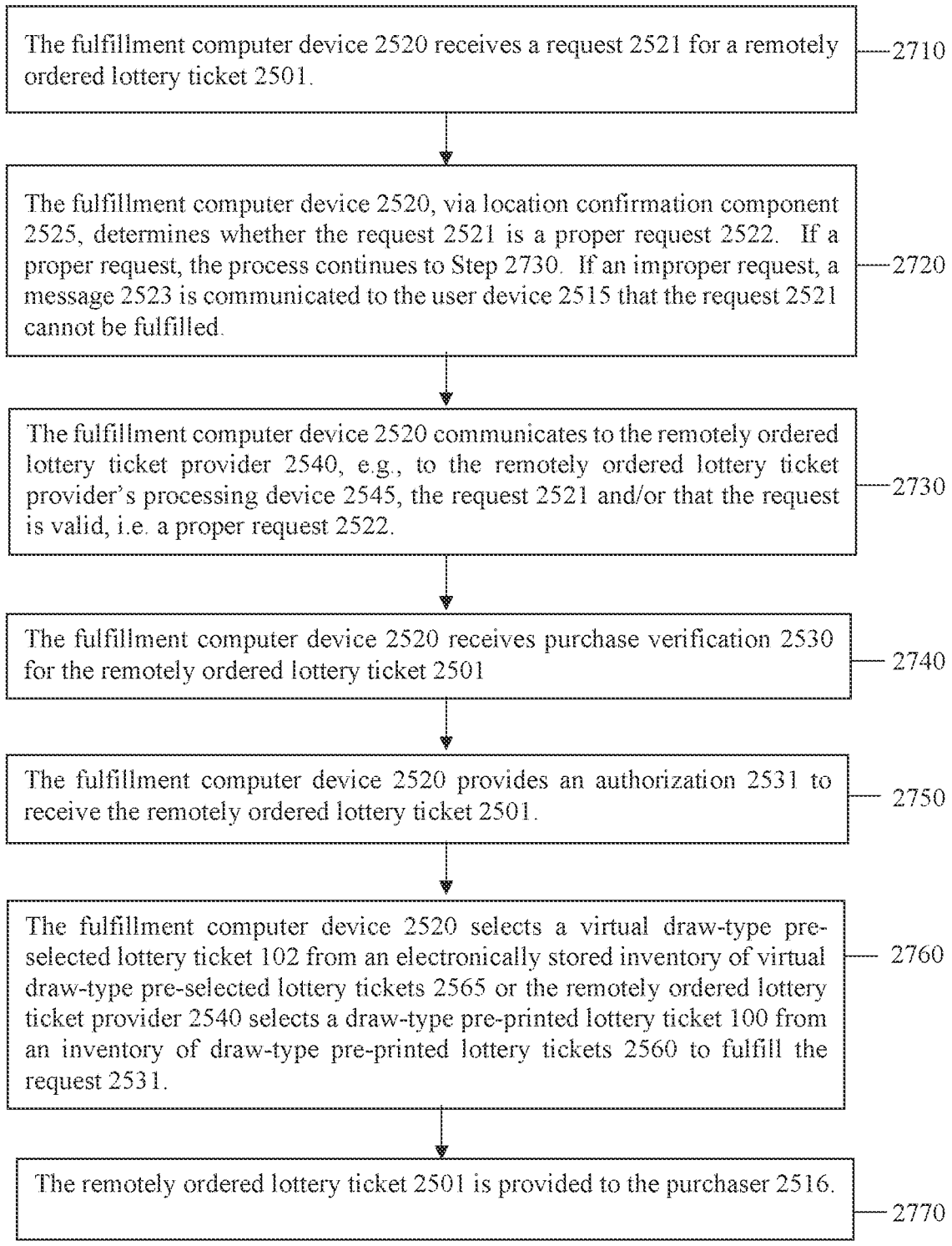

The fulfillment computer device 2520 receives a request 2521 for a remotely ordered lottery ticket 2501. ——2710

The fulfillment computer device 2520, via location confirmation component 2525, determines whether the request 2521 is a proper request 2522. If a proper request, the process continues to Step 2730. If an improper request, a message 2523 is communicated to the user device 2515 that the request 2521 cannot be fulfilled. ——2720

The fulfillment computer device 2520 communicates to the remotely ordered lottery ticket provider 2540, e.g., to the remotely ordered lottery ticket provider's processing device 2545, the request 2521 and/or that the request is valid, i.e. a proper request 2522. ——2730

The fulfillment computer device 2520 receives purchase verification 2530 for the remotely ordered lottery ticket 2501 ——2740

The fulfillment computer device 2520 provides an authorization 2531 to receive the remotely ordered lottery ticket 2501. ——2750

The fulfillment computer device 2520 selects a virtual draw-type pre-selected lottery ticket 102 from an electronically stored inventory of virtual draw-type pre-selected lottery tickets 2565 or the remotely ordered lottery ticket provider 2540 selects a draw-type pre-printed lottery ticket 100 from an inventory of draw-type pre-printed lottery tickets 2560 to fulfill the request 2531. ——2760

The remotely ordered lottery ticket 2501 is provided to the purchaser 2516. ——2770

Figure 27

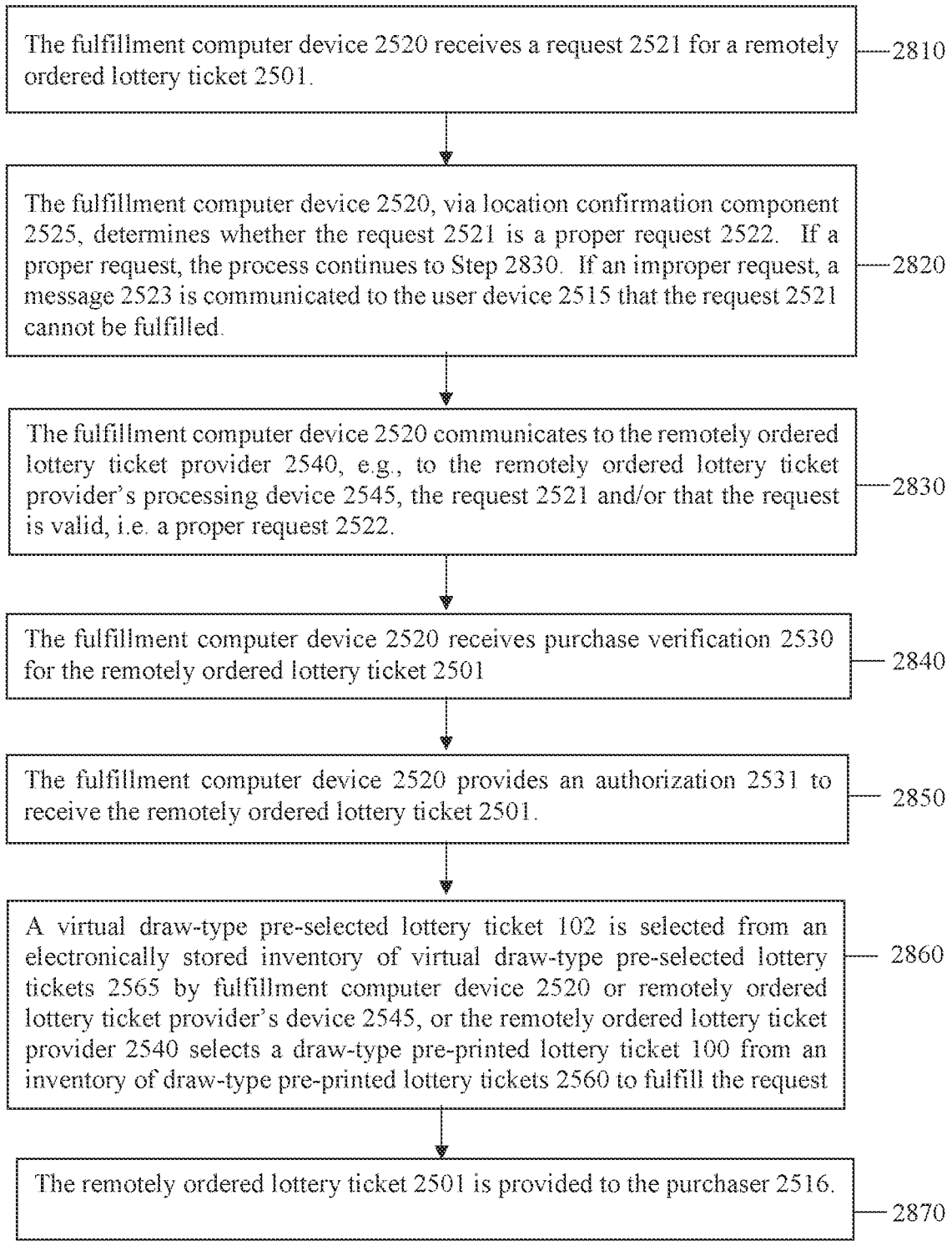

The fulfillment computer device 2520 receives a request 2521 for a remotely ordered lottery ticket 2501.                                                                    —2810

The fulfillment computer device 2520, via location confirmation component 2525, determines whether the request 2521 is a proper request 2522. If a proper request, the process continues to Step 2830. If an improper request, a message 2523 is communicated to the user device 2515 that the request 2521 cannot be fulfilled.                                                                    —2820

The fulfillment computer device 2520 communicates to the remotely ordered lottery ticket provider 2540, e.g., to the remotely ordered lottery ticket provider's processing device 2545, the request 2521 and/or that the request is valid, i.e. a proper request 2522.                                         —2830

The fulfillment computer device 2520 receives purchase verification 2530 for the remotely ordered lottery ticket 2501                                                    — 2840

The fulfillment computer device 2520 provides an authorization 2531 to receive the remotely ordered lottery ticket 2501.                                                    — 2850

A virtual draw-type pre-selected lottery ticket 102 is selected from an electronically stored inventory of virtual draw-type pre-selected lottery tickets 2565 by fulfillment computer device 2520 or remotely ordered lottery ticket provider's device 2545, or the remotely ordered lottery ticket provider 2540 selects a draw-type pre-printed lottery ticket 100 from an inventory of draw-type pre-printed lottery tickets 2560 to fulfill the request                                                    — 2860

The remotely ordered lottery ticket 2501 is provided to the purchaser 2516.                                                    — 2870

Figure 28

SYSTEMS AND METHODS FOR COMPLETING A REMOTE LOTTERY TICKET SALES TRANSACTION VIA RECEIVING PAYMENT AT A POINT OF SALE

This application is a National Stage application of International Application No. PCT/US2022/013287 filed Jan. 21, 2022, which claims priority to provisional application U.S. Ser. No. 63/140,233, filed Jan. 21, 2021, and titled "Systems and Methods for Completing an Online Purchase Order Transaction via Payment at a Merchant's Physical Point of Sale."

BACKGROUND

Consumers spend billions of dollars each year on games of chance and/or skill which provide a consumer with a possibility of winning and/or accumulating value above and beyond the cost of participating in such game. These types of games include: electronic gaming machines, e.g., coin operated amusement machines; casino-styled games, e.g., blackjack, roulette, poker; and lottery type games. However, each year, hundreds of millions of dollars of game-winning value goes unredeemed.

There is a need for an efficient and consumer-friendly process for consumers which have acquired the right to receive a value for participating in a game to redeem their winning notifications/indications for value so as to reduce the amount of unclaimed and/or unredeemed winning value.

SUMMARY

In some embodiments is a system for completing an online purchase order transaction via payment at a merchant's physical point of sale comprising: a lottery ticket provider, wherein the remotely ordered lottery ticket provider comprises a processing device; a point of sale; a user device; a fulfillment computer device; a lottery ticket; and a lottery ticket approved sales location database.

In some embodiments is a system for completing a transaction request via receiving payment at a point of sale comprising: a lottery ticket provider, wherein the lottery ticket provider is remote from an originating location of the transaction request and wherein the lottery ticket provider comprises: a processing device; a user device; a fulfillment computer device; a lottery ticket; and a lottery ticket approved sales location database In some embodiments is a method for completing an online purchase order transaction via payment at a merchant's physical point of sale comprising: receiving, by a fulfillment computer device, a request associated with an online purchase order for a lottery ticket; determining, by the fulfillment computer device, whether a lottery ticket associated with the online purchase order for a lottery ticket may be provided to a purchaser; and sending, by the fulfillment computer device, an authorization for the activation of the lottery ticket associated with the online purchase order for a lottery ticket.

In some embodiments is a method for completing a transaction request via receiving payment at a point of sale comprising: receiving, by a fulfillment computer device, the transaction request, wherein the transaction request originates from a location remote to the fulfillment computer; determining, by the fulfillment computer device, whether a lottery ticket associated with the transaction request may be provided to a purchaser; and sending, by the fulfillment computer device, an authorization for the activation of the lottery ticket associated with the transaction request.

BRIEF DESCRIPTION OF THE DRAWINGS

FIG. 2A illustrates a rear-view of the draw-type pre-printed lottery ticket of FIG. 1A.

FIG. 4A illustrates a front-view of an instant-win-type pre-printed lottery ticket according to an embodiment of the disclosure with information visible.

FIG. 7A illustrates an embodiment of a method of activation of a draw-type lottery ticket.

FIGS. 10A and 10B illustrate an embodiment of activation of an instant-win-type lottery ticket.

FIG. 12 illustrates a process relating to an instant lottery scratcher dispensed at a point of sale terminal via an in-lane ticket dispenser system according to an embodiment of the disclosure.

FIGS. 18A and 18B illustrate an embodiment of a method associated with a user-configurable lottery subscription device.

FIGS. 21A, 21B, and 21C illustrate an embodiment of a gaming device according to an embodiment of the disclosure.

FIGS. 22A and 22B illustrate embodiments methods associated with a gaming device.

FIG. 23 illustrates a method of providing and redeeming a redeemable winnings voucher according to an embodiment of the disclosure.

FIGS. 26-28 are flowcharts depicting an exemplary process utilized for fulfilling a request for the purchase of remotely ordered lottery ticket in accordance with at least one embodiment of the disclosure.

DETAILED DESCRIPTION

Figure 1A:
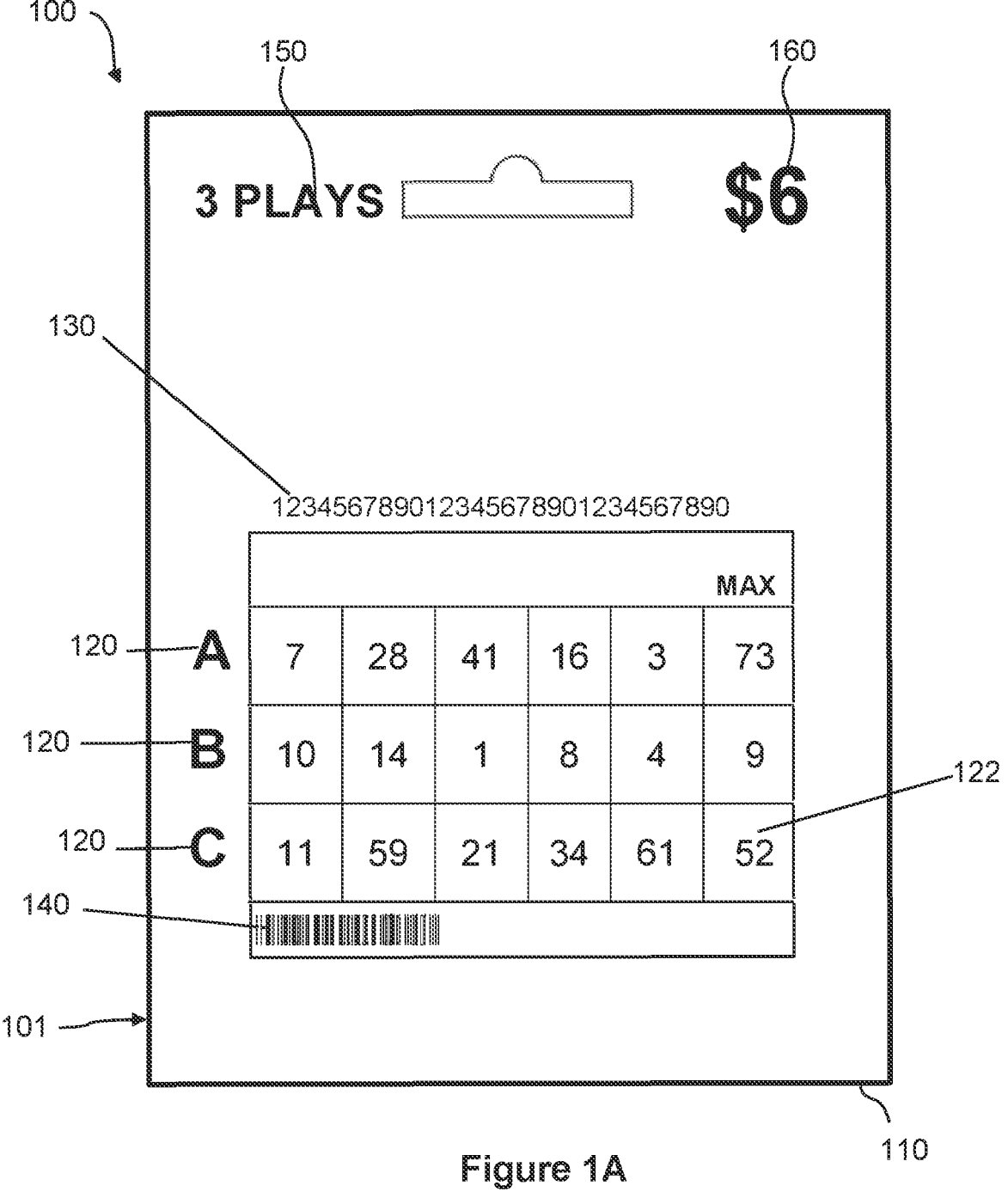
FIG. 1A illustrates a front-view of an embodiment of a draw-type pre-printed lottery ticket according to an embodiment of the disclosure.

Generally, there are two types of lotteries. A first type of lottery is a draw-based lottery or "online" lottery, where a player makes a wager with respect to a subsequently occurring event. For example, a player may wager based upon numbers that will be drawn in the subsequent event. The numbers, which may be selected by the player or randomly selected if the player does not have a preference for the numbers, are printed on a ticket and provided to the player. Once the event occurs, for example the numbers are drawn or generated by the lottery organization, the ticket may be a winner depending on if one or more of the selected numbers were drawn or generated. A second type of lottery is an instant win lottery where a printed ticket provides all of the lottery information. These instant-win tickets typically have a play area covered by scratch off material. The tickets can be purchased from a retailer, and the scratch off material removed to reveal whether the ticket is a winner.

Disclosed herein are various embodiments of pre-printed lottery tickets that can be securely merchandised, that is, made available, throughout a retail store without risk of loss from fraudulent redemption or shrinkage. Generally, the pre-printed lottery tickets disclosed herein can be displayed openly, for example, throughout a retail establishment, in that the pre-printed lottery tickets are inactive. Additionally, the disclosed pre-printed lottery tickets closely resemble a traditional paper ticket so as to foster consumer recognition, trial, and confidence.

In some embodiments, pre-printed tickets may be manufactured and shipped to retail locations. Retailers may manage inventory and display the pre-printed tickets in, for example, checkout lanes, at counters and throughout the store where the product is most visible to customers. Customers can select a lottery product at any time with no additional interaction with a lottery retailer and drop the pre-printed lottery ticket(s) into their shopping cart. During the checkout process, the pre-printed ticket is scanned by the cashier in the retailer's point of sale (e.g., terminal) as they would scan any other product being purchased. The pre-printed ticket may require one, possibly two scans dependent on the bar code standard used and the technical abilities of the retailer's point of sale system. Upon scanning of the ticket the retailer's point of sale will be updated with the product description and cost. The retailer's point of sale will communicate the transaction type, such as purchase or cancel, and the pre-printed ticket details, such as product information and/or a unique identifier, to other components/parties of the lottery (e.g., a central gaming system, a lottery system, or combinations thereof) though a secure communications channel. Upon receiving information for activating a pre-printed ticket being purchased, the system may initiate a pre-printed ticket wager by validating the pre-printed ticket details, generating the appropriate lottery wager information, for example generating an appropriate number of random numbers for the draw. The generated wager information may then be associated with unique identifier of the pre-printed ticket in the system and the pre-printed ticket activated for the next available draw. Confirmation of the activation, as well as the lottery numbers and draw information, for example when the draw is being held, may be withheld from the retailer's point of sale until payment confirmation is received by the lottery system. The cashier continues to scan the customer's purchases until the cart is empty. The cashier may then process payment as the normal course of action. Prior to the retailer's point of sale closing the sale and printing the receipt, the retailer's point of sale system may communicate the payment confirmation and details to the system (e.g., a lottery system or central gaming system). Once payment confirmation is received the system (e.g., via a central gaming system and/or the lottery system) may in turn communicate the lottery numbers and draw information to the retailers point of sale system. This information may be communicated in the form of an image, text or any other message format deemed appropriate. The lottery numbers and draw date assigned to the pre-printed lottery ticket may be printed on the customer's store receipt. The printed receipt with the lottery information is for informational purposes only, and the pre-printed ticket would be required to validate the lottery numbers or to redeem a winning prize.

Additionally, also disclosed herein are various embodiments of virtual lottery tickets having preselected attributes (e.g., lottery picks). As will be disclosed herein, the pre-printed lottery tickets or preselected virtual lottery tickets disclosed herein allow for technical improvements in the processing of lottery tickets, in comparison to the way in which conventional lottery tickets are processed using conventional lottery systems. Particularly, in comparison to conventional lottery systems, the systems utilized to process the disclosed physical pre-printed/virtual pre-selected lottery tickets can benefit from reduced computer processing requirements due to the fact that the pre-printed/pre-selected ticket accounts/files are already present in the system and only need to be marked as active/enrolled instead of the system having to create new account/files for every ticket entered in a particular lottery.

Additionally, also disclosed herein are various embodiments of gaming machines and gaming devices configured to allow for a game to be accessed, loaded, played, winning values achieved and/or accumulated, and winning values converted for redemption. As will be disclosed herein, like the pre-printed lottery tickets, the gaming devices can be displayed openly, for example, throughout a retail establishment, in that the pre-printed lottery tickets are inactive. Additionally, disclosed herein are lottery gaming systems and methods for the sale and activation of pre-printed draw based lottery tickets through the retailers' point of sale systems without the need for adding additional lottery gaming hardware to the retailers' point of sale systems.

Additionally, also disclosed herein are various embodiments of redeemable winnings vouchers which allow a customer to convert its current account value/points/winnings associated with a lottery game (e.g., a lottery game associated with a User-Configurable Subscription Lottery device), an electronic gaming machine (EGM), and/or a coin operated amusement machine (COAM) into other forms of value, e.g., more lottery tickets, credits to another EGM, cash, and/or a stored-value card.

It will be appreciated that in some contexts, a purchaser of a ticket may not ultimately be the person who "plays" or "uses" the ticket; conversely, a purchaser of a ticket may be a player or user of a ticket (though not necessarily). Thus, references throughout this disclosure to one or more of a "purchaser," "consumer," "user," or "player" are not intended to be limiting and should be interpreted as synonymous except where explicitly or contextually so-limited.

In some embodiments disclosed herein are draw-type pre-printed lottery tickets. In some embodiments, the draw-type pre-printed lottery tickets may be activated at a point of sale (POS), such as in a retail store or via a consumer's interaction with a website or smart device application which provides the consumer with the ability to purchase and activate a virtual version of a draw-type pre-printed lottery ticket, e.g., a virtual draw-type pre-selected lottery ticket 102. In some embodiments, a draw-type pre-printed lottery ticket may be activated by enrollment of that particular draw-type pre-printed lottery ticket in a lottery.

In an embodiment, until purchased and activated, pre-printed tickets have no value, nor do they have any wager or draw date assigned. They cannot be used for validation or redemption purposes prior to purchase. For example, prior to activation (for example, by enrollment in a lottery), as will be disclosed herein, even if a draw-type pre-printed lottery ticket bears winning indicia, no prize would be paid out by the lottery to a holder of the draw-type pre-printed lottery ticket. Only winning tickets that have been activated, for example, enrolled in a lottery game, will be redeemable. For example, once scanned by the retailer's POS and paid for by the customer, the lottery will generate wagers for the pre-printed ticket and assign the next available draw date. The generated numbers, the draw date and unique ticket identifier is printed on the customers shopping receipt. Although the draw information is printed on the customer's receipt, it is only information and the pre-printed lottery ticket is the legal instrument for validation and prize redemption. Draw information on the printed receipt also serves to confirm the activation of the pre-printed lottery ticket and the assignment of draw numbers and draw date.

In some embodiments, the draw-type pre-printed lottery tickets disclosed herein contain pre-printed play-selections (e.g., wagers) which will later be determined to be either winning or losing. In such a case, when the pre-printed ticket with pre-printed play-selections is purchased, the lottery (e.g., central gaming system) may simply assign the next draw date to the pre-printed ticket and activate the ticket within the system. In this variation, the central gaming system will have a database of pre-printed tickets and associated play-selections.

Similarly, in some embodiments, a consumer may purchase a virtual draw-type pre-selected lottery ticket which will also include, e.g., be associated with, data equivalent to the information imprinted on a draw-type pre-printed lottery ticket. In various embodiments, the virtual ticket may be processed/activated/enrolled/and determined to be winners or losers via the same methods as described for the physical ticket, with the exception that a virtual ticket may be directly entered into a consumer's e-wallet and its purchase/activation requires a confirmation that the consumer device which has requested the purchase/activation is located in a geographic location approved for the sale of the particular virtual lottery ticket and/or participation in the particular gaming authority's lottery game. For example, the pre-printed play-selection may be determined to be either winning or losing based upon a drawing or other event taking place at a time after purchase of the draw-type pre-printed lottery ticket. After a draw-type pre-printed lottery ticket is purchased and activated by enrollment in a lottery, the lottery "plays" printed on the draw-type pre-printed lottery ticket may be compared to subsequently drawn numbers to determine if one or more of the lottery plays constitute winning entries. The draw-type pre-printed lottery tickets disclosed herein are distinct from scratch-off lottery tickets in which game data, when unobscured, is instantly recognizable as either winning data or non-winning data.

Referring to FIGS. 1A and 2A, an embodiment of a draw-type pre-printed lottery ticket 100 is shown; particularly, a front-side view 101 and a rear-side view 201 are shown, respectively. In various embodiments, the draw-type pre-printed lottery ticket 100 includes a substrate 110 of a suitable material, for example, a cardstock, a cardboard, a chipboard, another paper material, a plastic, or combinations thereof, such as a paper material having a plastic coating.

Figure 1B:
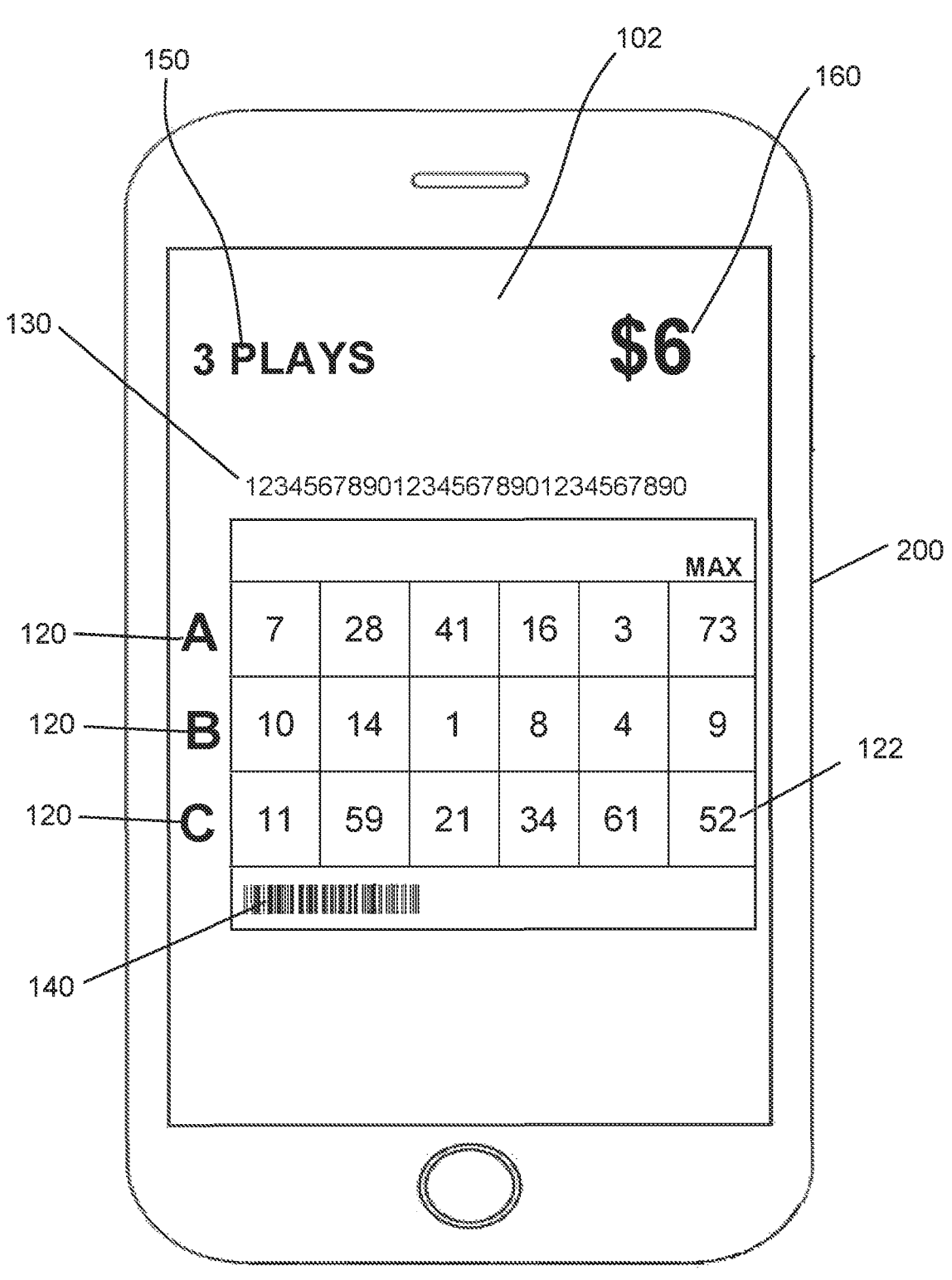
FIG. 1B illustrates a view of a virtual draw-type pre-selected lottery ticket according to an embodiment of the disclosure.

In the embodiment of FIGS. 1A and 2A, the draw-type pre-printed lottery ticket 100 is imprinted with various indicia (such as certain numbers, symbols, words and the like). Particularly, in the embodiment of FIGS. 1 and 2, the draw-type pre-printed lottery ticket 100 is imprinted with at least multiple play-selections 120; in other embodiments, a draw-type pre-printed lottery ticket 100 may include only a single play-selection 120. Each play-selection 120 constitutes a separate and distinct play for a game. In the embodiment of FIG. 1A, the draw-type pre-printed lottery ticket 100 includes three play-selections 120, although in various other embodiments, the draw-type pre-printed lottery ticket 100 includes any suitable number of play-selections 120, for example, one, two, four, five, six, seven, eight, nine, ten, or more play-selections 120. Each of the play-selections includes a plurality of game attributes 122 and each attribute 122 may include, for example, a number, a letter, a symbol, or an illustration. The attributes 122 may be randomly selected. The attributes 122 for the play-selection may be generated using, for example, a Random Number Generator (RNG). As shown in FIG. 1B, in an embodiment where the lottery ticket is a virtual draw-type pre-selected lottery ticket 102, the virtual draw-type pre-selected lottery ticket 102 may be electronically delivered to a consumer's device 200 where the virtual draw-type pre-selected lottery ticket 102 may be displayed as having the same characteristics as described in this paragraph for the physical draw-type pre-printed lottery ticket 100.

Figure 2B:
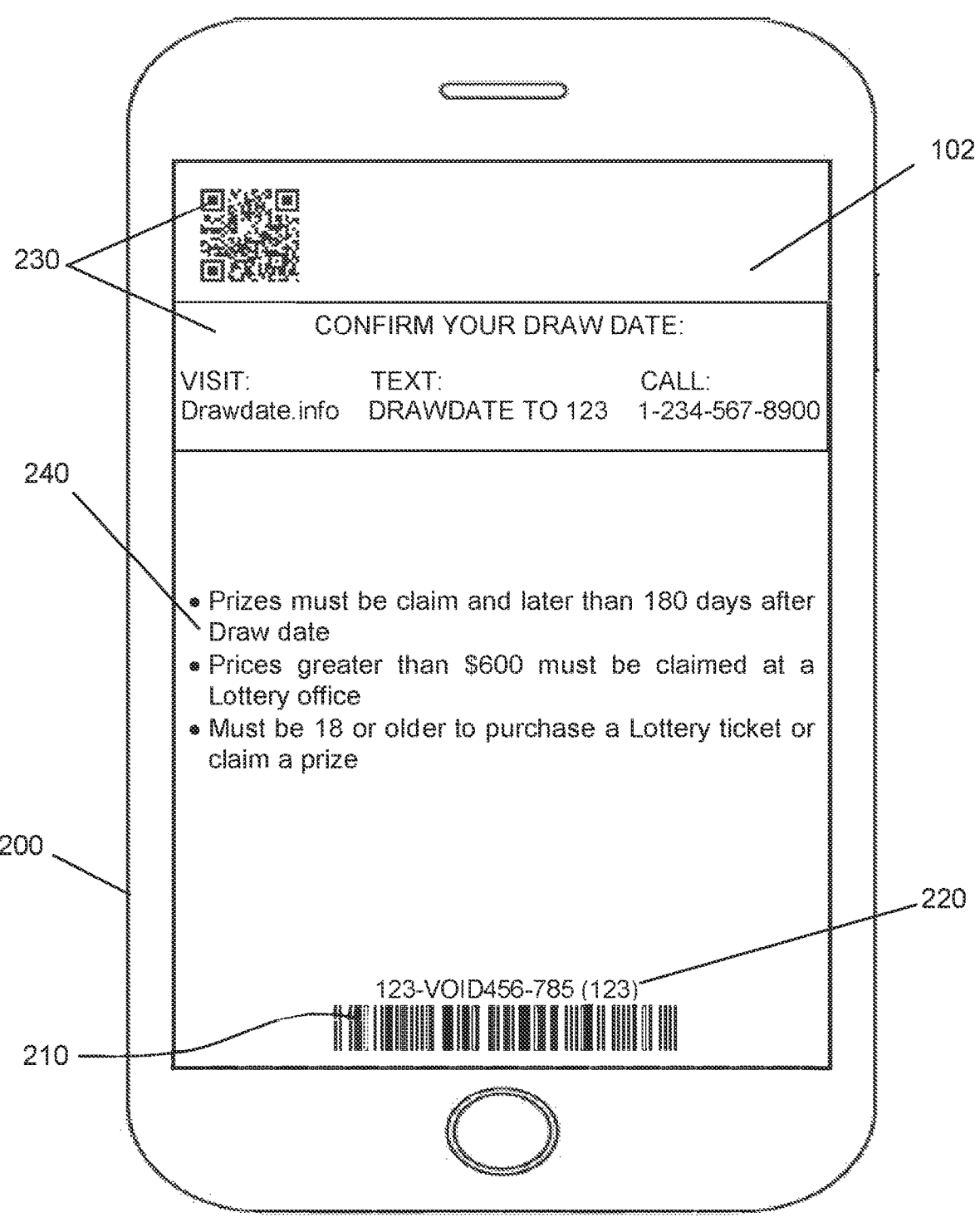
FIG. 2B illustrates a view of a virtual draw-type pre-selected lottery ticket according to an embodiment of the disclosure.

In various embodiments, as shown in FIGS. 1A and 2A, the configuration for each play-selection 120 may be dependent upon the game or lottery for which the draw-type pre-printed lottery ticket 100 is intended. For example, in some embodiments, the pre-printed lottery ticket 100 may be configured for play in a Powerball® lottery game (Powerball® is a registered trademark of Multi-State Lottery Association). In an embodiment where the draw-type pre-printed lottery ticket 100 configured for play in a Powerball® lottery game, each play-selection 120 may include six attributes 122, particularly, a first, second, third, fourth, fifth, and sixth attribute 122. Each of the first, second, third, fourth, and fifth attributes 122 may be a number selected from sixty-nine (69) possibilities and the sixth attribute 122 may be a number independently selected from twenty-six (26) possibilities. As shown in FIGS. 1B and 2B, in an embodiment where the lottery ticket is a virtual draw-type pre-selected lottery ticket 102, the virtual draw-type pre-selected lottery ticket 102 may be electronically delivered to a consumer's device 200 where the virtual draw-type pre-selected lottery ticket 102 may be displayed as having the same characteristics as described in this paragraph for the physical draw-type pre-printed lottery ticket 100.

In an alternative embodiment, the draw-type pre-printed lottery ticket 100 may be configured for play in a Mega Millions® lottery game (Mega Millions® is a registered trademark of Illinois Department of the Lottery). In an embodiment where the draw-type pre-printed lottery ticket 100 configured for play in a Mega Millions® lottery game, each play-selection 120 may include six attributes 122, particularly, a first, second, third, fourth, fifth, and sixth attribute 122. Each of the first, second, third, fourth, and fifth attributes 122 may be a number selected from seventy (70) possibilities and the sixth attribute 122 may be a number independently selected from twenty-five (25) possibilities. In an embodiment where the lottery ticket is a virtual draw-type pre-selected lottery ticket 102, the virtual draw-type pre-selected lottery ticket 102 may be electronically delivered to a consumer's device 200 wherein the virtual draw-type pre-selected lottery ticket 102 may be displayed as having the same characteristics as described in this paragraph for the physical draw-type pre-printed lottery ticket 100.

In some embodiments, the draw-type pre-printed lottery ticket 100 may include a covering 340 configured to obscure the play-selections 120, an encrypted control number 130, a low-tier redemption code 140, and a high-tier redemption code 220, until removed. In various embodiments, the covering may be a continuous layer disposed over a given play-selection 120 or two or more play-selections or disposed over a given attribute 122 or two more attributes 122. In various embodiments, the covering may be a continuous layer disposed over the encrypted control number 130, the low-tier redemption code 140, and the high-tier redemption code 220. The covering may include a material that may be suitably removed by a purchaser, such as a scratch-off material, an example of which may include, but is not limited to a latex film. The scratch-of material may obscure various information (e.g., the play-selections) from observation by both the ticket distributor (e.g., a retailer) and the ticket purchaser until after the ticket has been sold.

As shown in FIGS. 1A and 2A, in various embodiments, the draw-type pre-printed lottery ticket 100 may include various additional indicia. In various embodiments, the indicia may be machine-readable (such as via a scanner or card reader), human-readable, or both. For example, in various embodiments, the indicia may comprise a magnetic stripe, a bar-code (e.g., a linear barcode such as a UCC 128 barcode or a matrix barcode, such as a quick-response code (e.g., a QR Code®—QR code is a registered trademark of Denso Wave Incorporated) a number, a combination of letters and number, or combinations thereof.

As shown in FIGS. 1B and 2B, in embodiments where the lottery ticket is a virtual draw-type pre-selected lottery ticket 102, the virtual draw-type pre-selected lottery ticket 102, when displayed on a consumer's device 200, may comprise indicia which is machine readable (such as via a scanner or card reader), human-readable, or both. For example, in various embodiments, the indicia may comprise a linear barcode such as a UCC 128 barcode or a matrix barcode, such as a quick-response response code (e.g., a QR Code®), a number, a combination of letters and numbers, or combinations thereof.

For example, in the embodiment of FIGS. 1A and 2A, the draw-type pre-printed lottery ticket 100 includes an activation code 210. As shown in FIG. 2A, the activation code 210 is a machine-readable barcode, although in other embodiments an activation code 210 may take any suitable configuration. As will be further explained, the activation code 210 may be unique, for example, with respect to the particular draw-type pre-printed lottery ticket 100 with which it is associated. In an embodiment where the lottery ticket is a virtual draw-type pre-selected lottery ticket 102, the virtual draw-type pre-selected lottery ticket 102 may be electronically delivered to a consumer's device 200 wherein the virtual draw-type pre-selected lottery ticket 102 may be displayed as having an activation code 210 as described in this paragraph for the physical draw-type pre-printed lottery ticket 100 and/or the virtual draw-type pre-selected lottery ticket 102 may be electronically delivered to a consumer's device 200 in an activated state.

Also, in the embodiment of FIGS. 1A and 2A, the draw-type pre-printed lottery ticket 100 includes an encrypted control number 130. The encrypted control number 130 may contain various information about the pre-printed lottery ticket 100, for example, which may be used to track or authenticate the pre-printed lottery ticket 100. In some embodiments, the encrypted control number 130 may be unique, for example, with respect to the particular pre-printed lottery ticket 100 with which it is associated. In some embodiments, the encrypted control number 130 may be obscured by the covering, prior to the covering being removed (e.g., prior to being "scratched-off").

As shown in FIGS. 1B and 2B, in an embodiment where the lottery ticket is a virtual draw-type pre-selected lottery ticket 102, the virtual draw-type pre-selected lottery ticket 102 may be electronically delivered to a consumer's device 200 wherein the virtual draw-type pre-selected lottery ticket 102 may be displayed as having an encrypted control number 130. The encrypted control number 130 may contain various information about the virtual draw-type pre-selected lottery ticket 102, for example, which may be used to track or authenticate the virtual draw-type pre-selected lottery ticket 102. In some embodiments, the encrypted control number 130 may be unique, for example, with respect to the particular virtual draw-type pre-selected lottery ticket 102 with which it is associated.

Also, in the embodiment of FIGS. 1A and 2A, the pre-printed lottery ticket includes both a low-tier redemption code 140 and a high-tier redemption code 220. In various embodiments, the low-tier redemption code 140 and the high-tier redemption code 220 may comprise a magnetic stripe, a bar-code (e.g., a linear barcode such as a UCC 128 barcode or a matrix barcode, such as a quick-response code (e.g., a QR Code®—QR Code® is a registered trademark of Denso Wave Incorporated) a number, a combination of letters and numbers, or combinations thereof. In various embodiments, the low-tier redemption code 140 and the high-tier redemption code 220 may be located on the front-side 101 of the pre-printed lottery ticket 100. In various embodiments, the low-tier redemption code 140 and the high-tier redemption code 220 may be located on the rear-side 201 of the pre-printed lottery ticket 100. In various embodiments, the low-tier redemption code 140 may be located on the front-side 101 of the pre-printed lottery ticket 100 and the high-tier redemption code 220 may be located on the rear-side 201 of the pre-printed lottery ticket 100. In various embodiments, the low-tier redemption code 140 may be located on the rear-side 201 of the pre-printed lottery ticket 100 and the high-tier redemption code 220 may be located on the front-side 101 of the pre-printed lottery ticket 100. In various embodiments, the low-tier redemption code 140 and/or the high-tier redemption code 220 may be utilized to redeem any winnings, for example, dependent upon the size and/or value of any potential winnings, e.g., a low-tier redemption code 140 may be utilized to redeem prizes/winnings valued at under $600.00 whereas the high-tier redemption code 220 may be utilized to redeem prizes/winnings valued at over $600.00. The demarcation of the value amounts for the low-tier redemption code 140 and a high-tier redemption code 220 may be determined on a game-by-game basis. In various embodiments, the low-tier redemption code 140 and/or the high-tier redemption code 220 may be machine-readable. As shown in FIGS. 1B and 2B, in an embodiment where the lottery ticket is a virtual draw-type pre-selected lottery ticket 102, the virtual draw-type pre-selected lottery ticket 102 may be electronically delivered to a consumer's device 200 wherein the virtual draw-type pre-selected lottery ticket 102 may be displayed as having the same characteristics as described in this paragraph for the physical draw-type pre-printed lottery ticket 100. Moreover, the low-tier redemption code 140 and/or the high-tier redemption code 220 may be configured to be activatable on the consumer's device 200 to request available redeemable values.

Also, in the embodiment of FIGS. 1A and 2A, the pre-printed lottery ticket includes confirmation information 230. As shown in FIG. 2A, the confirmation information 230 may comprise a quick-response response code (e.g., a QR Code®), a website, a call-number, a text-number (SMS), or combinations thereof. As will be further explained, a purchaser may use one or more of the confirmation information 230 to confirm their entry into a lottery, a draw-date for that lottery, and/or winning numbers for that lottery. Furthermore, in embodiments the purchaser may not be the player of the lottery for which the lottery ticket is purchased, rather the purchaser may direct that the lottery ticket be delivered to another party. As shown in FIG. 2B, in an embodiment where the lottery ticket is a virtual draw-type pre-selected lottery ticket 102, the virtual draw-type pre-selected lottery ticket 102 may be electronically delivered to a consumer's device 200 wherein the virtual draw-type pre-selected lottery ticket 102 may be displayed as having the same characteristics as described in this paragraph above for the physical draw-type pre-printed lottery ticket 100.

Also, in the embodiment of FIGS. 1A and 2A, the pre-printed lottery ticket includes an indication of the number of plays 150. For example, as shown in FIG. 1A, the pre-printed lottery ticket 100 is configured to allow three (3) plays, as apparent from the inclusion of three (3) different play-selections 120. As such, indication of number of plays 150 indicates that the pre-printed lottery ticket 100 is configured to allow three (3) plays. As shown in FIG. 1B, in an embodiment where the lottery ticket is a virtual draw-type pre-selected lottery ticket 102, the virtual draw-type pre-selected lottery ticket 102 may be electronically delivered to a consumer's device 200 wherein the virtual draw-type pre-selected lottery ticket 102 may be displayed as having the same characteristics as described in this paragraph for the physical draw-type pre-printed lottery ticket 100.

Also, in the embodiment of FIGS. 1A and 2A, the draw-type pre-printed lottery ticket 100 includes denomination indicia 160, for example, the price or value of the draw-type pre-printed lottery ticket 100. The denomination indicia 160 may correspond to the number of plays. As an example, in the embodiment of FIGS. 1A and 2A where the draw-type pre-printed lottery ticket 100 is configured for three (3) plays, the pre-printed lottery ticket 100 has a $6 denomination based upon each play being valued at $2. Also, in the embodiment of FIGS. 1 and 2, the pre-printed lottery ticket 100 includes a Universal Product Code (UPC) associated with the pre-printed lottery ticket 100, for example, which may be utilized at a point of sale to determine the pre-printed lottery ticket being transacted and its price.

As shown in FIGS. 1B and 2B, in an embodiment where the lottery ticket is a virtual draw-type pre-selected lottery ticket 102, the virtual draw-type pre-selected lottery ticket 102 may be electronically delivered to a consumer's device 200 wherein the virtual draw-type pre-selected lottery ticket 102 may be displayed as having denomination indicia 160, for example, the price or value of the draw-type pre-printed lottery ticket 100. The denomination indicia 160 may correspond to the number of plays. As an example, in the embodiment of FIGS. 1 and 2, a virtual draw-type pre-selected lottery ticket 102 is configured for three (3) plays, e.g., the virtual draw-type pre-selected lottery ticket 102 has a $6 denomination based upon each play being valued at $2.

Also in the embodiment of FIGS. 1A and 2A, the pre-printed lottery ticket includes various user instructions 240, for example, related to rules for game-play; confirmation of entry in a lottery, confirmation of a date for that lottery, and/or winning numbers for that lottery; redemption instructions; and the like.

As shown in FIGS. 1B and 2B, in an embodiment where the lottery ticket is a virtual draw-type pre-selected lottery ticket 102, the virtual draw-type pre-selected lottery ticket 102 may be electronically delivered to a consumer's device 200 wherein various user instructions 240, for example, related to rules for game-play; confirmation of entry in a lottery, confirmation of a date for that lottery, and/or winning numbers for that lottery; redemption instructions; and the like may be displayed.

Figure 1C:
FIG. 1C illustrates a front-view of an embodiment of a draw-type pre-printed lottery ticket according to an embodiment of the disclosure.

FIG. 1C illustrates an embodiment of a pre-printed lottery ticket 103. A pre-printed ticket 103 may be placed at various locations in a retail environment. The pre-printed ticket 103 may have a main ticket portion 103 and may have a display portion 104 separable connected to the main ticket portion 103, for example by perforated or scored lines. The display portion 104 may include a hanging cut-out 106 in order to facilitate the display of the pre-printed ticket 103. The main ticket portion 103 includes advertising and purchase information, such as the cost of the pre-printed ticket 109, e.g. denomination indicia 160 (e.g., contained in a UPC bar code similar to UPC 1403), and the product the pre-printed ticket is for 111. Additionally, the main ticket portion 107 may include barcode information 113, which may be in the form of one or more barcodes although only one is depicted. Barcode information will contain the Ticket Unique Identifier 117 information, Universal Product Code 119 information and may contain price 109 information. Although the specific physical characteristics of the pre-printed ticket are depicted in FIG. 1C, it will be appreciated that the pre-printed tickets may take many different physical shapes.

Figure 1D:
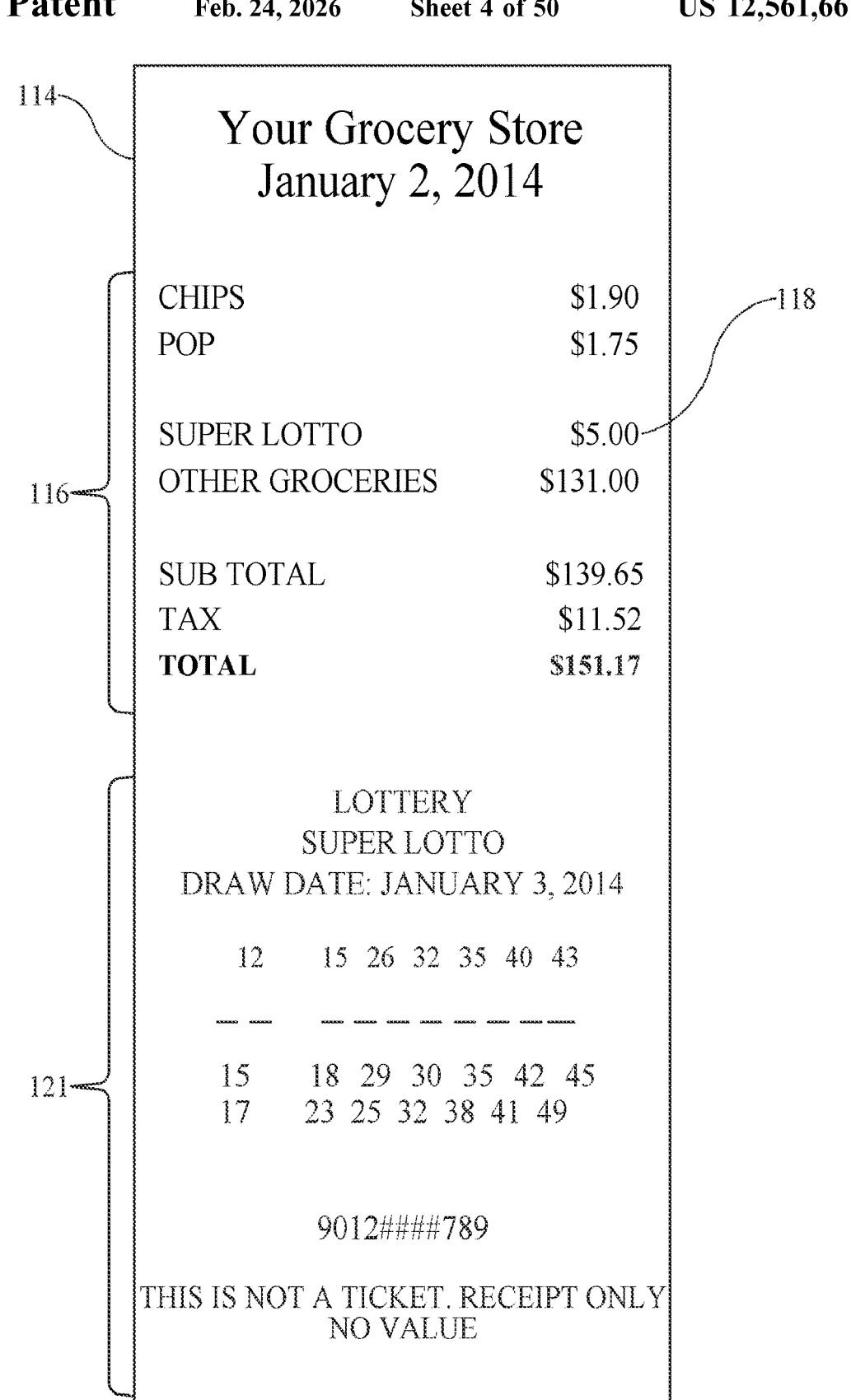
FIG. 1D illustrates a front-view of an embodiment of a draw-type pre-printed lottery ticket purchase receipt according to an embodiment of the disclosure.

FIG. 1D illustrates an embodiment of a pre-printed lottery ticket purchase receipt 114 provided to the customer after a purchase transaction of a pre-printed lottery ticket 103 is completed. The receipt is similar to commonly provided receipts and includes an itemized list of purchased items 116. The list 116 includes an indication 118 of the purchase of the pre-printed ticket. The receipt may also include draw and wager information 121 provided by the central gaming system 540 when the pre-printed ticket was activated. The draw and wager information 121, may include an indication of the draw date, the wager numbers and the unique ticket identifier which may be masked for security reasons. The unique ticket identifier included in 121 associates the receipt 114 to the pre-printed ticket 103. The draw and wager information associated with a pre-printed ticket may be checked by a consumer by other means, such as through a lottery terminal, lottery mobile application or lottery online site.

Figure 1E:
FIG. 1E illustrates a front-view of an embodiment of draw-type pre-printed lottery tickets according to an embodiment of the disclosure.

FIG. 1E illustrates alternative or additional embodiment of a pre-printed lottery ticket 103, pre-printed lottery ticket 103a and pre-printed lottery ticket 103b. As depicted, pre-printed lottery ticket 103a is for two plays or wagers plus a bonus, which may be indicated by additional play information 1032 and/or may be reflected by the price 1031 of the pre-printed ticket 103a. The pre-printed lottery ticket 103a is depicted as providing separate wagers for two products 1033, 1034. Wager and draw information will be generated and activated for a subsequent Super Lotto draw and a subsequent Extra draw. The information for the draw and wager information that needs to be generated may be stored by the lottery system 520 and/or central gaming system 540 and associated with unique information that can be stored in the barcode 1035.

A variation of the above is to produce pre-printed tickets with pre-printed wagers on the ticket. In such a case, when the pre-printed ticket with pre-printed wagers is purchased, the central gaming system 540 may simply assign the next draw date to the pre-printed ticket and activate the ticket within the lottery system. The central gaming system 540 in this variation will have a database of pre-printed tickets and associated lottery wagers.

Figure 1F:
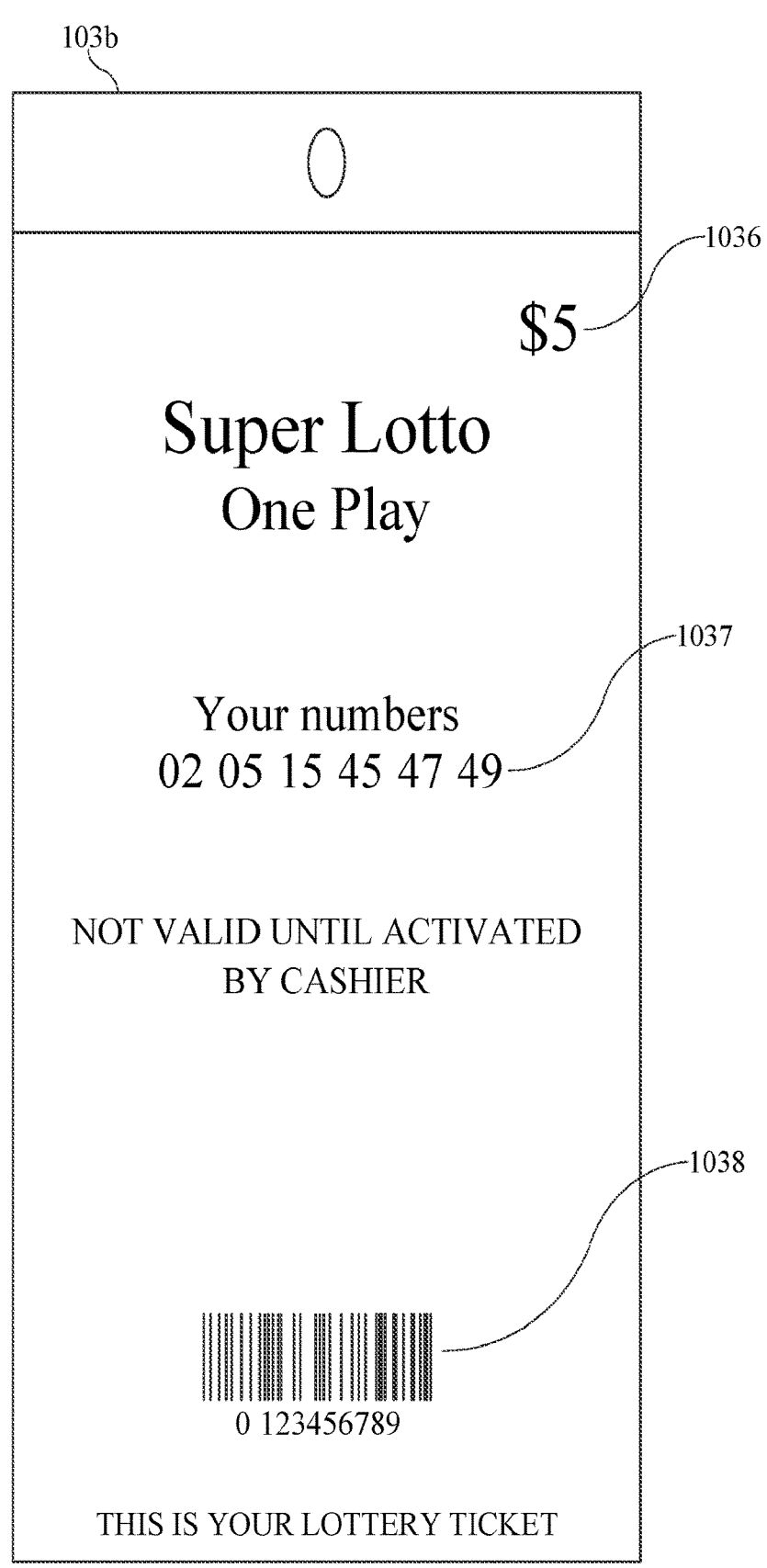
FIG. 1F illustrates a front-view of an embodiment of draw-type pre-printed lottery tickets according to an embodiment of the disclosure.

FIG. 1F illustrates alternative or additional embodiment of a pre-printed lottery ticket 103. Pre-printed lottery ticket 103b is depicted as being for a single product and wager. However, the pre-printed lottery ticket 103b is already associated with wager information 1037 which may be printed on the ticket to allow selection of preferred numbers by a consumer. Accordingly, the pre-printed ticket 103b includes a purchase amount indication 1036 and product or game information, as well as the wager information, which is depicted as being the numbers of the draw 1037. When the barcode 1038 of the pre-printed ticket 103b is scanned, the unique ID information 117 may be used to activate the pre-printed ticket 103b with the subsequent draw. The wager information does not need to be generated since it is already generated and associated with the pre-printed lottery ticket in the system, for example at the time of manufacture or printing. Understandably, any combination of lottery tickets as identified herein can be manufactured and sold via the methods and systems described herein.

In some embodiments disclosed herein are instant-win-type pre-printed lottery tickets. In some embodiments, the instant-win-type pre-printed lottery tickets may be activated at a POS, such as in a retail store or a consumer's interaction with a website or smart device application which provides the consumer with the ability to purchase and activate a virtual version of a draw-type pre-printed lottery ticket, e.g., a virtual instant-win-type pre-selected lottery ticket 302. In some embodiments, an instant-win-type pre-printed lottery tickets contain hidden pre-printed winning and losing game data. As such, the instant-win-type pre-printed lottery tickets are distinct from lottery tickets in which winning numbers are drawn some time after the sale of the ticket.

Figure 3:
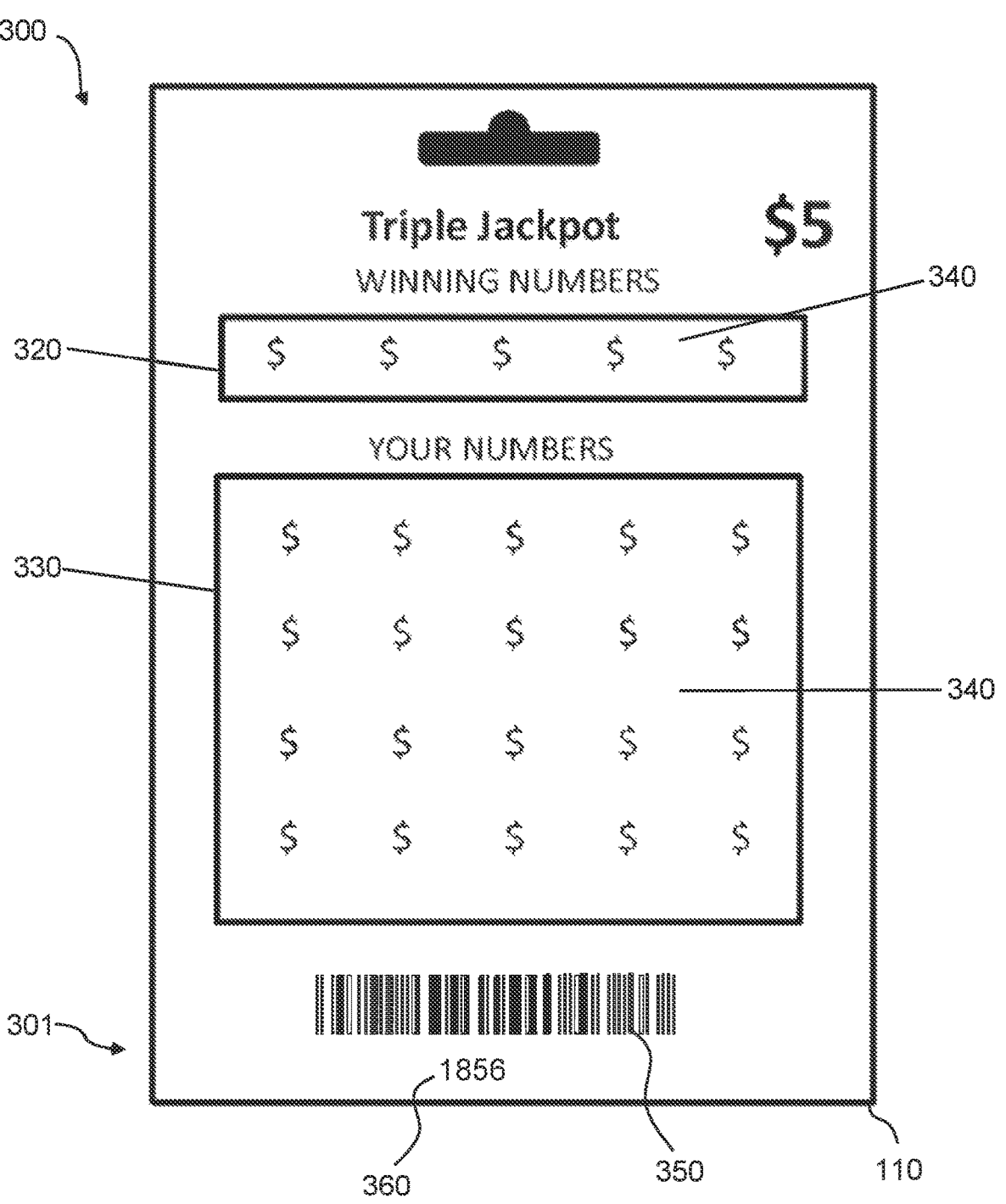
FIG. 3 illustrates a front-view of an instant-win-type pre-printed lottery ticket according to an embodiment of the disclosure with information obscured.

Referring to FIGS. 3 and 4A, an embodiment of an instant-win-type pre-printed lottery ticket 300 is shown, particularly, a front view 301 of the instant-win-type pre-printed lottery ticket 300 is shown. In various embodiments, the instant-win-type pre-printed lottery ticket 300 includes a substrate 110 of a suitable material, for example, a card-stock, a cardboard, a chipboard, another paper material, a plastic, or combinations thereof, such as a paper material having a plastic coating.

In various embodiments, the instant-win-type pre-printed lottery ticket 300 is imprinted with various indicia (such as information, such as certain numbers, symbols, words and the like). Similarly, a consumer may purchase a virtual instant-win-type pre-selected lottery ticket 302 which will also include, e.g., be associated with, data equivalent to the information imprinted on a physical instant-win-type pre-printed lottery ticket 300. In various embodiments, the virtual ticket may be processed/activated/enrolled/and determined to be a winner or a loser via the same methods as described for the physical ticket, with the exception that a virtual ticket may be directly entered into a consumer's e-wallet and its purchase/activation requires a confirmation that the consumer device which has requested the purchase/activation is located in a geographic location approved for the sale of the particular virtual lottery ticket and/or participation in the particular gaming authority's lottery game. In some embodiments, the indicia may provide an indication as to whether the bearer has won a prize. Particularly, in the embodiment of FIGS. 3 and 4A, the instant-win-type pre-printed lottery ticket 300 is imprinted with each of a "Your Winning Data" section 320 and a "Your Data" section 330. The "Your Winning Data" section 320 may include pre-printed instructions that instruct the purchaser to electronically communicate a certain indicium (e.g., a play-code) uniquely identifying the instant-win-type pre-printed lottery ticket 300 to a particular destination (e.g., a node), for example, to text a unique number to a particular short-code. The "Your Data" section 330 may include a plurality of game attributes 332 and each attribute 332 may include, for example, a number, a letter, a symbol, or an illustration. The attributes 332 may be randomly selected, for example, generated using a RNG. The attributes 332 may be compared against indicia received by the purchaser of the instant-win-type pre-printed lottery ticket 300 upon communicating the indicium uniquely identifying the instant-win-type pre-printed lottery ticket 300 to the particular destination, as directed by the "Your Winning Data" section 320.

Figure 4B:
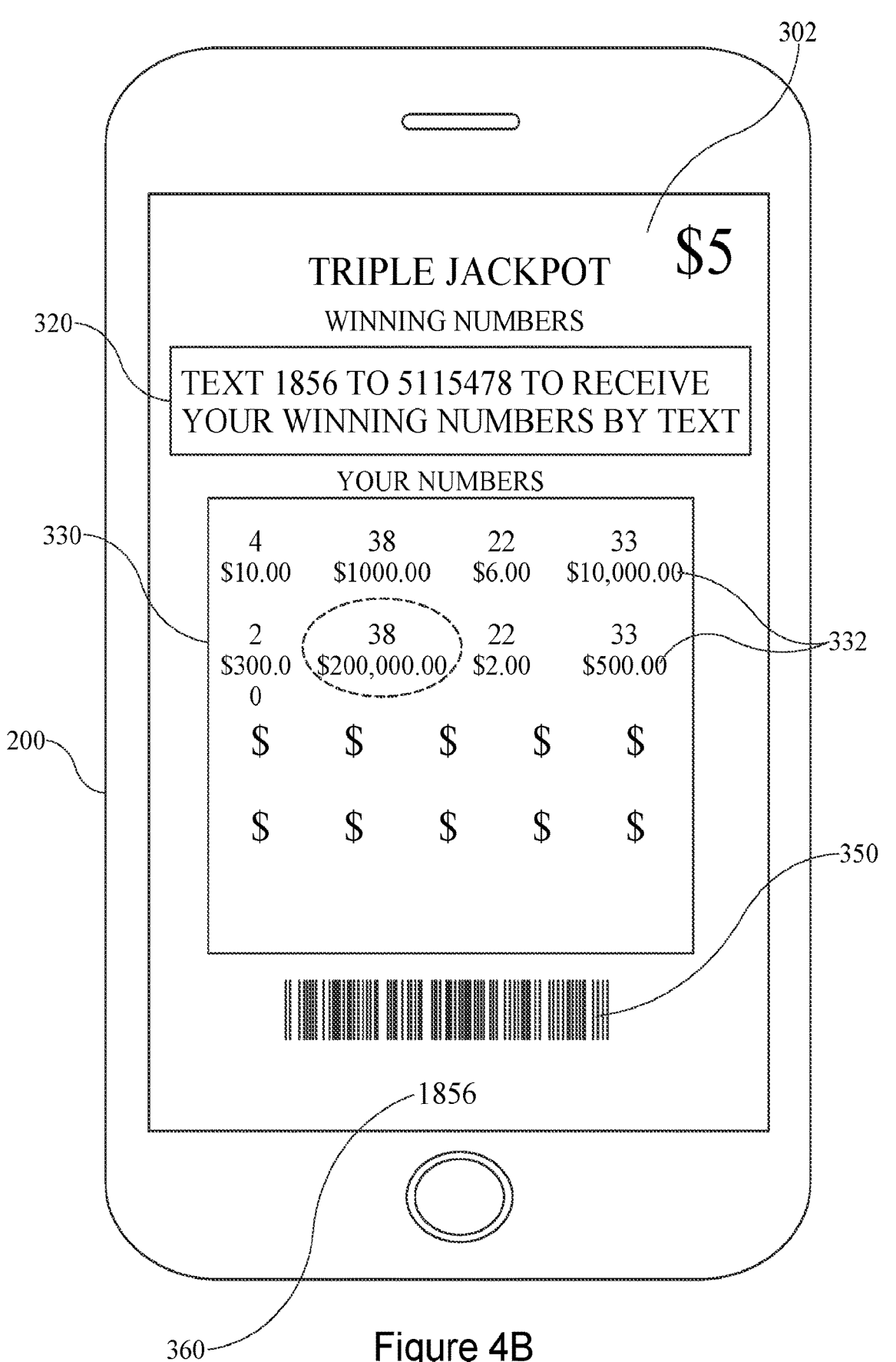
FIG. 4B illustrates a view of a virtual instant-win-type pre-selected lottery ticket according to an embodiment of the disclosure.

As shown in FIG. 4B, in an embodiment where the lottery ticket is a virtual instant-win-type pre-selected lottery ticket 302, the virtual instant-win-type pre-selected lottery ticket 302 may be electronically delivered to a consumer's device 200 wherein the virtual instant-win-type pre-selected lottery ticket 302 may be displayed as having each of a "Your Winning Data" section 320 and a "Your Data" section 330. The "Your Winning Data" section 320 may include accessible instructions, which when displayed, instruct the purchaser to electronically communicate a certain indicium (e.g., a play-code) uniquely identifying the instant-win-type pre-printed lottery ticket 300 to a particular destination (e.g., a node), for example, to text a unique number to a particular short-code and/or the instructions may be configured to be activatable on the consumer's device 200 to automatically communicate the indicium to the relevant party when activated by a user. The "Your Data" section 330 may include a plurality of displayable game attributes 332 and each attribute 332 may include, for example, a number, a letter, a symbol, or an illustration. The attributes 332 may be randomly selected, for example, generated using a RNG. The attributes 332 may be compared against indicia received by the purchaser of the virtual instant-win-type pre-selected lottery ticket 302 upon communicating the indicium uniquely identifying the virtual instant-win-type pre-selected lottery ticket 302 to the particular destination, as directed by the "Your Winning Data" section 320 and/or via automatic communication as a result of the purchaser activating the portion of section 320 configured to be activatable, e.g., a button and/or a hyperlink.

In some embodiments, the instant-win-type pre-printed lottery ticket 300 may include a covering 340. For example, as illustrated in FIG. 3, the "Your Winning Data" section 320, the "Your Data" section 330, or both may be obscured from sight by a scratch-off material, an example of which may include, but is not limited to a latex film. For example, the covering 340 may obscure the winning indication information from observation by both the ticket distributor and the ticket purchaser until after the ticket has been sold.

In some embodiments, as shown in FIG. 4A, the instant-win-type pre-printed lottery ticket 300 may also include an activation code 350 which may be machine-readable (such as via a scanner or card reader), human-readable, or both. For example, in various embodiments, the activation code 350 may comprise a magnetic stripe, a bar-code (e.g., a linear barcode such as a UCC 128 barcode or a matrix barcode, such as a quick-response (e.g., a QR Code®), a number, a combination of letters and number, or combinations thereof. As will be further explained, the activation code 350 may be unique, for example, with respect to the particular instant-win-type pre-printed lottery ticket 300 with which it is associated.

In some embodiments, as shown in FIG. 4B, where the lottery ticket is a virtual instant-win-type pre-selected lottery ticket 302, the virtual instant-win-type pre-selected lottery ticket 302, when displayed on a consumer's device 200, may comprise an activation code 350 which is machine readable (such as via a scanner or card reader), human-readable, or both. For example, in various embodiments, the activation code may comprise a linear barcode such as a UCC 128 barcode or a matrix barcode, such as a quick-response response (e.g., a QR Code®), a number, a combination of letters and numbers, or combinations thereof.

Also, in some embodiments, as shown in FIGS. 3 and 4A, the instant-win-type pre-printed lottery ticket 300 may also include a control number 360 (e.g., a serial number) which may uniquely identify the instant-win-type pre-printed lottery ticket 300 with which it is associated. In some embodiments, the control number 360 may be used to track or authenticate instant-win-type pre-printed lottery ticket 300 with which it is associated. In various embodiments, the control number 360 which may be the same or different than a number encoded by the activation code 350 and/or a play-number contained in the "Your Winning Data" section 320. In an embodiment, as shown in FIG. 4B, where the lottery ticket is a virtual instant-win-type pre-selected lottery ticket 302, the virtual instant-win-type pre-selected lottery ticket 302 may be electronically delivered to a consumer's device 200 wherein the virtual draw-type pre-selected lottery ticket 102 may be displayed as having the same characteristics as described in this paragraph for the physical instant-win-type pre-printed lottery ticket 300.

Additionally, in some embodiments the instant-win-type pre-printed lottery ticket 300 may also contain other information such as marketing, pricing, and rules of play, as similarly disclosed with respect to the draw-type pre-printed lottery ticket 100. In an embodiment where the lottery ticket is a virtual instant-win-type pre-selected lottery ticket 302, the virtual instant-win-type pre-selected lottery ticket 302 may be electronically delivered to a consumer's device 200 wherein other types of information, for example, related to as marketing, pricing, rules of play, and the like may be displayed.

Also disclosed herein are embodiments related to a system for processing a pre-printed lottery ticket (and/or a virtual pre-selected lottery ticket), such as the draw-type pre-printed lottery ticket 100 of FIGS. 1A and 2A, the virtual draw-type pre-selected lottery ticket 102 of FIGS. 1B and 2B, the instant-win-type pre-printed lottery ticket 300 of FIGS. 3 and 4A, and/or the virtual instant-win-type pre-selected lottery ticket 302 of FIG. 4B. In some embodiments, an environment in which a pre-printed lottery ticket is processed may include users, merchants, vendors, issuers, providers, and other interested parties. As described hereinbelow, one or more components of the pre-printed lottery ticket processing system, individually or collectively, may be configured to perform various functions related to a pre-printed lottery ticket. These functionalities include and relate to the activation of a pre-printed lottery ticket and/or the enrollment of a pre-printed lottery ticket in a lottery, the provision of an activation and/or enrollment confirmation to a purchaser of a pre-printed lottery ticket, the provision of a draw-date confirmation to a purchaser of a pre-printed lottery ticket, the notification of the winnings associated with a pre-printed lottery ticket, the addition of an enrolled pre-printed lottery ticket (or virtual pre-selected lottery ticket) to an electronically-maintained data file (e.g., an "electronic wallet" or "e-wallet") of the purchaser, or combinations thereof.

Figure 5A:
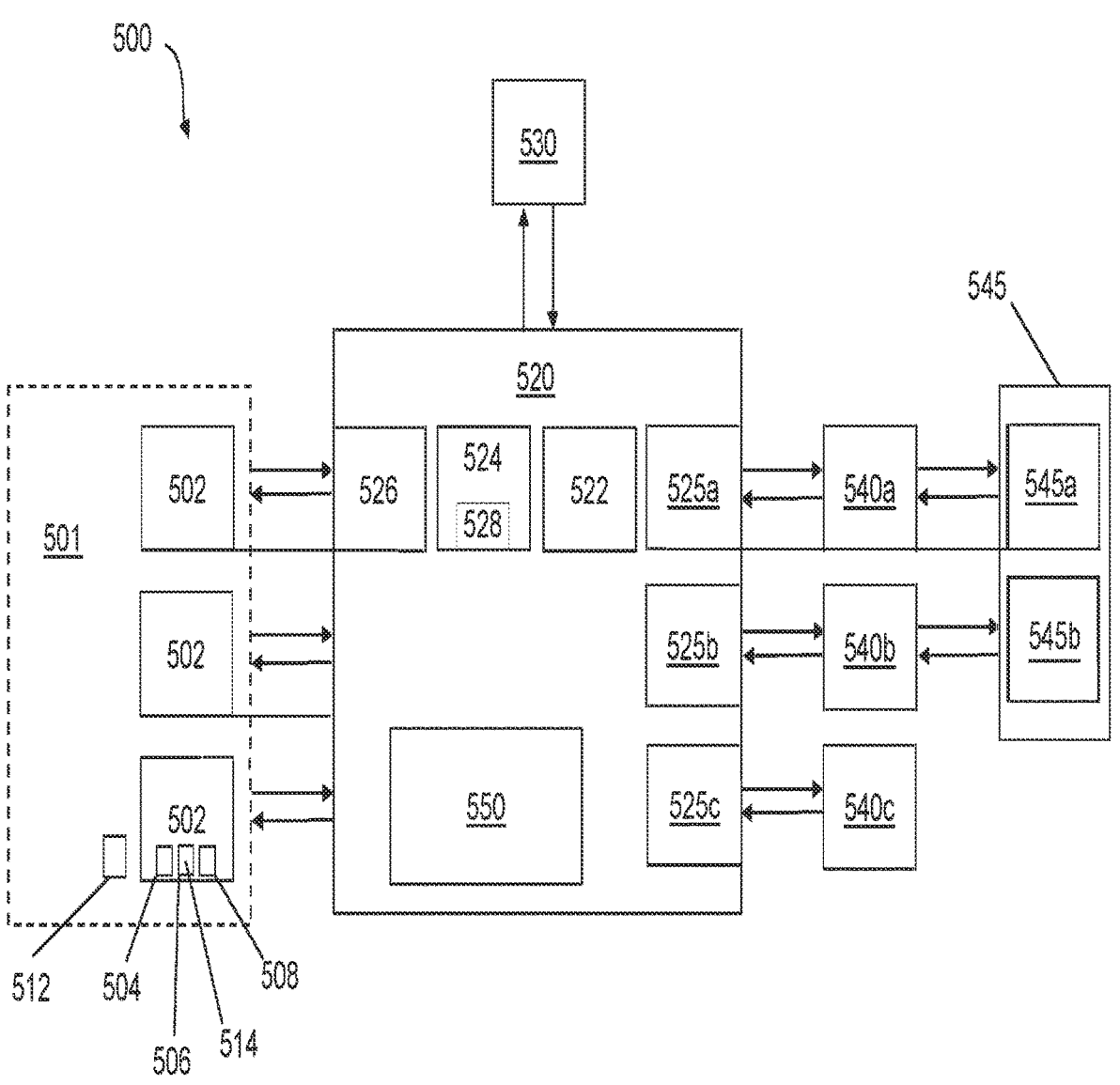
FIG. 5A illustrates a lottery system and/or environment in which a pre-printed and/or pre-selected lottery ticket may be enrolled in a lottery at point of sale according to an embodiment of the disclosure.

FIG. 5A illustrates an embodiment of a pre-printed lottery ticket processing system 500 for processing draw-type pre-printed lottery tickets 100, virtual draw-type pre-selected lottery tickets 102, instant-win-type pre-printed lottery tickets 300, and virtual instant-win-type pre-selected lottery tickets 302. The lottery ticket processing system 500 generally includes one or more point of sale terminals 502 (POSs) disposed at retailer 501 (it is also understood that a consumer's device 200 may be a point of sale in the context of the purchase of a virtual pre-selected lottery ticket). In the embodiment of FIG. 5A, the lottery ticket processing system 500 also includes a lottery system 520 communicably coupled to the point of sale terminal 502 and at least one central gaming system (CGS) 540 (e.g., at least one of 540*a*, 540*b*, and 540*c*) communicably coupled to the lottery system 520. In various embodiments, various components of the system of FIG. 5A may be operably connected via one or more networks (as intimated by the bi-directional communications arrows between the various components—e.g., these communications may be made via one or more networks, e.g., broadband, optical, Wi-Fi, Bluetooth, NFC, cellular, satellite, cloud, card processing network, banking network, a local area network, the World Wide Web for Internet, non-cellular mobile phone network, a land-line network, Public Switched Telephone Network (PSTN), a dedicated communication line, other networks for transferring electronic information, or combinations thereof. The communication between various components may be secured using various encryption techniques.

In some embodiments, the POS terminals 502 disposed at the retailer 501 may include a processing unit 504, memory unit 506 and I/O interface(s) 508 for communicating with devices external to the POS terminal 502. Additionally or alternatively, while the embodiment of FIG. 5A illustrates POS terminals 502 disposed at the retailer 501, in some other embodiments, other types of terminals may be used in place or along with conventional POS terminals, for example, network terminals which may include PCs, laptops, handheld devices, mobile phones, or other devices. Network terminals may, for example, be made available in kiosks to provide retailers access to the lottery system 520 and the associated functionality.

In some embodiments, the processing unit 504 can comprise an electronic input device, a register or terminal, a computer processing unit ("CPU"), a personal computer, a personal digital assistant (e.g., smart phone), or other means of communicating with the I/O interface(s) 508. In some embodiments, the processing unit 504 may incorporate a "store-and-forward" functionality. Generally, the store-and-forward functionality may operate during activation of a stored-value card such that, if connectivity between the POS terminal 502 and a stored-value processing system is lost during activation of the stored-value card, the processing unit 504 will store the activation request for the stored-value card and communicate the activation request when connectivity is regained, thus allowing the activation to go forward. In some embodiments, the processing unit 504 may be configured to allow the store-and-forward functionality to be disabled or suppressed.

The I/O interface(s) 508 generally comprises one or more interpretation units such as a bar code scanner, magnetic strip reader, optical character recognition device, biometric recognition device, numerical keyboard (e.g., for entering an identification number), or other device configured to interrogate, interpret, capture, or input the data encoded in or on the authentication token. For example, the I/O interface(s) 508 may comprise a barcode scanner for scanning and/or retrieving machine-readable (e.g., barcode information, such as Universal Product Code information or other information) disposed on a ticket. In some embodiments, the POS terminal 502 may also be connected to a printer 512, for example, for printing a receipt 114 of the transaction. The POS terminal 502 includes instructions 514 stored in the memory unit 506, which when executed by the processor unit 504, cause the POS terminal 502 to provide certain functionality, as disclosed herein.

In an embodiment, the lottery system 520 generally includes a processing unit 522, one or more memory units 524, one or more I/O interface(s) 526 for communicating with components external to the lottery system 520, a communication module 550 which is integrated with other systems capable of storing information and transmitting information according to the desired communication method, and at least one API 525 to interface and/or interact with components/systems outside lottery system 520. The memory unit(s) 524 may store instructions 528 that, when executed by the processing unit 522, cause the lottery system 520 to provide certain functionality, as disclosed herein. For example, in an embodiment, certain functionality may be receiving and verifying pre-printed lottery ticket information from a plurality of different retailers. The verification of the pre-printed lottery ticket information may involve checking that the received information corresponds to an actual ticket, verifying one or more check-digits, and/or verifying that the pre-printed lottery ticket was distributed to the retailer. In an embodiment, certain functionality may be processing transactions and exchanging data from a plurality of different retailers to a single central gaming system or multiple central gaming systems. Instructions 528 may include any functionality necessary for the successful exchange of data and the activation, cancellation, enrollment, and/or purchase of a lottery ticket.

Figure 5B:
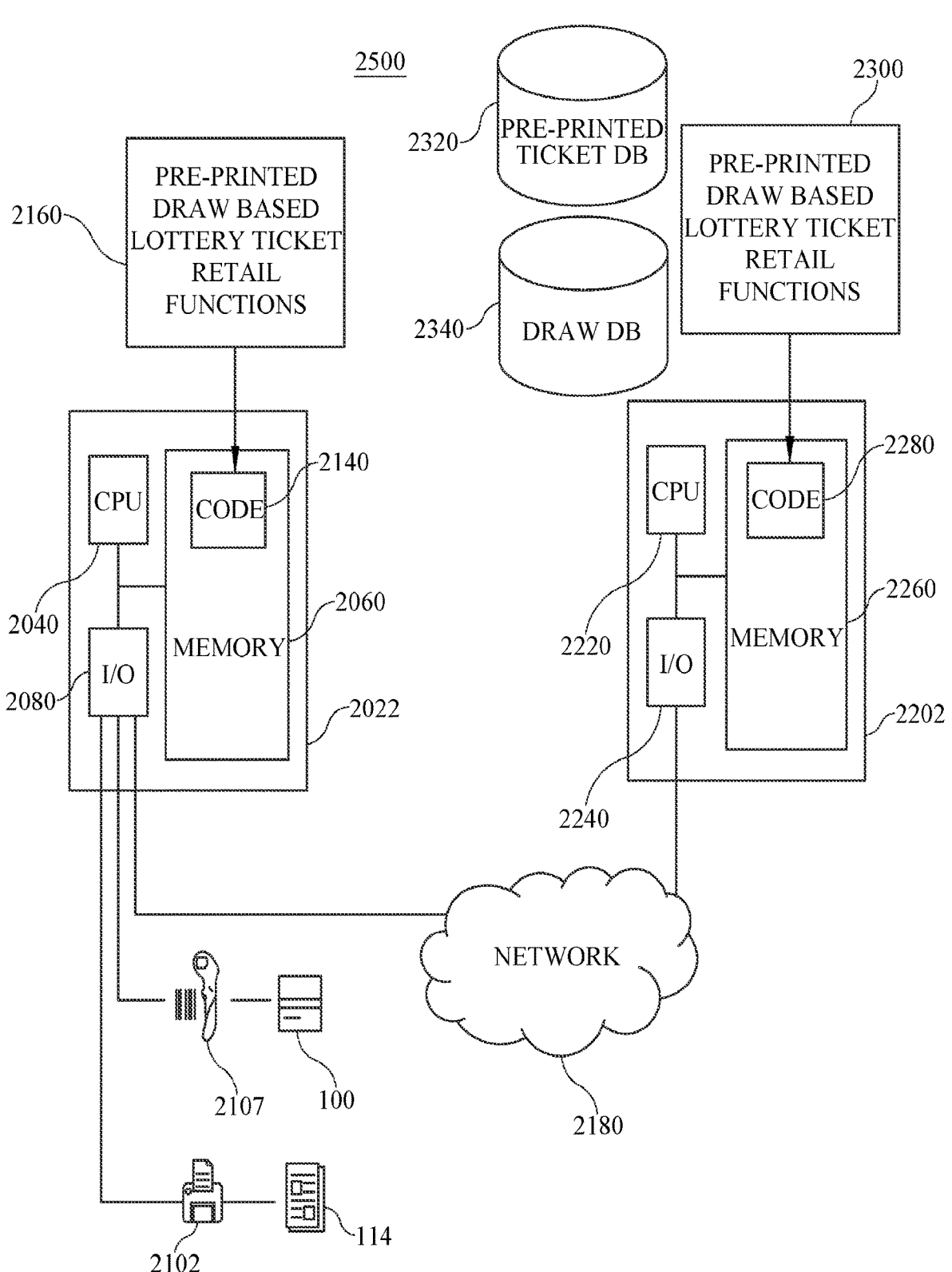
FIG. 5B illustrates components of a point of sale and central gaming system according to an embodiment of the disclosure.

FIG. 5B illustrates an embodiment of a pre-printed lottery ticket processing system 2500 for processing draw-type pre-printed lottery tickets 100, virtual draw-type pre-selected lottery tickets 102, instant-win-type pre-printed lottery tickets 300, and virtual instant-win-type pre-selected lottery tickets 302.

As illustrated, pre-printed lottery ticket processing system 2500 includes a retailer's point of sale terminal 2022 and a central gaming system 2202 connected to each other through one or more communication networks 2180. The communication between retail POS terminals and the central gaming system may be secured using various encryption techniques.

The retailer's POS terminal 2022 may include a central processing unit (CPU) 2040, memory unit 2060 and I/O interface(s) 2080 for communicating with devices external to the POS terminal. As illustrated, a barcode scanner 2107 may be connected for scanning in barcode information, such as Universal Product Code information, and pre-printed ticket information. The retailer POS terminal may also be connected to a printer 2102 for printing a receipt 114 of the transaction. The POS terminal 2022 includes instructions 2140 stored in the memory unit 2060, which when executed by the processor unit 2040 configure the POS terminal 2022 to provide pre-printed draw-based lottery ticketing functionality 2160. The functionality 2160 may provide the functionality for communicating scanned in barcode information of pre-printed lottery tickets with the central gaming system 2202, and receiving confirmation of the pre-printed ticket's activation, as described herein.

The central gaming system 2202 may include a central processing unit (CPU) 2220, memory unit 2260 and I/O interface(s) 2240 for communicating with devices external to the central gaming system 2202. Instructions 2280 stored in the memory unit 2260, when executed by the processing unit 2220 configure the central gaming system 2202 to provide pre-printed draw-based lottery ticket activation and cancellation functionality 2300. The functionality 2300 may receive and verify pre-printed lottery ticket information from a plurality of different retailers. The verification of the pre-printed lottery ticket information may involve checking that the received information corresponds to an actual ticket, verifying one or more check-digits, and/or verifying that the pre-printed lottery ticket was distributed to the retailer. The pre-printed ticket information used in verifying the received information may be stored in a pre-printed ticket information database 2320. The functionality 2300 may also generate draw and wager information and associate the pre-printed ticket information in a draw information database 2340. The draw information database 2340 may be used in verifying subsequent tickets, including the pre-printed lottery tickets, as winning tickets following the draw event.

Figure 5C:
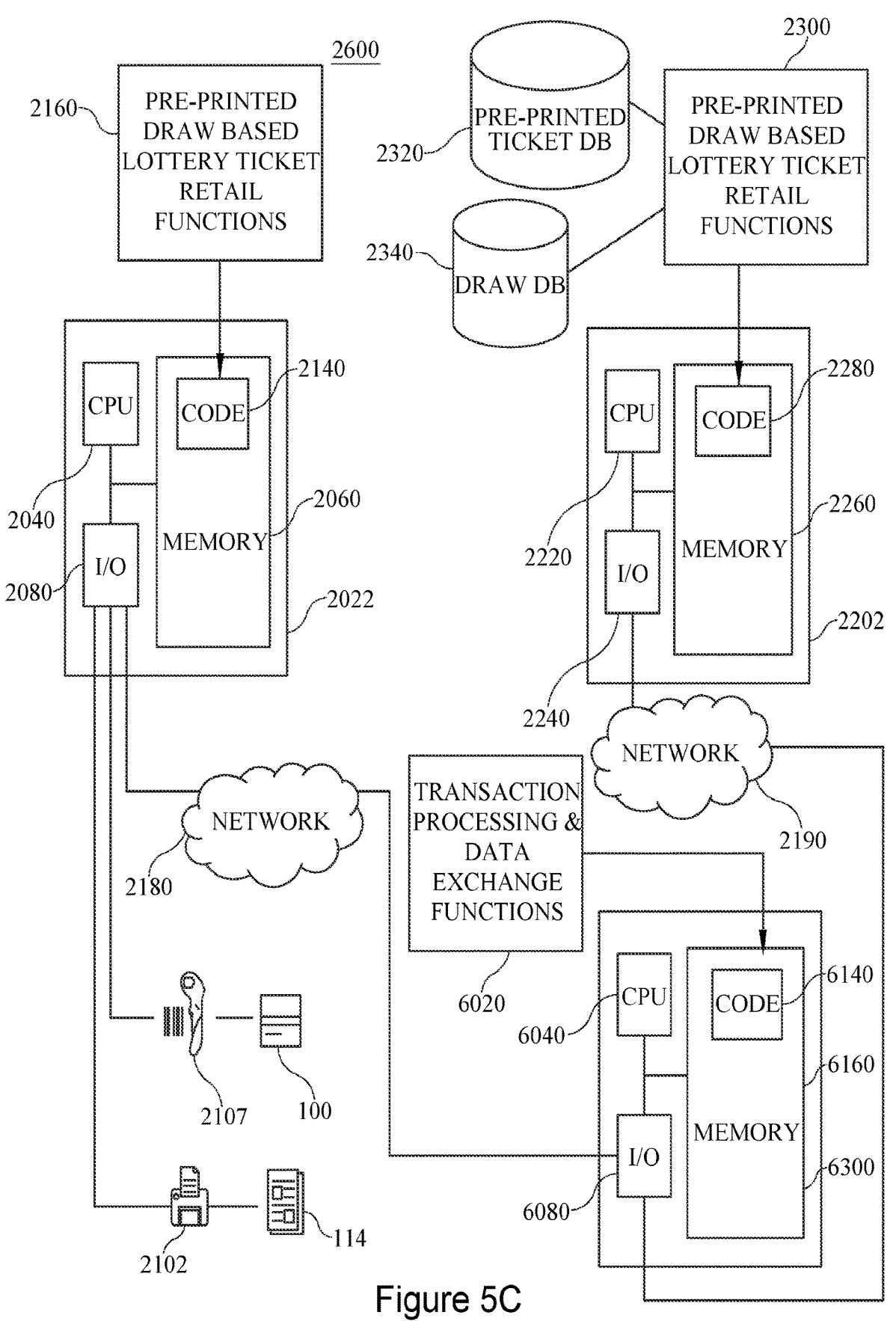
FIG. 5C illustrates components of a point of sale, lottery system, and central gaming system according to an embodiment of the disclosure.

FIG. 5C illustrates an embodiment of a pre-printed lottery ticket processing system 2600 for processing draw-type pre-printed lottery tickets 100, virtual draw-type pre-selected lottery tickets 102, instant-win-type pre-printed lottery tickets 300, and virtual instant-win-type pre-selected lottery tickets 302.

As illustrated, pre-printed lottery ticket processing system 2500 includes a retailer's point of sale terminal 2022 for the sale of the pre-printed ticket 100, a central gaming system 2202 for the generation and activation of pre-printed ticket wagers and draw date and a lottery system 6300 to facilitate the exchange of data between the retailer's point of sale 2022 and the central gaming system 2202 each connected to one other through one or more communication networks 2180; 2190. The communication between retail POS terminals 2022, the lottery system 6300, and the central gaming system 2202 may be secured using various encryption techniques.

The retailer's POS terminal 2022 may include a central processing unit (CPU) 2040, memory unit 2060 and I/O interface(s) 2080 for communicating with devices external to the POS terminal. As depicted, a barcode scanner 2107 may be connected for scanning in barcode information, such as Universal Product Code information, and pre-printed ticket information. The retailer POS terminal may also be connected to a printer 2102 for printing a receipt 114 of the transaction. The POS terminal 2022 includes instructions 2140 stored in the memory unit 2060, which when executed by the processor unit 2040 configure the POS terminal 2022 to provide pre-printed draw-based lottery ticketing functionality 2160. The functionality 2160 may provide the functionality for communicating scanned in barcode information of pre-printed lottery tickets to the lottery system 6300, and receiving confirmation of the pre-printed ticket's activation, as described herein.

The central gaming system 2202 may include a central processing unit (CPU) 2220, memory unit 2260 and I/O interface(s) 2240 for communicating with devices external to the central gaming system 2202. Instructions 2280 stored in the memory unit 2260, when executed by the processing unit 2220 configure the central gaming system 2202 to provide pre-printed draw-based lottery ticket activation and cancellation functionality 2300. The functionality 2300 may receive and verify pre-printed lottery ticket information from a plurality of different retailers. The verification of the pre-printed lottery ticket information may involve checking that the received information corresponds to an actual ticket, verifying one or more check-digits, and/or verifying that the pre-printed lottery ticket was distributed to the retailer. The pre-printed ticket information used in verifying the received information may be stored in a pre-printed ticket information database 2320. The functionality 2300 may also generate draw and wager information and associate the pre-printed ticket information in a draw information database 2340. The draw information database 2340 may be used in verifying subsequent tickets, including the pre-printed lottery tickets, as winning tickets following the draw event.

The lottery system 6300 may include a central processing unit (CPU) 6040, memory unit 6160 and I/O interface(s) 6080 for communicating with devices external to the transaction processor system 6300. Instructions 6140 stored in the memory unit 6160, when executed by the processing unit 6040 provide transaction processing and data exchange functionality 6020. The functionality 6020 may process transactions and exchange data from a plurality of different retailers to a central gaming system 2202 (or in other embodiments to a plurality of different central gaming systems). Instructions 6140 may include any functionality necessary for the successful exchange of data and the activation or cancellation of the pre-printed ticket 100.

Figure 6:
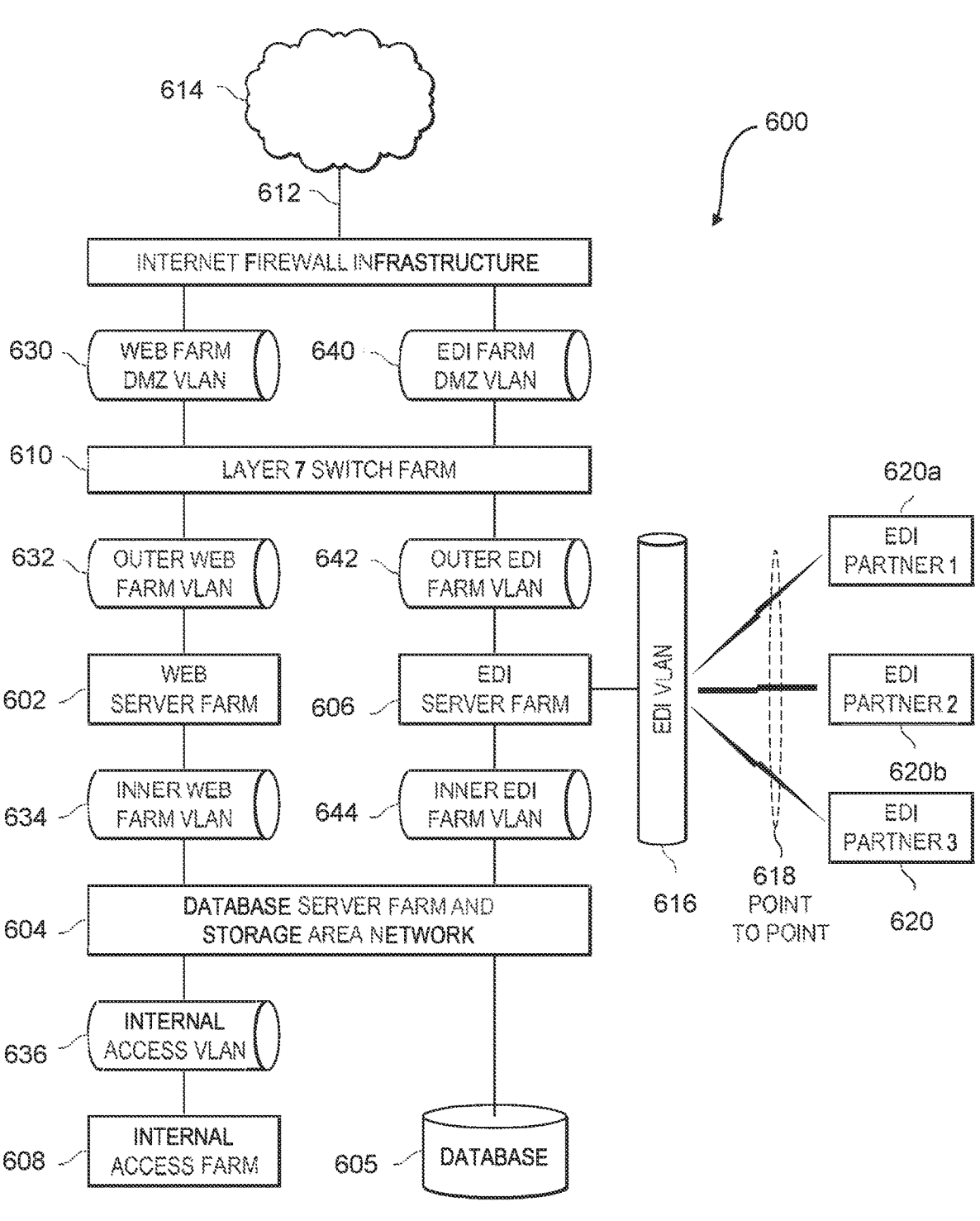
FIG. 6 illustrates a system network that may be used to implement an embodiment of the lottery system of FIGS. 5A, 5B, 5C and FIG. 17.

FIG. 6 is a block diagram of an example system network 600 that may be used to implement an embodiment of the of a pre-printed lottery ticket processing systems of FIGS. 5A, 5B, 5C, and FIG. 17. Those of ordinary skill in the art will appreciate that the system network 600 in FIG. 6 is described to illustrate one example of a network that may be used to implement the systems described with reference to FIGS. 5A, 5B, 5C, and FIG. 17. Many other network architectures not described here may be used as well. In the embodiment of FIG. 6, the system network 600 includes a web server farm 602, a database server farm 604, an electronic data interchange (EDI) farm 606, and an internal access server farm 608. The system network 600 includes a layer 7 switch farm 610 and an Internet firewall infrastructure 612, for example, to implement a consumer front-end over the Internet 614. The consumer front-end may be implemented as a site on the World Wide Web. The system network 600 also includes an EDI virtual local area network (VLAN) 616 with point-to-point connections 618 to EDI partners 620a, 620b, 620c.

In general, the system network 600 in FIG. 6 includes remote and local infrastructure. Connectivity to the system network 600 may be provided by co-location facilities hosting the remote infrastructure. Remote infrastructure includes servers, routers, databases and other network entities that are geographically distributed as needed to provide access to partners and/or to consumers. The remote infrastructure includes devices that may fall under a functional class and may be distributed in the system network 600 as a farm (e.g. web server farm, EDI server farm, etc.). Local infrastructure may include servers, routers, databases, and other network entities that provide limited, primarily internal access within the system, for example, for resource management. Local infrastructure may also be geographically distributed with access limited by network design (e.g. completely internally accessed databases may be maintained within an Intranet).

The system network 600 in FIG. 6 implements a logical separation of server systems based upon type and manner of access. This introduces multiple layers of access, and in turn, provides a deeper layer of security, even within the system network 600. The system network 600 includes a general vertical depth of separation of service and levels of security allowing for several layers of access. The layers of access range from the consumer front-end (via the Internet 614), which is at the forefront and has the lightest layer of security, to a system database 605, which is at the deepest layer of access and security.

The layers of access are implemented as virtual local area networks (VLANs) having no real access to one another except through routing done by routing modules on the network switches. Each VLAN may be configured appropriately to limit access according to the appropriate level of security. The levels of security correspond in general to four tiers of network entities: the presentation tier, the business logic tier, the data access tier, and the data tier.

At the top level of access (for the consumer front-end), the presentation tier is responsible for delivery of data to end clients. The end clients may be consumers or partners 620*a*, 620*b*, 620*c*. In the presentation tier, data is formatted for communication with the business logic tier of applications that processes requests and handles data delivery to the client applications. Data in the presentation tier may be in XML format along with XSLT stylesheets to allow rendering by client applications. The presentation tier operations, generally, in a layer of servers from the web server farm 602 that resides in a DMZ (DeMilitarized Zone) network. These servers in the DMZ network may be accessed using a web farm DMZ VLAN 630 and the Layer 7 switch farm 610. The DMZ network servers operate as proxy servers between consumers and the enterprise infrastructure.

The next layer of access includes servers in the web server farm 602 that form the business logic tier. The business logic tier includes application code (Beans) that will handle requests from client applications (such as web browsers) and make requests to the Data Access Tier for relevant data. It will then process the data and deliver it for presentation to the client applications. The business logic tier is kept separate from interaction with consumers to preserve integrity of the applications and access to the database 605. Added security may be provided by an outer web farm VLAN 632.

In the next layer, the data access tier may make requests directly to the Data Tier (or the database 605). The data access tier may be separate from the business logic tier of applications to differentiate how the data is stored and how it is retrieved from certain platforms. Security may be configured with an inner web farm VLAN 634.

The data tier is in the last layer of security, which includes the database 605, and which has the tightest security to protect the most critical data. Security may be configured with an internal access VLAN 636.

The system network 600 includes a general horizontal separation of EDI partnerships, which are logical VLANs that separate access by each partner 620*a*, 620*b*, 620*c* to the infrastructure of the example system for implementing the disclosed lottery system/systems using the system network 600. In general, a partner may access their own private VLAN at 616 and 618 into the system network 600 infrastructure through a VPN concentrator or routed through a routing module on the backbone switch. This structure may isolate potential security breaches from single partners 620*a*, 620*b*, 620*c*. It may also prevent any partner 620*a*, 620*b*, 620*c* from being able to access rival partner data from the system network 600.

The EDI partner access to the system network 600 may also be layered vertically according to level of security. An EDI farm DMZ VLAN 640 provides the lowest level of security at the consumer front-end for access to the EDI server farm 606. The outer EDI farm VLAN 642 provides a higher level of security at a business logic level similar to the business logic tier described above with reference to the web server farm 602. The highest level of security is provided at the inner EDI farm VLAN 644 for access to more critical data via the database server farm 604.

Connectivity to the system network 600 may be provided by co-location facilities hosting the remote infrastructure. Connectivity may be provided by Tier 1 Internet Backbone providers to ensure access to most networks without having to transcend networks in order to provide the shortest network path from Leverage Consumer to Leverage Infrastructure. Besides utilizing connectivity to Tier 1 providers and managing complex BGP routes to the Internet Backbone, a backup connection to InterNAP will also be established.

In the example system for implementing an embodiment of the disclosed system, the complex backbone connections force the infrastructure to appear "local" to the consumers accessing the system network 600 via their host ISPs. This prevents the consumer from transcending networks between peer networks and eventually experience degraded network performance.

The web server farm 602 includes two banks of servers for serving either static or dynamic content. Each bank may be designated as either the static web farm or the dynamic web farm. The static web farm may service client requests for static content that is neither database-generated nor does it use any type of server content processing and generation before being transmitted through the Internet to the client applications (e.g. web browser). Such examples of content would be images, video, or web templates. The dynamic web farm may be designed to serve dynamic content generated in multiple ways, whether that is done via XML/XLS transformation, server-side scripting, or through middle-tier applications that directly interfaces with the database 605.

The web server farm 602 may be implemented using any suitable hardware and software systems implementing server functions. In one example implementation, the web server farm 602 is implemented with Sun® multiprocessor blade servers (Sun® is a registered trademark of Oracle America, Inc.) running either the Solaris® (Solaris® is a registered trademark of Oracle America, Inc.) operating system or Red Hat® Enterprise Linux™ operating system (Red Hat® Enterprise Linux™ are trademarks of Red Hat, Inc.). The example implementation of the web server farm 602 also includes the Zeus® web server (ZWS) application (Zeus® is a registered trademark of Marden-Kane, Inc.). Like the Apache® web server Apache Micro Peripherals, Inc.), the ZWS is a robust, commercial-grade, full-featured and highly efficient web server software. However, ZWS is multi-threaded to leverage the symmetric multiprocessing nature of multi-cored hardware platforms, which increases the response times and load servicing for client requests. The web server farm 602 will also house the Java application server software (Java® is a registered trademark of Oracle America, Inc.) that operates the applications to service consumer requests on the enterprise website. The Java® application server software may be a combination of Apache® Tomcat for simple Java® applications and JBoss Application Server software for J2EE applications.

It is to be understood that specific implementations of the web server farm 602 may use any suitable hardware and software systems. The hardware and software systems described above are merely examples of the types of hardware and software systems that may be used.

The database server farm 604 may store data specific to consumer front-end interactions and the EDI partner data collected from partners 620*a*, 620*b*, 620*c*. The database server farm 604 may be implemented using any suitable hardware and software systems configured to operate as database servers. In one example implementation, the database server farm 604 is implemented using Sun multiprocessor Enterprise servers banked with multi-core processors and full redundant power and mirrored drives for the operating system and database application. Depending upon the nature of the application and the database 605 that is needed to interface against such applications, the database server farm 604 may run either the Oracle Database Server product or the MySQL Database server product. Also, depending upon the nature of the data that is being stored, highly complex relational database tables may use Oracle while simplistic database schemas may use MySQL. The database server applications may be clustered to ensure high availability and fault tolerance. This will also provide application load balancing among the database server farm 604.

The database 605 for the database server farm 604 may reside in a SAN (Storage Area Network) solution that will offer both high availability and fault tolerance.

It is to be understood that specific implementations of the database server farm 604 may use any suitable hardware and software systems. The hardware and software systems described above are merely examples of the types of hardware and software systems that may be used.

The EDI (Electronic Data Interchange) farm 606 may be designated in the system network 600 to communicate with partners 620a, 620b, 620c. The EDI farm servers 606 may have different applications and permissions from the web server farm 602 to access and process, as well as store, data within the database farm 604. The nature of the applications operating on the EDI farm servers 606 may have more direct access to the database 605 to increase efficiency in data processing and storage. The EDI farm servers 606 may reside in a private VLANs (Virtual Local Area Networks) that can only be accessed via VPN (Virtual Private Network) Concentrators or through specific Point-to-Point access into the VLAN as shown at 616 and 618.

The EDI farm servers 606 may be implemented using any suitable hardware and software system configured to operate server functions. In an example implementation, the EDI server farm 606 is implemented using the same platform as that of the web server farm 602 or by running IBM Mainframes. The EDI farm servers 606 software in the example implementation may also be similar to that of the web server farm 602 software. If the EDI farm servers 606 include IBM Mainframes, then the hardware will run IBM AIX operating systems, and the EDI farm servers 606 will run IBM Websphere Application Server software.

It is to be understood that specific implementations of the EDI server farm 606 may use any suitable hardware and software systems. The hardware and software systems described above are merely examples of the types of hardware and software systems that may be used.

The internal access farm servers 608 may also resemble the web server farm 602 in platform, software, and resource architecture. However, like the EDI farm servers 606, the applications will be tailored for internal access from an enterprise Intranet. Such applications may include data mining and statistical information for marketing and sales.

Referring again to FIG. 5A, in some embodiments, the lottery system 520 may be configured for communication with one or more information datastores, e.g., datastore 530. Datastore 530 may contain separate sub-datastores 530a and 530b. In an embodiment, separate sub-datastores 530a and 530b may individually or collectively include an entry for each of the pre-printed lottery tickets offered for sale the retailer 301 or multiple retailers. In an embodiment ticket information used in verifying information may be stored in a ticket information database, e.g., datastore 530a. Draw and wager information may be stored in a lottery information database, e.g., datastore 530b. The lottery information database 530b may be used in verifying subsequent tickets, including the pre-printed lottery tickets, as winning tickets following the draw event.

Also, in some embodiments, the lottery system 520 may be configured for communication with at least one CGS 540 (e.g., at least one of 540a, 540b, and 540c). Generally, lottery jurisdictions (e.g., a states) use various CGSs to manage the drawings associated with a lottery. In various embodiments, the lottery system 520 is configured to utilize one or more application programming interfaces (APIs) that are each configured to allow the lottery system 520 to interface and/or interact with a particular CGS (e.g., 540a, 540b, 540c). For example, in the embodiment of FIG. 5A the lottery system 520 utilize each of a first API 525a, a second API 525b, and a third API 525c to interface and/or interact with each of a first CGS 540a, a second CGS 540b, and a third CGS 540c. For example, one of the first API 525a, second API 525b, or third API 525c may allow the lottery system 520 to enter the play-selections into a particular draw for a particular lottery with one of the first CGS 540a, the second CGS 540b, or the third CGS 540c.

In some embodiments, the CGSs 540 may be configured for communication with one or more information datastores, e.g., datastore 545. Datastore 545 may contain separate sub-datastores 545a and 545b. I an embodiment, separate sub-datastores 545a and 545b may individually or collectively include an entry for each of the pre-printed lottery tickets offered for sale the retailer 301 or multiple retailers. In an embodiment ticket information used in verifying information may be stored in a ticket information database, e.g., datastore 545a. Draw and wager information may be stored in a lottery information database, e.g., datastore 545b. The lottery information database 545b may be used in verifying subsequent tickets, including the pre-printed lottery tickets, as winning tickets following the draw event.

Also disclosed herein are embodiments of methods related to processing a transaction with respect to a pre-printed lottery ticket (and/or a virtual pre-selected lottery ticket), for example, the draw-type pre-printed lottery ticket 100 of FIGS. 1 and 2 and/or the instant-win-type pre-printed lottery ticket 300 of FIGS. 3 and 4. In various embodiments, the transaction being processed may be the activation of a lottery ticket (such as by enrollment of the lottery ticket in a particular drawing), the reactivation and/or reenrollment of a lottery ticket, the confirmation of the activation or enrollment of a lottery ticket, the provision of a draw-date of in which a lottery ticket is enrolled, or the provision of attributes to a purchaser to enable the purchaser to enable the purchaser to determine whether a lottery ticket is a winning ticket.

Referring to FIG. 7A, an embodiment of a method 700 for activation of a draw-type pre-printed lottery ticket is shown. The method 700 of FIG. 7A is disclosed with reference to the draw-type pre-printed lottery ticket 100 of FIGS. 1 and 2 and the pre-printed lottery ticket processing system 500 of FIG. 5A, though the method 700 may be similarly carried-out with respect to alternative embodiments of draw-type pre-printed lottery ticket, a virtual draw-type pre-selected lottery ticket 102, and/or other embodiments of pre-printed lottery ticket processing systems.

In the embodiment of FIG. 7A, once the draw-type pre-printed lottery ticket 100 has been manufactured, the draw-type pre-printed lottery ticket 100 may be distributed to a retailer 501.

At block 701, the method 700 begins when a purchaser selects the draw-type pre-printed lottery ticket 100, which may be displayed at the retailer 501 and, at block 702, the purchaser proceeds to the POS terminal 502 and presents the draw-type pre-printed lottery ticket 100 to the cashier to be scanned and purchased. At block 703, at the POS terminal 502, the activation code 210 may be read, such as via the I/O interface(s) 508 or, alternatively, manually input at the POS terminal 502. At block 704, the POS terminal 502 displays the total due for the order. For example, the UPC associated with the pre-printed lottery ticket 100 may be read, for example, to determine price for the draw-type pre-printed lottery ticket 100. At block 705, the purchaser pays the amount due and at block 706, the cashier then accepts the tender and updates the payment into the POS terminal 502.

In an embodiment where the lottery ticket is a virtual draw-type pre-selected lottery ticket 102, the virtual draw-type pre-selected lottery ticket 102 may be purchased by a consumer (e.g., a purchaser), wherein a consumer's electronic device (serving as a point of sale), e.g., consumer's device 200, accesses an electronic marketplace for virtual draw-type pre-selected lottery tickets and wherein the electronic marketplace is accessible via a website, application, or the like. Upon completion of the virtual draw-type pre-selected lottery ticket 102 purchase, the virtual draw-type pre-selected lottery ticket 102 is electronically delivered to the consumer's device 200.

At block 707, the POS terminal 502 generates a transaction request, particularly, an activation request, and communicates the activation request to the lottery system 520. The activation request may also constitute an enrollment request, for example, a request that each the play-selections 120 associated with the draw-type pre-printed lottery ticket 100 being enrolled be entered for a drawing of a lottery. The activation request may comprise, in addition to information uniquely identifying the draw-type pre-printed lottery ticket 100 being purchased, the encrypted control number 130 for the draw-type pre-printed lottery ticket 100 being purchased, information identifying the retailer 501, information identifying the POS terminal 502, information identifying the jurisdiction (e.g., the state) in which the draw-type pre-printed lottery ticket 100 is being purchased, or combinations thereof.

In an embodiment where the lottery ticket is a virtual draw-type pre-selected lottery ticket 102, the consumer's device 200 (e.g., serving as POS terminal 502) generates a transaction request, particularly, an activation request, and communicates the activation request to the lottery system 520. The activation request may also constitute an enrollment request, for example, a request that each the play-selections 120 associated with the virtual draw-type pre-selected lottery ticket 102 being enrolled be entered for a drawing of a lottery. The activation request may comprise, in addition to information uniquely identifying the draw-type pre-selected lottery ticket being purchased, the encrypted control number 130 for the draw-type pre-selected lottery ticket being purchased, information identifying the retailer 501, information identifying the consumer's device 200, information identifying the jurisdiction (e.g., the state) in which the draw-type pre-selected lottery ticket is being purchased, information identifying the geographic location (e.g. GPS coordinates) of the consumer's device 200 which is purchasing the virtual draw-type pre-selected lottery ticket 102, or combinations thereof.

Upon receipt of the activation request, at block 708, the lottery system 520 may access one or more records associated with the draw-type pre-printed lottery ticket 100 referenced in the activation request and determine the validity of the activation request received from the POS terminal 502. In various embodiments, the lottery system 520 may determine the validity of the activation request based upon (i) whether or not the draw-type pre-printed lottery ticket 100 referenced in the activation request has been previously activated or enrolled in a lottery drawing; (ii) whether or not a retailer associated with the draw-type pre-printed lottery ticket 100 referenced in the activation request is consistent with the retailer referenced in the activation request; (iii) whether or not a POS terminal associated with the draw-type pre-printed lottery ticket 100 referenced in the activation request is consistent with the POS terminal 502 referenced in the activation request; (iv) whether or not a jurisdiction associated with the draw-type pre-printed lottery ticket 100 referenced in the activation request is consistent with the jurisdiction referenced in the activation request; (v) whether or not the geographic location of the POS terminal associated with the purchase of the draw-type pre-printed lottery ticket 100 corresponds to a geographic location approved for the sale of the draw-type pre-printed lottery ticket 100, or (vi) combinations thereof.

In an embodiment where the lottery ticket is a virtual draw-type pre-selected lottery ticket 102, upon receipt of the activation request, the lottery system 520 may access one or more records associated with the virtual draw-type pre-selected lottery ticket 102 referenced in the activation request and determine the validity of the activation request received from the consumer's device 200 (serving as the POS terminal 502). In various embodiments, the lottery system 520 may determine the validity of the activation request based upon (i) whether or not the virtual draw-type pre-selected lottery ticket 102 referenced in the activation request has been previously activated or enrolled in a lottery drawing; (ii) whether or not a retailer associated with the virtual draw-type pre-selected lottery ticket 102 referenced in the activation request is consistent with the retailer referenced in the activation request; (iii) whether or not the consumer's device 200 associated with the virtual draw-type pre-selected lottery ticket 102 referenced in the activation request is consistent with the consumer's device 200 referenced in the activation request; (iv) whether or not a jurisdiction associated with the virtual draw-type pre-selected lottery ticket 102 referenced in the activation request is consistent with the jurisdiction referenced in the activation request; (v) whether or not the geographic location of the consumer's device 200 associated with the purchase of the virtual draw-type pre-selected lottery ticket 102 corresponds to a geographic location approved for the sale of the virtual draw-type pre-selected lottery ticket 102, or (vi) combinations thereof.

Upon a determination that the activation request is valid, at block 709, the lottery system 520 may determine the play selections 120 associated with the draw-type pre-printed lottery ticket 100 referenced in the activation request, for example, which may be stored in the one or more records associated with the draw-type pre-printed lottery ticket 100. At block 710, the lottery system 520 may also determine the CGS responsible for administering the lottery for the jurisdiction associated with the draw-type pre-printed lottery ticket 100 (e.g., the first CGS 540a), for example, which may also be stored in the one or more records associated with the draw-type pre-printed lottery ticket 100. At block 711, the lottery system 520 may also interact with the first CGS 540a, via the first API 525a, to enroll the play selections 120 in the next available drawing for the lottery with which the draw-type pre-printed lottery ticket 100 is associated. For instance, the lottery system 520 may employ a "cut-off" time prior which the play selections 120 will be enrolled in a particular drawing and subsequent to which the play selections 120 will be enrolled in a drawing subsequent to that drawing (e.g., the next available drawing).

In an embodiment where the lottery ticket is a virtual draw-type pre-selected lottery ticket 102, upon a determination that the activation request is valid, the lottery system 520 may determine the play selections 120 associated with the virtual draw-type pre-selected lottery ticket 102 referenced in the activation request, for example, which may be stored in the one or more records associated with the virtual draw-type pre-selected lottery ticket 102. The lottery system 520 may also determine the CGS responsible for administering the lottery for the jurisdiction associated with the virtual draw-type pre-selected lottery ticket 102 (e.g., the first CGS 540*a*), for example, which may also be stored in the one or more records associated with the virtual draw-type pre-selected lottery ticket 102. The lottery system 520 may also interact with the first CGS 540*a*, via the first API 525*a*, to enroll the play selections 120 in the next available drawing for the lottery with which the virtual draw-type pre-selected lottery ticket 102 is associated. For instance, the lottery system 520 may employ a "cut-off" time prior which the play selections 120 will be enrolled in a particular drawing and subsequent to which the play selections 120 will be enrolled in a drawing subsequent to that drawing (e.g., the next available drawing).

If the enrollment in the drawing is successful, at block 712, the lottery system 520 may receive an enrollment confirmation from the first CGS 540*a*, which may include an indication of the drawing (e.g., the date and/or time of the drawing) in which the play selections 120 were enrolled. Alternatively, if the enrollment in the drawing is unsuccessful, the lottery system 520 may either receive an indication from the first CGS 540*a* that the enrollment was not successful or fail to receive an enrollment confirmation within a predetermined time-period, thus indicating that the enrollment was unsuccessful.

In an embodiment where the lottery ticket is a virtual draw-type pre-selected lottery ticket 102, if the enrollment in the drawing is successful, the lottery system 520 may receive an enrollment confirmation from the first CGS 540*a*, which may include an indication of the drawing (e.g., the date and/or time of the drawing) in which the play selections 120 were enrolled. Alternatively, if the enrollment in the drawing is unsuccessful, the lottery system 520 may either receive an indication from the first CGS 540*a* that the enrollment was not successful or fail to receive an enrollment confirmation within a predetermined time-period, thus indicating that the enrollment was unsuccessful.

At block 713, the lottery system 520 may store the enrollment confirmation received from the first CGS 540*a* in association with one or more of the records associated with the draw-type pre-printed lottery ticket 100, for example, the indication that the play selections 120 have been successfully enrolled and the date and/or time of the drawing.

In an embodiment where the lottery ticket is a virtual draw-type pre-selected lottery ticket 102, the lottery system 520 may store the enrollment confirmation received from the first CGS 540*a* in association with one or more of the records associated with the virtual draw-type pre-selected lottery ticket 102, for example, the indication that the play selections 120 have been successfully enrolled and the date and/or time of the drawing.

At block 714, if the enrollment in the drawing is successful, the lottery system 520 may communicate an enrollment confirmation to the POS terminal 502, which may include an indication of the drawing (e.g., the date and/or time of the drawing) in which the play selections 120 were enrolled. Alternatively, if the enrollment in the drawing is unsuccessful, the lottery system 520 may either communicate an indication to the POS terminal 502 that the enrollment was not successful or fail to communicate an enrollment confirmation within a predetermined time-period, thus indicating that the enrollment was unsuccessful. If the enrollment is unsuccessful, the funds may be returned to the purchaser and the transaction canceled. In some embodiments, in order to allow for the possibility that an enrollment may be unsuccessful, any store-and-forward functionality of the POS terminal may be disabled.

In an embodiment where the lottery ticket is a virtual draw-type pre-selected lottery ticket 102, if the enrollment in the drawing is successful, the lottery system 520 may communicate an enrollment confirmation to the consumer's device 200 (e.g. serving as the POS 502), which may include an indication of the drawing (e.g., the date and/or time of the drawing) in which the play selections 120 were enrolled. Alternatively, if the enrollment in the drawing is unsuccessful, the lottery system 520 may either communicate an indication to the consumer's device 200 (e.g. serving as the POS 502) that the enrollment was not successful or fail to communicate an enrollment confirmation within a predetermined time-period, thus indicating that the enrollment was unsuccessful. If the enrollment is unsuccessful, the funds may be returned to the consumer and the transaction canceled. In some embodiments, in order to allow for the possibility that an enrollment may be unsuccessful, any store-and-forward functionality of the POS terminal may be disabled.

As disclosed with respect to FIGS. 1A and 2A, the draw-type pre-printed lottery ticket 100 includes confirmation information 230. In some embodiments, the confirmation information 230 may enable a user to verify enrollment in a lottery, to verify a draw date, and/or to enroll in automatic prize notification. For example, through descriptive text, the purchaser of the ticket may be offered multiple ways to enroll in automatic prize notification, including scanning a quick-response response code (e.g., a QR Code®), texting a unique code to a short code, visiting a website, calling in to an inter active voice response system (IVR), and/or some other bi-directional communication channel. Depending on the method selected, the user may enter some indicia allowing the particular draw-type pre-printed lottery ticket 100 to be identified, or in the case of scanning the quick-response response code (e.g., a QR Code®), the unique ticket information may be automatically passed to the system (e.g., lottery system 520 and/or central gaming system 540).

As disclosed with respect to FIGS. 1B and 2B, in an embodiment where the lottery ticket is a virtual draw-type pre-selected lottery ticket 102, the confirmation information 230 may enable a user to verify enrollment in a lottery, to verify a draw date, and/or to enroll in automatic prize notification. For example, through descriptive text, the consumer/purchaser of the ticket may be offered multiple ways to enroll in automatic prize notification, including scanning a quick-response response code (e.g., a QR Code®), texting a unique code to a short code, visiting a website, calling in to an inter active voice response system (IVR), activating a portion the 230 information configured to be activatable (e.g., a button and/or a hyperlink) to automatically verify and/or enroll, and/or some other bi-directional communication channel. Depending on the method selected, the consumer may enter some indicia allowing the particular virtual draw-type pre-selected lottery ticket 102 to be identified, or in the case of scanning the quick-response response code (e.g., a QR Code®), the unique ticket information may be automatically passed to the system (e.g., lottery system 520 and/or central gaming system 540).

In some embodiments, the purchaser can also verify the draw date information at the same time as enrolling in automatic prize notification. After scanning the quick-response response code (e.g., a QR Code®) and/or texting a unique code to the system (e.g., lottery system 520 and/or central gaming system 540), the system would return the draw date information in a format appropriate to the communication channel selected by the purchaser.

In an embodiment where the lottery ticket is a virtual draw-type pre-selected lottery ticket 102, the consumer can also verify the draw date information at the same time as enrolling in automatic prize notification. After scanning the quick-response response code (e.g., a QR Code®), texting a unique code to the system (e.g., lottery system 520 and/or central gaming system 540), activating a functionality on the consumer's device 200 (e.g., a button and/or a hyperlink) to automatically verify and/or enroll, the system would return the draw date information in a format appropriate for the consumer's device 200.

In some embodiments, the draw-type pre-printed lottery ticket 100 and the numbers associated with the ticket may be configured to be able to be entered into a plurality of draws, e.g., a plurality of subsequent draws with the same lottery authority, and/or a plurality of draws with different lottery authorities. In some embodiments, the ticket may comprise a plurality of quick-response response codes associated with each draw. In some embodiments, the ticket may comprise one quick-response response code (e.g., a QR Code®), wherein the quick-response response code (e.g., a QR Code®) directs the user to a webpage where the user may select the plurality of draws desired and/or may see a display with the plurality of draws indicated. In some embodiments, the plurality of draws may be chosen at the time of purchase of the ticket.

In an embodiment where the lottery ticket is a virtual draw-type pre-selected lottery ticket 102, the numbers associated with the virtual draw-type pre-selected lottery ticket 102 may be configured to be able to be entered into a plurality of draws, e.g., a plurality of subsequent draws with the same lottery authority, and/or a plurality of draws with different lottery authorities. In some embodiments, the virtual draw-type pre-selected lottery ticket 102 may comprise a plurality of quick-response response codes associated with each draw. In some embodiments, the virtual draw-type pre-selected lottery ticket 102 may comprise one quick-response response code (e.g., a QR Code®) or activatable button/hyperlink, wherein the quick-response response code (e.g., a QR Code®) or activatable button/hyperlink directs the user to a webpage where the user may select the plurality of draws desired and/or may see a display with the plurality of draws indicated. In some embodiments, the plurality of draws may be chosen at the time of purchase of the virtual draw-type pre-selected lottery ticket 102.

In some embodiments, lottery tickets may not have the draw date printed on the ticket or receipt, but rather, consumers are informed that they are entered into a "next possible draw date." The consumers then have the ability to verify their ticket's particular draw date through a variety of methods. For example, a consumer could visit a website, enter a unique ticket identifier, and then the website would display the draw date information. In addition to websites, consumers could text a unique ticket identifier to a short code and receive back via text the draw information, or the consumers could phone an interactive voice response (IVR) system and speak the unique ticket identifier and have the IVR speak the draw date information. In some embodiments, the consumer could scan a quick-response response code (e.g., a QR Code®) on the lottery ticket to verify the draw date.

A consumer who purchases a lottery ticket and then uses one of these methods to validate a draw date may typically receive back the draw date information. If a user attempts to use one of the methods to validate draw date information, but hasn't purchased that particular lottery ticket, the system might return a message that indicates the lottery ticket hasn't been purchased or some other similar type of response. A bad actor could discern differences in responses between purchased and activated lottery tickets and lottery tickets that have never been purchased.

If a bad actor was interested in committing fraud, such as attempting to counterfeit a lottery ticket, the bad actor might be advantaged if they had knowledge of which lottery tickets have been purchased or not purchased. This is particularly true if the bad actor uses a computer system to automate the process of entering a unique ticket identifier to the system, and then receiving back the system's response confirming draw date and/or if the ticket has been purchased.

Embodiments of the disclosure may prevent or reduce the possibility of a bad actor gathering information about lottery tickets in this way. In some embodiments, a system may comprise a user interface that allows a consumer to enter a unique identifier, e.g. control number 130 or 360, into the system. This user interface is then connected to a database that references the Ticket Draw Date information. In some embodiments, the system may comprise a consumer response system and/or a fraud mitigation system.

In some embodiments, a fraud mitigation system may employ different tools and methods to prevent bad actors from obtaining lottery ticket information. In some embodiments, the fraud mitigation system may comprise one or more fields that are invisible to humans, but visible to automated systems such as bots. Additionally or alternatively, the system could then not return any response where one of these invisible fields is filled in. The fraud mitigation system may comprise captchas. Additionally or alternatively, the fraud mitigation system may comprise human friendly, bot un-friendly questions. The fraud mitigation system may comprise Use Session Tokens that are applied at the site level and required by the user interface in the case of web bases user interfaces.

Figure 7B:
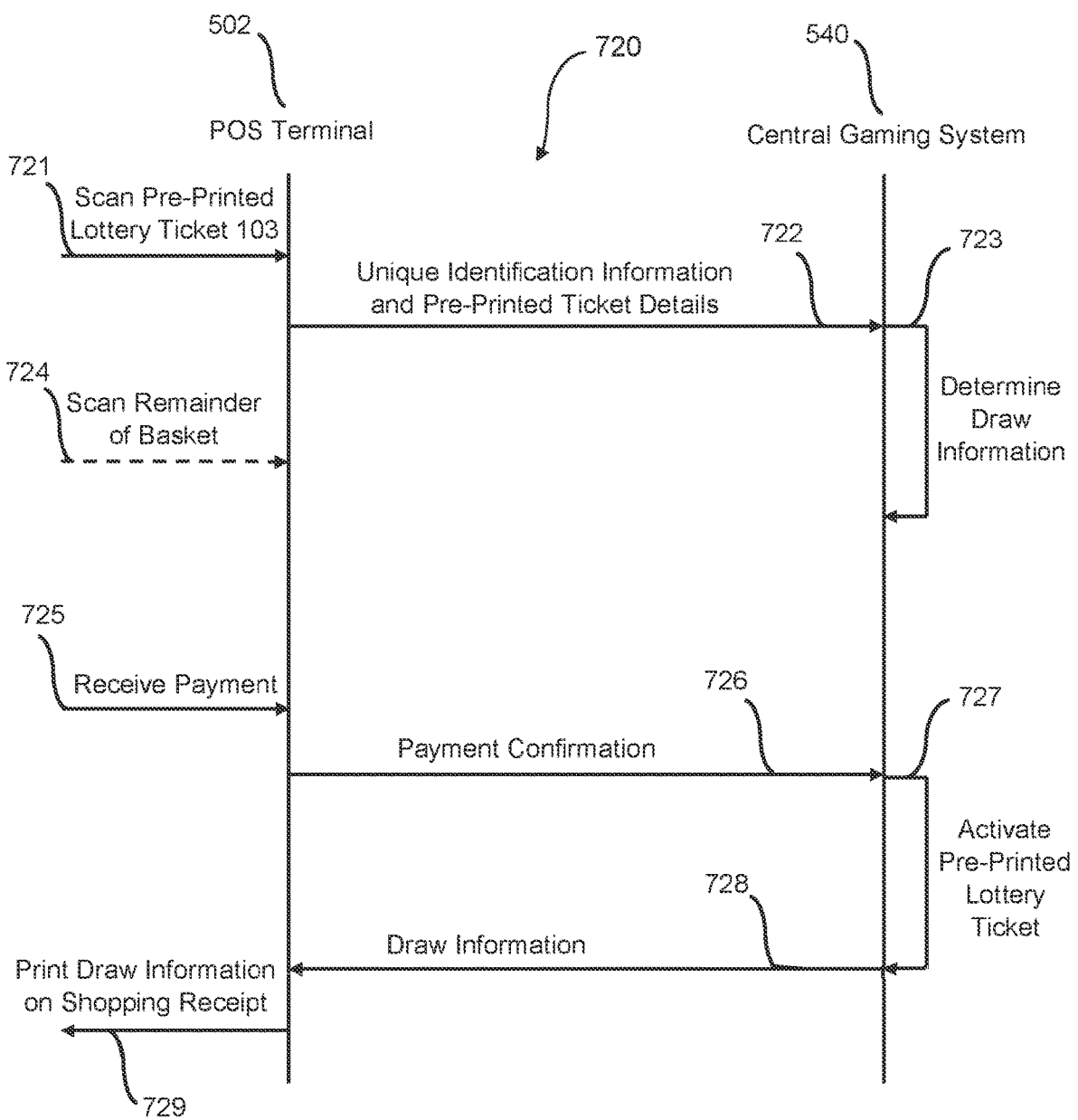
FIG. 7B illustrates an embodiment of a method of activation of a draw-type lottery ticket.

FIG. 7B illustrates an embodiment of a process for providing a ticket for a random draw. The process 720 assumes a consumer is purchasing a number of items including a pre-printed lottery ticket 103. Pre-printed lottery ticket 103 is scanned (721) at a POS terminal 502 and unique identification information and details of the pre-printed ticket 103 is communicated (722) to a central gaming system 540, which verifies (723) the ticket information and determines draw and wager information, if the wager information is not already associated with the ticket information. Additional items being purchased may be scanned (724) by the POS terminal 502, and once all of the items being purchased are scanned, payment may be made (725), for example using cash, credit, or debit. After payment is received, the POS terminal 502 may communicate (726) the payment confirmation to the central gaming system 540, which can activate (727) the pre-printed lottery ticket 103 for the subsequent draw. The draw and wager information may be returned (728) to the POS terminal 502 and printed (729) on the customer's receipt 114. Once activated, the pre-printed ticket 103 serves as a lottery ticket and may be verified as any regular lottery ticket purchased from a lottery terminal.

Figure 7C:
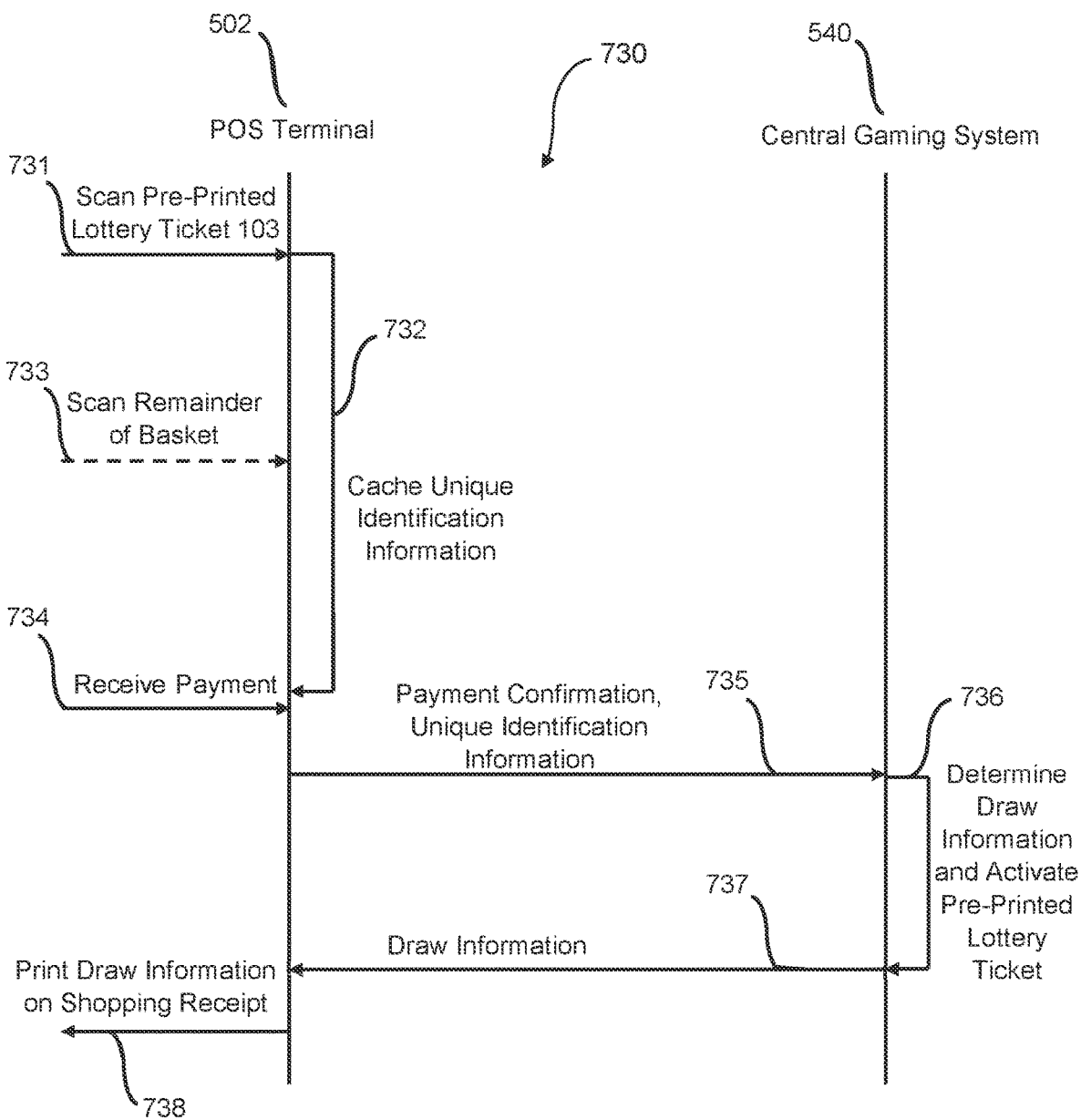
FIG. 7C illustrates an embodiment of a method of activation of a draw-type lottery ticket.

FIG. 7C illustrates an embodiment of a further process for providing a ticket for a random draw. The process 730 is similar to the process 720; however, the unique ID 117 is cached and transmitted with payment confirmation. A preprinted lottery ticket is scanned (731) at a POS terminal 502 and unique identification 117 information along with product information 119 of the pre-printed ticket 103 is cached (732) at the POS terminal 502. Additional items being purchased may be scanned (733) by the POS terminal 502, and once all of the items being purchased are scanned, payment may be made (734), for example using cash, credit, or debit. After payment is received, the POS terminal 502 may communicate the payment conformation (735) and the cached unique identification information 117 of the pre-printed lottery ticket 103 to the central gaming system 540. The central gaming system 540 may receive and verify the ticket information and determine draw and wager information, if the wager information is not already associated with the ticket information and which can activate (736) the pre-printed lottery ticket 103 for the subsequent draw. The draw and or wager information may be returned (737) to the POS terminal 502 and printed (738) on the customer's receipt 114. Once activated, the pre-printed ticket 103 serves as a lottery ticket and may be verified as any regular lottery ticket purchased from a lottery terminal.

Figure 7D:
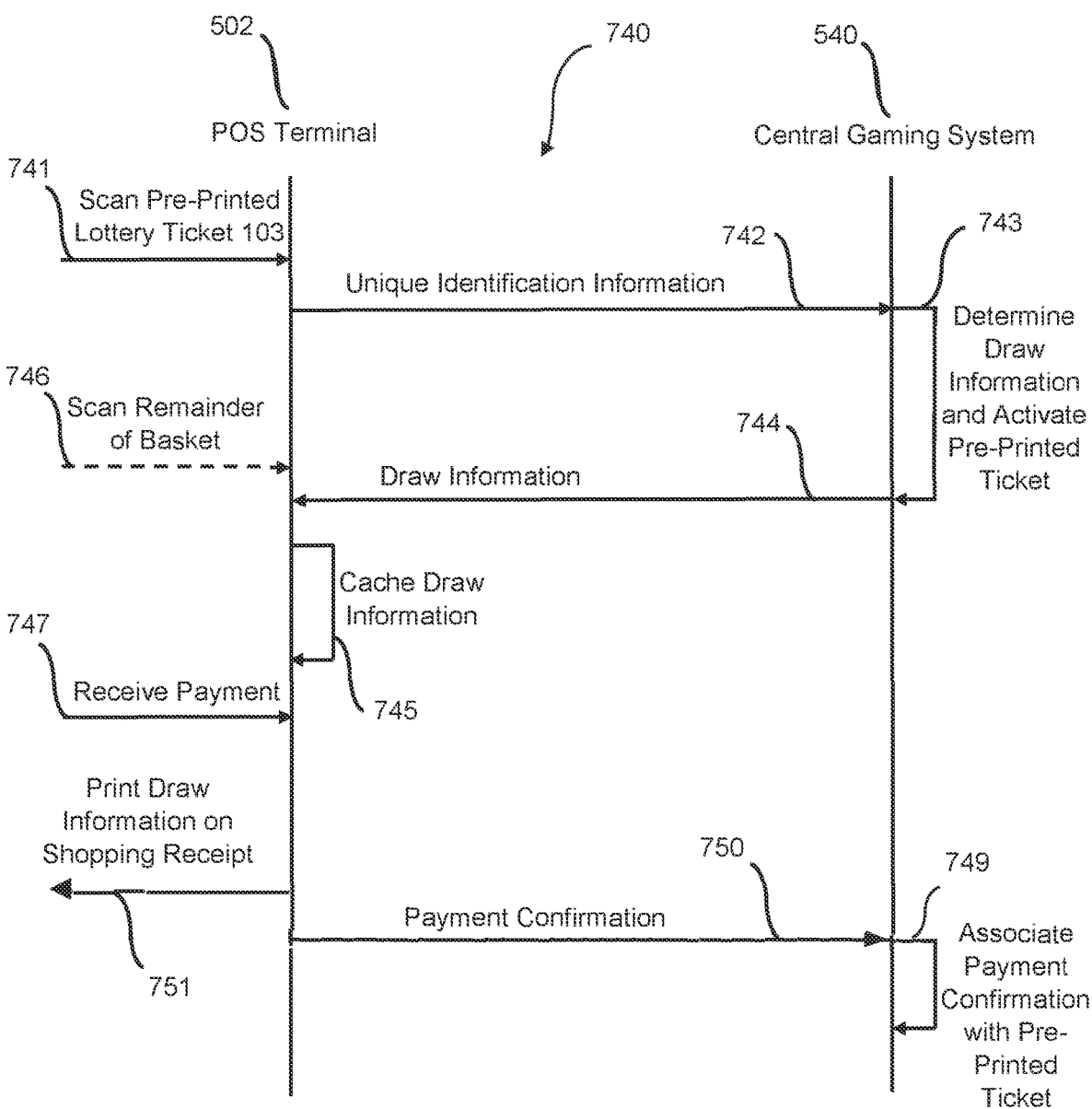
FIG. 7D illustrates an embodiment of a method of activation of a draw-type lottery ticket.

FIG. 7D illustrates an embodiment of a further process for providing a ticket for a random draw. The process 740 is similar to the process 720; however, the determination of the draw and wager information by the central gaming system 540 and communication of the information to the POS 502 is not dependent on the receiving of payment by the POS 502. A pre-printed lottery ticket 103 is scanned (741) at a POS terminal 502 and unique identification information 117 along with product information 119 of the pre-printed ticket 103 is communicated (742) to the central gaming system 540, which verifies the ticket information, determines draw and wager information, if the wager information is not already associated with the ticket information and activates (743) the pre-printed ticket 103. The central gaming system 540 communicates (744) the draw information to the POS 502 where it is cached (745) by POS Terminal 502. Additional items being purchased may be scanned (746) by the POS terminal 502, and once all of the items being purchased are scanned, payment may be made (747), for example using cash, credit, or debit. After payment is received, the POS terminal 502 may communicate (748) the payment conformation to the central gaming system 540, which can associate (749) the payment confirmation and details with the pre-printed ticket 103. The draw and wager information may be returned (750) to the POS 502 and the POS 502 may print (751) the draw and wager information on the customer's receipt 114. Once activated, the pre-printed ticket 103 serves as a lottery ticket and may be verified as any regular lottery ticket purchased from a lottery terminal.

Figure 7E:
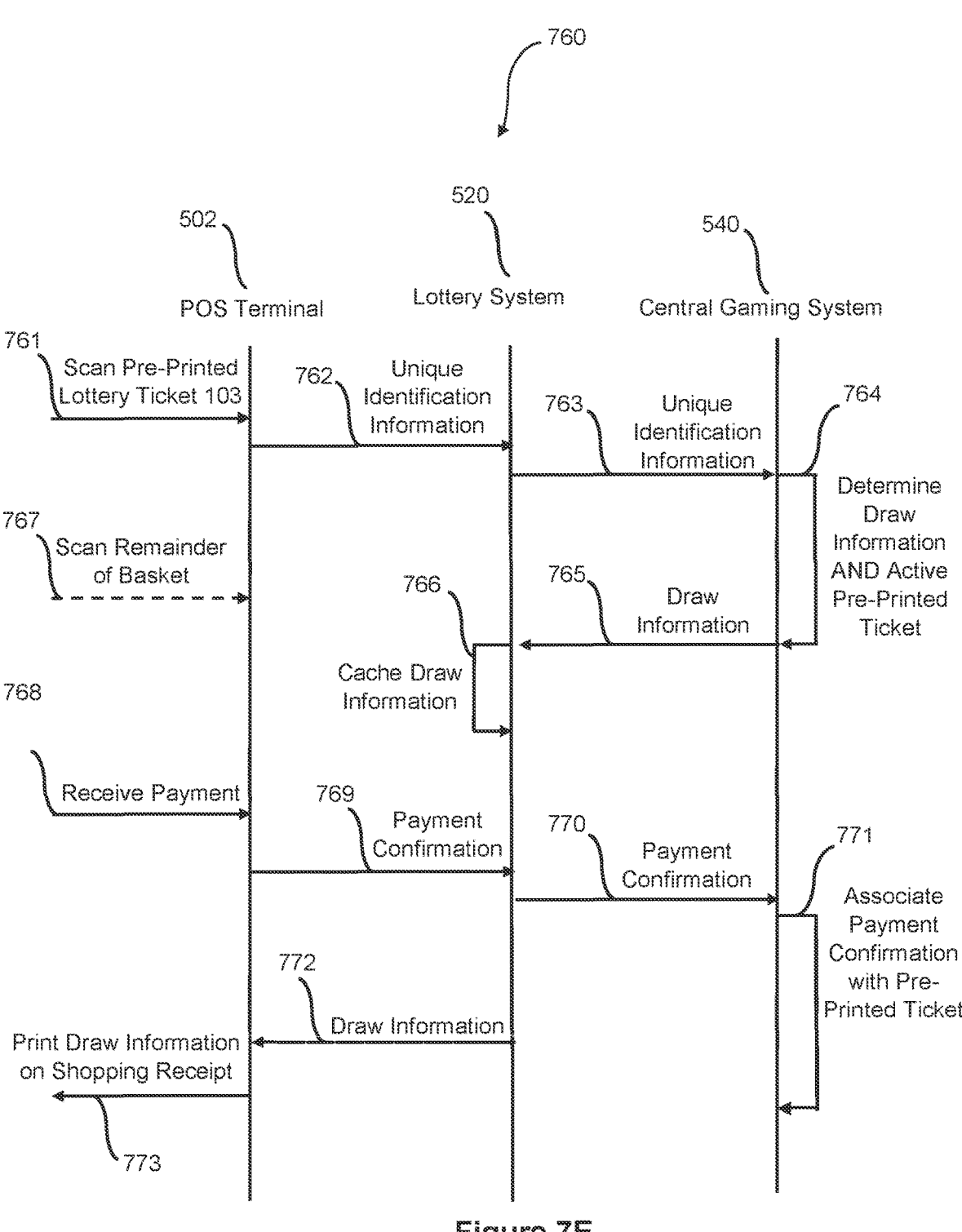
FIG. 7E illustrates an embodiment of a method of activation of a draw-type lottery ticket.

FIG. 7E illustrates an embodiment of a further process for providing a ticket for a random draw. The process 760 assumes a consumer is purchasing a number of items including a pre-printed lottery ticket 103. A pre-printed lottery ticket 103 is scanned (761) at a POS terminal 502 and unique identification information 117 and details of the pre-printed ticket are communicated (762) to the lottery system 520 who in turn communicates (763) the unique identifier 117 and pre-printed ticket details to a central gaming system 540, which verifies the ticket information and determines draw and wager information and activates (764) the pre-printed ticket 103, if the wager information is not already associated with the ticket information. Draw information is communicated (765) to the lottery system 520 and is cached within their system (766). Additional items being purchased may be scanned (767) by the POS terminal 502, and once all of the items being purchased are scanned, payment may be made (768), for example using cash, credit, or debit. After payment is received, the POS terminal 502 may communicate the payment confirmation (769) to the lottery system 520. The lottery system 520 may also communicate (770) payment confirmation to the central gaming system 540, which can associate payment confirmation (771) with the pre-printed ticket 103. The lottery system 520 may communicate the draw and wager information (772) to the POS terminal 502 and print (773) the draw information on the customer's receipt 114. Once activated, the pre-printed ticket 103 serves as a lottery ticket and may be verified as any regular lottery ticket purchased from a lottery terminal. Understandably, the sequencing of the communications between the POS terminal 502, the lottery system 520, and the central gaming system 540 may vary depending on the rules put in place between the parties.

Figure 7F:
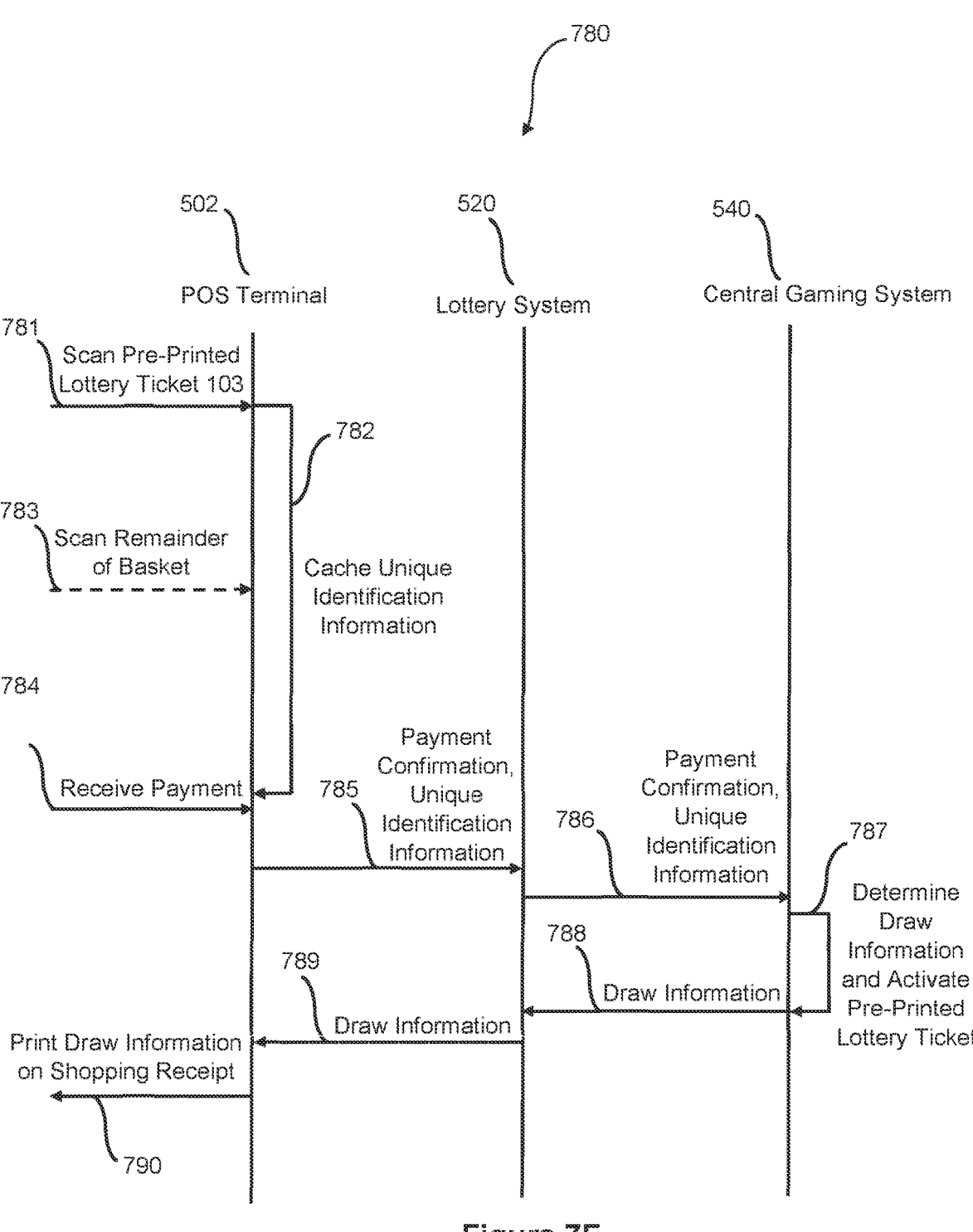
FIG. 7F illustrates an embodiment of a method of activation of a draw-type lottery ticket.

FIG. 7F illustrates an embodiment of a further process for providing a ticket for a random draw. The process 780 is similar to the process 760 except draw information and activation of the pre-printed ticket 103 is complete after payment confirmation is received by the central gaming system 540. The process 780 assumes a consumer is purchasing a number of items including a pre-printed lottery ticket 103. A pre-printed lottery ticket 103 is scanned (781) at a POS terminal 502 and unique identification information 117 and details of the pre-printed ticket is cached (782) within the POS terminal 502. Additional items being purchased may be scanned (783) by the POS terminal 502, and once all of the items being purchased are scanned, payment may be made (784), for example using cash, credit, or debit. After payment is received, the POS terminal 502 may communicate (785) the payment confirmation and unique identification information 117 to the lottery system 520. The lottery system 520 may communicate (786) the payment confirmation and unique identification information 117 to the central gaming system 540. The central gaming system 540 verifies the ticket information and determines draw and wager information and activates (787) the pre-printed ticket 103, if the wager information is not already associated with the ticket information. Draw information is communicated (788) to the lottery system 520. Draw information is then communicated (789) to the POS terminal 502 where draw information is printed (790) on the customer shopping receipt 114. Once activated, the pre-printed ticket 103 serves as a lottery ticket and may be verified as any regular lottery ticket purchased from a lottery terminal. Understandably, the sequencing of the communications between the POS terminal 502, the lottery system 520, and the central gaming system 540 may vary depending on the rules put in place between the parties.

Figure 8A:
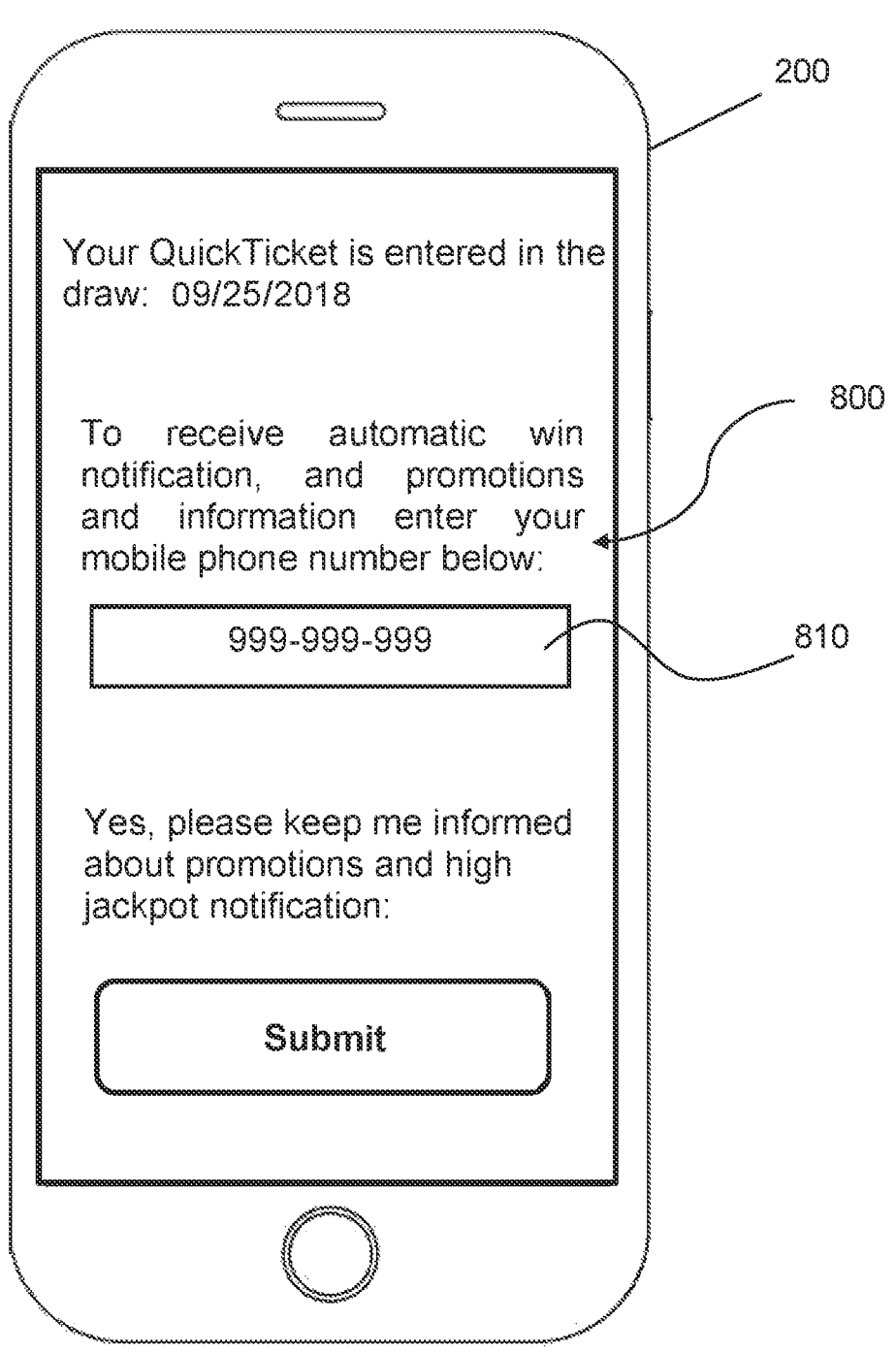
FIGS. 8A and 8B illustrate embodiments of communications with a lottery player for providing additional functionality implemented by the lottery system.

FIG. 8A illustrates a diagram depicting a mobile website 800 that returns draw date information specific to the ticket's unique code and prompts the purchaser to enter a phone number (or other contact information or communication channel identifier) as a means of selecting preference to receive automatic prize notification. The purchaser may be prompted to enter a communication specific identifier 810, such as a mobile phone number if the user wishes to receive automatic prize notification by text, an email address to receive automatic prize notification by email, a phone number to receive voice-based notification, and/or some other unique identifier appropriate to the communication channel such as a social media user name. The user may also be able to opt into or out of other communication or notification from the service, and the user may tap submit to enter the information. In some embodiments, the mobile website 800 user interface presented in FIG. 8A may comprise one or more consumer response systems and/or fraud mitigation systems to prevent a bad actor from obtaining information about the lottery ticket.

In various embodiments, some or all of the information outlined above may be stored in a database of the lottery system 520, central gaming system 540, or combinations thereof, which could include a unique lottery ticket identifier, the desired communication channel (such as text, email, voice, or some other communication channel), along with the communication channel unique identifier (such as a mobile phone number, email, etc.).

After the drawing takes place, the lottery system 520 receives the winning attributes from the CGS 540, or from an internal table in the case where this embodiment is offered by CGS 540. The lottery system 520 may provide a notification comprising the winning attributes to the user, for example, via a desired communication channel.

In some embodiments, the lottery system 520 matches winning and losing ticket numbers and associates them with tickets that have been purchased. The unique identifier of the tickets may then be used to identify associated communication channel identifiers for users. The lottery system 520 may receive information about the draw outcome, including whether or not a specific ticket is a winner, and if a winner, the amount won, prize redemption instructions, and expiration date of the winning ticket. Additionally, the lottery system 520 may identify the desired communication channel and the communication identifier associated with the ticket.

Next, the lottery system 520 utilizes a communication module 550, which is integrated with other systems capable of storing information and transmitting information according to the desired communication method (in some embodiments the communication module may reside within lottery system 520 and in other embodiments the communication module 550 may be communicatively coupled to lottery system 520 but not necessarily residing within lottery system 520). The user then receives notification informing them that their ticket wasn't a winner, or it was a winner, the amount won and prize redemption instructions.

In some embodiments, the lottery system 520 may be configured to also provide the user with an option to be notified of a winning lottery ticket and/or to claim a prize associated with the ticket. For example, the user may be prompted as to whether or not the user wishes to be notified as to whether or not the ticket is a winning ticket. In some embodiments where the ticket is determined to have a redeemable value (e.g., by virtue of the ticket being a winning ticket), the lottery system 520 may provide the user with options to redeem the lottery ticket, which may depend upon the amount and nature of the redeemable value. For example, the lottery system 520 could generate a stored-value card containing the prize amount associated with the ticket and cause the stored-value card to be delivered to the user electronically or by mail; alternatively, the lottery system 520 could cause a stored-value account to be added to the user's electronic wallet; alternatively, the lottery system 520 could direct the user to an authorized physical location (e.g., a lottery office) to redeem the lottery ticket (for example, if the redemption value exceeds a winnings threshold). Additionally or alternatively, the lottery system 520 could present the user with the option to redeem the winnings in the form of additional lottery tickets (e.g., which may be presented virtually to the user) for play in a future lottery game.

Figure 9:
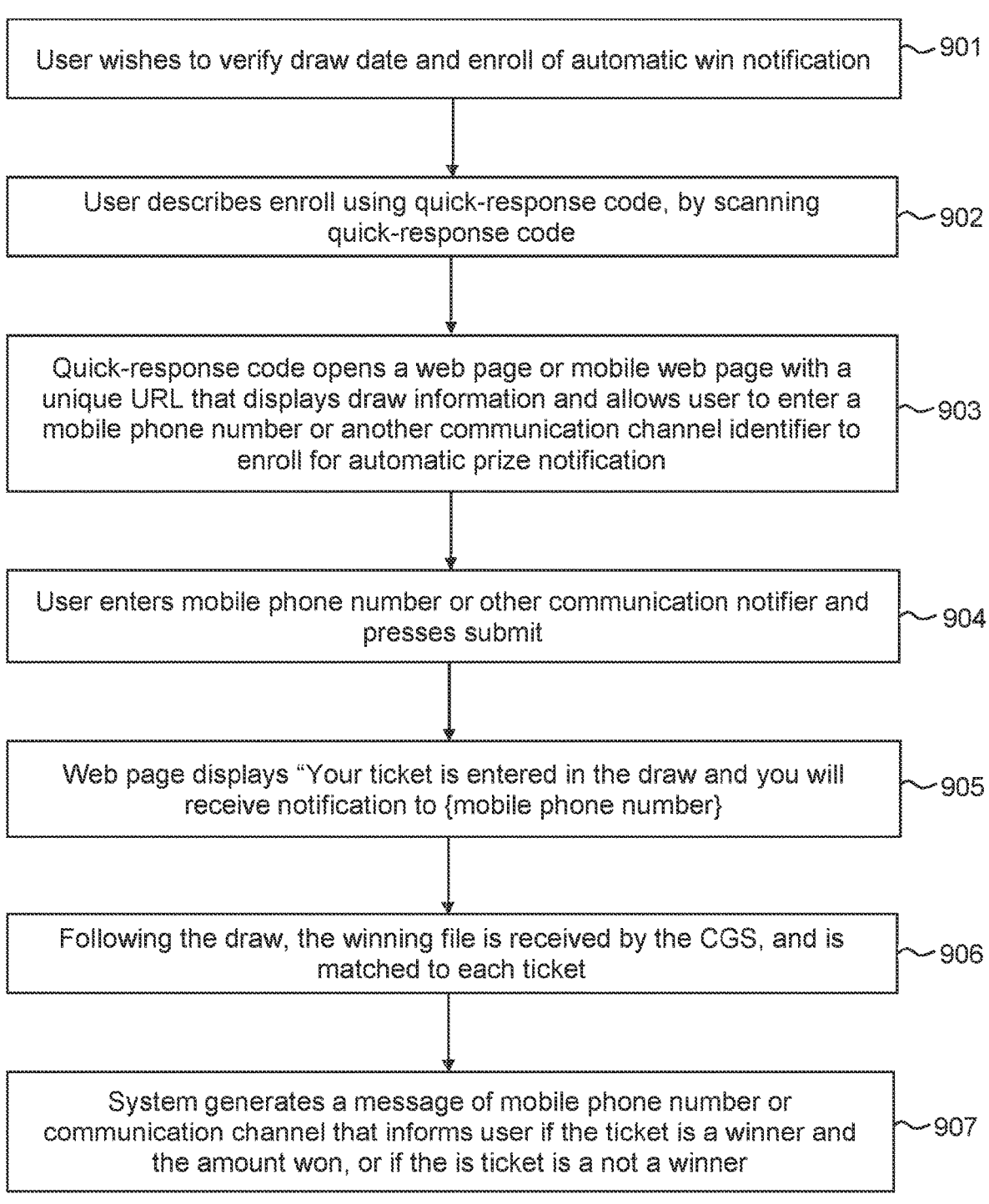
FIG. 9 illustrates an embodiment of a method for providing information to a lottery card purchaser.

FIG. 9 illustrates a method for communicating random draw lottery ticket information. At block 901, a purchaser may wish to verify the draw date associated with a ticket and enroll in automatic win notification. At block 902, the purchaser may decide to enroll using a quick-response response code (e.g., a QR Code®) printed onto the ticket (or associated with a virtual draw-type pre-selected lottery ticket 102) by scanning quick-response response code (e.g., a QR Code®) (optionally using a mobile device). At block 903, the quick-response response code (e.g., a QR Code®) may open a web page or mobile web page with a unique URL that displays draw information and allows the user to enter a mobile phone number or other communication channel identifier to enroll for automatic prize notification. In some embodiments, the method may comprise verifying the user's identity via one or more consumer response systems and/or fraud mitigation systems before displaying the draw information. At block 904, the purchaser may enter their mobile number and/or other communication identifier and press submit. At block 905, the web page may display a confirmation message, such as "your ticket is entered in the draw and you will receive a notification to [mobile number]" or the like. At block 906, following the draw associated with the ticket, the winning file may be received by the CGS and may be matched to each ticket. At block 907, the system may generate a message appropriate for the selected communication channel for notifications associated with each ticket that informs the user if the ticket is a winner and the amount won, or if the ticket is not a winner.

Referring to FIGS. 10A and 10B, an embodiment of a method 1000 for activation of an instant-win-type pre-printed lottery ticket 300 is shown. The method 1000 of FIGS. 10A and 10B is disclosed with reference to the instant-win-type pre-printed lottery ticket 300 of FIGS. 3 and 4 and the pre-printed lottery ticket processing system 500 of FIG. 5A, though the method 1000 may be similarly carried-out with respect to alternative embodiments of instant-win-type pre-printed lottery tickets, virtual instant-win-type pre-selected lottery tickets, and/or other embodiments of pre-printed lottery ticket processing systems.

In the embodiment of FIGS. 10A and 10B, once the instant-win-type pre-printed lottery ticket 300 has been manufactured, the instant-win-type pre-printed lottery ticket 300 may be distributed to a retailer 501. The instant-win-type pre-printed lottery ticket 300 may initially have an inactive or un-activated status.

At block 1001, the purchaser picks up an embodiment of the disclosure (e.g. a ticket) in a retail location such as a grocery store. At block 1002, the purchaser proceeds to POS terminal 502 and presents the instant-win-type pre-printed lottery ticket 300 to the cashier to be scanned and purchased. At block 1003, at the POS terminal 502, may be read, such as via the I/O interface(s) 508 or, alternatively, manually input at the POS terminal 502. As similarly disclosed with respect to one or more previously-disclosed methods, at block 1004, the POS terminal 502 displays the total due for the order; at block 1005, the purchaser pays the amount due; and, at block 1006, the cashier then accepts the tender and updates the payment into the POS terminal 502.

In an embodiment where the lottery ticket is a virtual instant-win-type pre-selected lottery ticket 302, the virtual instant-win-type pre-selected lottery ticket 302 may be purchased by a consumer (e.g., a purchaser), wherein a consumers device 200 (serving as a point of sale) accesses an electronic marketplace for virtual instant-win-type pre-selected lottery tickets and wherein the electronic marketplace is accessible via a website, application, or the like. Upon completion of the virtual instant-win-type pre-selected lottery ticket 302 purchase, the virtual instant-win-type preselected lottery ticket 302 is electronically delivered to the consumer's device 200.

At block 1007, the POS terminal 502 generates a transaction request, particularly, an activation request, and communicates the activation request to the lottery system 520. The activation request may also constitute a request to update the status of the unique ticket number to an active or purchased state. The activation request may comprise, in addition to information uniquely identifying the draw-type pre-printed lottery ticket 100 being purchased, information identifying the retailer 501, information identifying the POS terminal 502, information identifying the jurisdiction (e.g., the state) in which the instant-win-type pre-printed lottery ticket 300 is being purchased, or combinations thereof.

In an embodiment where the lottery ticket is a virtual instant-win-type pre-selected lottery ticket 302, the consumer's device 200 (e.g., serving as POS terminal 502) generates a transaction request, particularly, an activation request, and communicates the activation request to the lottery system 520. The activation request may also constitute a request to update the status of the unique ticket number to an active or purchased state. The activation request may comprise, in addition to information uniquely identifying the draw-type pre-printed lottery ticket 100 being purchased, information identifying the retailer 501, information identifying the consumer's device 200, information identifying the jurisdiction (e.g., the state) in which the instant-win-type preprinted lottery ticket 300 is being purchased, information identifying the geographic location (e.g. GPS coordinates) of the consumer's device 200 which is purchasing the virtual instant-win-type pre-selected lottery ticket 302, or combinations thereof.

Upon receipt of the activation request, the lottery system 520 may access one or more records associated with the instant-win-type pre-printed lottery ticket 300 referenced in the activation request and determine the validity of the activation request received from the POS terminal 502. In various embodiments, the lottery system 520 may determine the validity of the activation request based upon (i) whether or not the instant-win-type pre-printed lottery ticket 300 referenced in the activation request has been previously activated or redeemed in a lottery drawing; (ii) whether or not a retailer associated with the instant-win-type preprinted lottery ticket 300 referenced in the activation request is consistent with the retailer referenced in the activation request; (iii) whether or not a POS terminal associated with the instant-win-type pre-printed lottery ticket 300 referenced in the activation request is consistent with the POS terminal 502 referenced in the activation request; (iv) whether or not a jurisdiction associated with the instant-win-type preprinted lottery ticket 300 referenced in the activation request is consistent with the jurisdiction referenced in the activation request; (v) whether or not the geographic location of the POS terminal 502 associated with the purchase of the instant-win-type pre-printed lottery ticket 300 corresponds to a geographic location approved for the sale of the instant-win-type pre-printed lottery ticket 300; or (v) combinations thereof.

In an embodiment where the lottery ticket is a virtual instant-win-type pre-selected lottery ticket 302, upon receipt of the activation request, the lottery system 520 may access one or more records associated with the virtual instant-win-type pre-selected lottery ticket 302 referenced in the activation request and determine the validity of the activation request received from the consumer's device 200. In various embodiments, the lottery system 520 may determine the validity of the activation request based upon (i) whether or not the virtual instant-win-type pre-selected lottery ticket 302 referenced in the activation request has been previously activated or redeemed in a lottery drawing; (ii) whether or not a retailer associated with the virtual instant-win-type pre-selected lottery ticket 302 referenced in the activation request is consistent with the retailer referenced in the activation request; (iii) whether or not the consumer's device 200 associated with the virtual instant-win-type pre-selected lottery ticket 302 referenced in the activation request is consistent with the consumer's device 200 referenced in the activation request; (iv) whether or not a jurisdiction associated with the virtual instant-win-type pre-selected lottery ticket 302 referenced in the activation request is consistent with the jurisdiction referenced in the activation request; (v) whether or not the geographic location of the consumer's device 200 associated with the purchase of the virtual instant-win-type pre-selected lottery ticket 302 corresponds to a geographic location approved for the sale of the virtual instant-win-type pre-selected lottery ticket 302, or (vi) combinations thereof.

Upon a determination that the activation request is valid, at block 1008, the lottery system 520 responds to the POS terminal 502 with a response to the request indicating success or failure. If successful the purchase transaction is complete. If unsuccessful, the POS terminal may indicate the failure and the funds tendered by the purchaser may be returned.

In an embodiment where the lottery ticket is a virtual instant-win-type pre-selected lottery ticket 302, upon a determination that the activation request is valid, at block 1008, the lottery system 520 responds to the consumer's device 200 with a response to the request indicating success or failure. If success the purchase transaction is complete. If unsuccessful, the consumer's device 200 may indicate the failure and the funds tendered by the purchaser may be returned.

At block 1009, the purchaser may wish to play the instant-win-type pre-printed lottery ticket 300. The purchaser may remove the covering obscuring the "Your Winning Data" section 320, revealing a message instructing purchaser to send the ticket play-code to a short code for SMS (alternatively, some other node identifier in the case of another communication scheme). The play-code, which may be unique and specific to the instant-win-type pre-printed lottery ticket 300, will be associated with the instant-win-type pre-printed lottery ticket 300 and the unique number by the lottery system 520. The purchaser may also remove the covering obscuring the "Your Data" section 330, revealing the game attributes 332 (e.g., a second set of attributes). At block 1010 communication module 550 receives the SMS or other communication protocol containing the play-code for the instant-win-type pre-printed lottery ticket 300 and, at block 1011, forwards the play-code to the lottery system 520.

In an embodiment where the lottery ticket is a virtual instant-win-type pre-selected lottery ticket 302, the consumer may wish to play the virtual instant-win-type preselected lottery ticket 302. The consumer's device 200 may display a "Your Winning Data" section 320, revealing a message instructing consumer to send the ticket play-code to a short code for SMS (alternatively, some other node identifier in the case of another communication scheme) or activate a functionality displayed on consumer's device 200 (e.g., a button and/or a hyperlink) to send the ticket play-code. The play-code, which may be unique and specific to the virtual instant-win-type pre-selected lottery ticket 302, will be associated with the virtual instant-win-type pre-selected lottery ticket 302 at the unique number by the lottery system 520. The consumer's device 200 may also display a "Your Data" section 330, revealing the game attributes 332. At block 1010 communication module 550 receives the SMS or other communication protocol containing the play-code for the virtual instant-win-type pre-selected lottery ticket 302 and, at block 1011, forwards the play-code to the lottery system 520.

At block 1012, the play-code is received by the lottery system 520. If the records for the instant-win-type pre-printed lottery card 300 indicate that the ticket has been purchased and is active, the lottery system 520 may determine the CGS responsible for administering the lottery for the jurisdiction associated with the instant-win-type pre-printed lottery ticket 300 (e.g., the second CGS 540b), and, at block 1013, will communicate an enrollment request to the CGS 540a. If the records for the instant-win-type pre-printed lottery card 300 do not indicate that the ticket has been purchased and is active (e.g., that the ticket has not been purchased and remains inactive), the lottery system 520 may return a message, via the communication module 550, to the player's device indicating that the ticket is not able to be played (e.g., "Sorry, this ticket can't be played.").

In an embodiment where the lottery ticket is a virtual instant-win-type pre-selected lottery ticket 302, at block 1012, the play-code is received by the lottery system 520. If the records for the virtual instant-win-type pre-selected lottery ticket 302 indicate that the ticket has been purchased and is active, the lottery system 520 may determine the CGS responsible for administering the lottery for the jurisdiction associated with the virtual instant-win-type pre-selected lottery ticket 302 (e.g., the second CGS 540b), and, at block 1013, will communicate an enrollment request to the CGS 540a. If the records for the virtual instant-win-type pre-selected lottery ticket 302 do not indicate that the ticket has been purchased and is active (e.g., that the ticket has not been purchased and remains inactive), the lottery system 520 may return a message, via the communication module 550, to the consumer's device 200 indicating that the ticket is not able to be played (e.g., "Sorry, this ticket can't be played.").

Figure 8B:
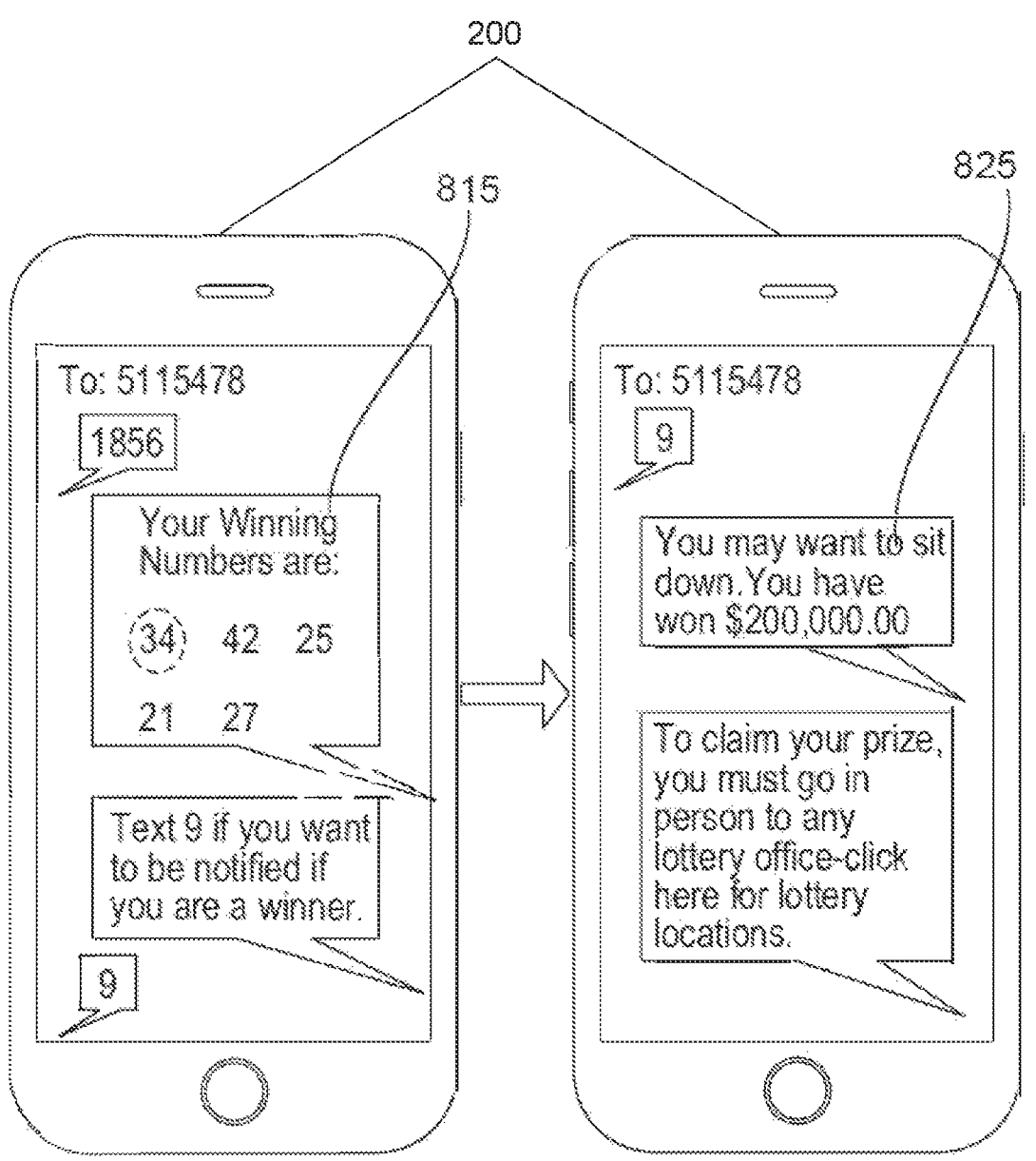

At block 1014, the second CGS 540b enrolls the ticket and returns the payload (e.g., attributes) for the "Your Winning Data" (e.g., a first set of attributes) to the lottery system 520. At block 1015, the lottery system 520 routes the "Your Winning Data" (e.g., a first set of attributes) to the communication module 550 and, at block 1016, the communication module 550 sends the "Your Winning Data" to purchaser's mobile phone or other device, e.g., consumer's device 200, as shown in FIG. 8B at 815. At block 1017, the player receives the "Your Winning Data" (e.g., a first set of attributes) on their mobile phone or other device and compares the "Your Winning Data" (e.g., a first set of attributes) with the "Your Data" (e.g., a second set of attributes 332) section 330 printed on the instant-win-type pre-printed lottery ticket 300 to determine if any matches occur and evaluate what prizes may be paid based on the results.

In an embodiment where the lottery ticket is a virtual instant-win-type pre-selected lottery ticket 302, at block 1014, the second CGS 540b enrolls the virtual instant-win-type pre-selected lottery ticket 302 and returns the payload (e.g., attributes) for the "Your Winning Data" (e.g., a first set of attributes) to the lottery system 520. At block 1015, the lottery system 520 routes the "Your Winning Data" to the communication module 550 and, at block 1016, the communication module 550 sends the "Your Winning Data" to the consumer's device 200. At block 1017, the consumer's device 200 displays the "Your Winning Data" (e.g., a first set of attributes) and compares the "Your Winning Data" (e.g., a first set of attributes) with the "Your Data" (e.g., a second set of attributes 332) associated with the virtual instant-win-type pre-selected lottery ticket 302 to determine if any matches occur and evaluate what prizes may be paid based on the results, as shown in FIG. 8B at 825.

Figure 11:
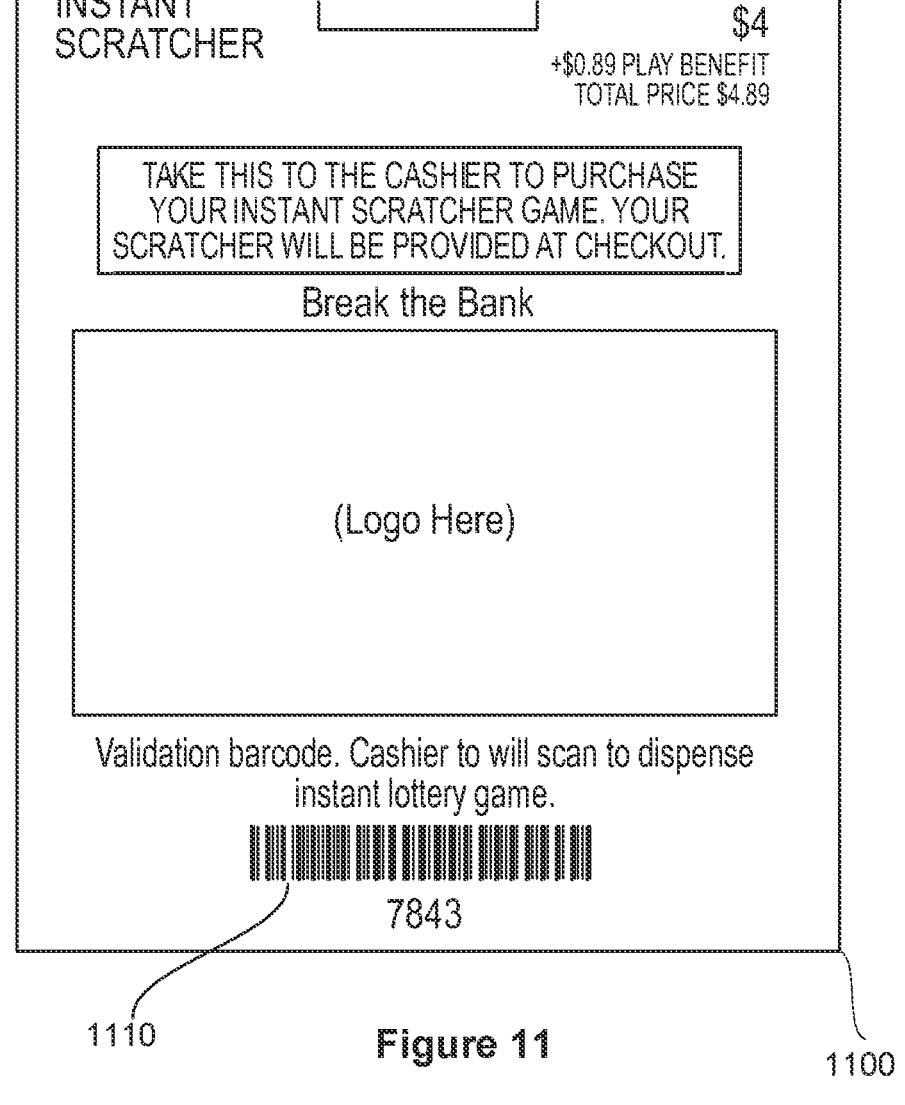
FIG. 11 illustrates an instant scratcher chit according to an embodiment of the disclosure.

Referring to FIG. 11, additionally or alternatively, the current disclosure may include an instant scratcher chit 1100, separate from the instant lottery ticket. The instant scratcher chit 1100 may comprise machine-readable indicia 1110 (e.g., a barcode solution) enabling a unit placed in-lane (e.g., within a shopping or check-out lane) to issue instant lottery tickets at the POS by automatically dispensing an instant lottery ticket at the time of sale.

Referring to FIG. 12, an embodiment of a process relating to an instant lottery scratcher dispensed at the POS terminal via an in-lane ticket dispenser system 1200. The consumer requests an instant lottery game by handing a clerk the instant scratcher chit 1100 that is merchandised in store. The clerk scans the machine-readable indicia 1110 on the instant scratcher chit 1100 and the consumer tenders payment via the POS terminal 1210. The POS terminal 1210 triggers an in-lane ticket dispenser 1220 to dispense the requested instant lottery ticket. The consumer scratches the instant lottery ticket, gets the result, and then the consumer follows traditional redemption in-store and/or lottery office process. The in-lane dispenser 1220 may comprise an instant game/scratcher dispense machine created and may be managed by a lottery ticket distributor 1230.

In some embodiments, the instant ticket (i.e., the instant scratch-off lottery ticket and/or the chit) may comprise a quick-response response code (e.g., a QR Code®) (for example, on the back side of the instant ticket), where the quick-response response code (e.g., a QR Code®) may be used to deliver the winning numbers to the user, for the user to identify a match. For example, a user may purchase the instant ticket with a quick-response response code (e.g., a QR Code®) on the back, the instant ticket may be activated by purchase (as described above), the user may scratch the front of the ticket to reveal their selection, and then the user may scan the quick-response response code (e.g., a QR Code®) (for example, with a mobile device, and/or a scanner within the store, possibly near the POS 502 or at the in-lane dispenser machine 1220) to reveal the winning numbers associated with that instant ticket. The user may match these winning number revealed by scanning the quick-response response code (e.g., a QR Code®) with the scratched numbers on the front of the ticket to determine a win.

A method of the disclosure may comprise triggering, by the POS 1210, the in-lane dispenser 1220 to dispense an instant ticket 100 or 300. The barcode (which may be a 128 barcode) provided on the chit 1100 handed to the clerk will signal to the transaction processor 1240 for notification. The transaction processor 1240 may then capture the store ID, lane ID, and UPC of the chit 1100 and may send the transaction details (API call) to the lottery ticket distributor system 1230. The lottery ticket distributor system 1230 locates the wi-fi server 1250 for the store ID provided by the transaction processor 1240, finds the in-lane dispenser machine 1220 located at the lane ID, and dispenses the requested instant lottery ticket 100 or 300 by UPC.

The disclosed systems and methods may drive incremental lottery spending by virtue of being in-lane, and in the sight of the customer when they are checking out at the retail store. The disclosed embodiments may address deficiencies of consumer lottery purchase experience in grocery channels.

In some embodiments disclosed herein are various devices, for example, a chit such as a stored-value lottery card, that may be configured to allow entry into one or more lotteries upon the fulfillment of one or more user-defined criteria. For example, in some embodiments a device configurable to allow entry into a lottery upon the fulfillment of one or more user-defined criteria is a User-Configurable Subscription Lottery (UCSL) device.

The various embodiments of the UCSL devices disclosed herein may be made available throughout a retail store without risk of loss from fraudulent redemption or shrinkage, such retail store could be a brick and mortar, physical establishment or an online and/or virtual location. Generally, the UCSL devices disclosed herein can be displayed openly, for example, throughout a retail establishment, in that the UCSL device are displayed in an inactive state. Additionally, the disclosed UCSL devices can be made to closely resemble a traditional paper lottery ticket so as to foster consumer recognition, trial, and confidence.

It will be appreciated that in some contexts, a purchaser of a UCSL device may not ultimately be the person who "plays" or "uses" the device; conversely, a purchaser of a device may be a player or user of a device (though not necessarily). Thus, references throughout this disclosure to one or more of a "purchaser," "consumer," "user," or "player" are not intended to be limiting and should be interpreted as synonymous except where explicitly or contextually so limited.

Figure 13:
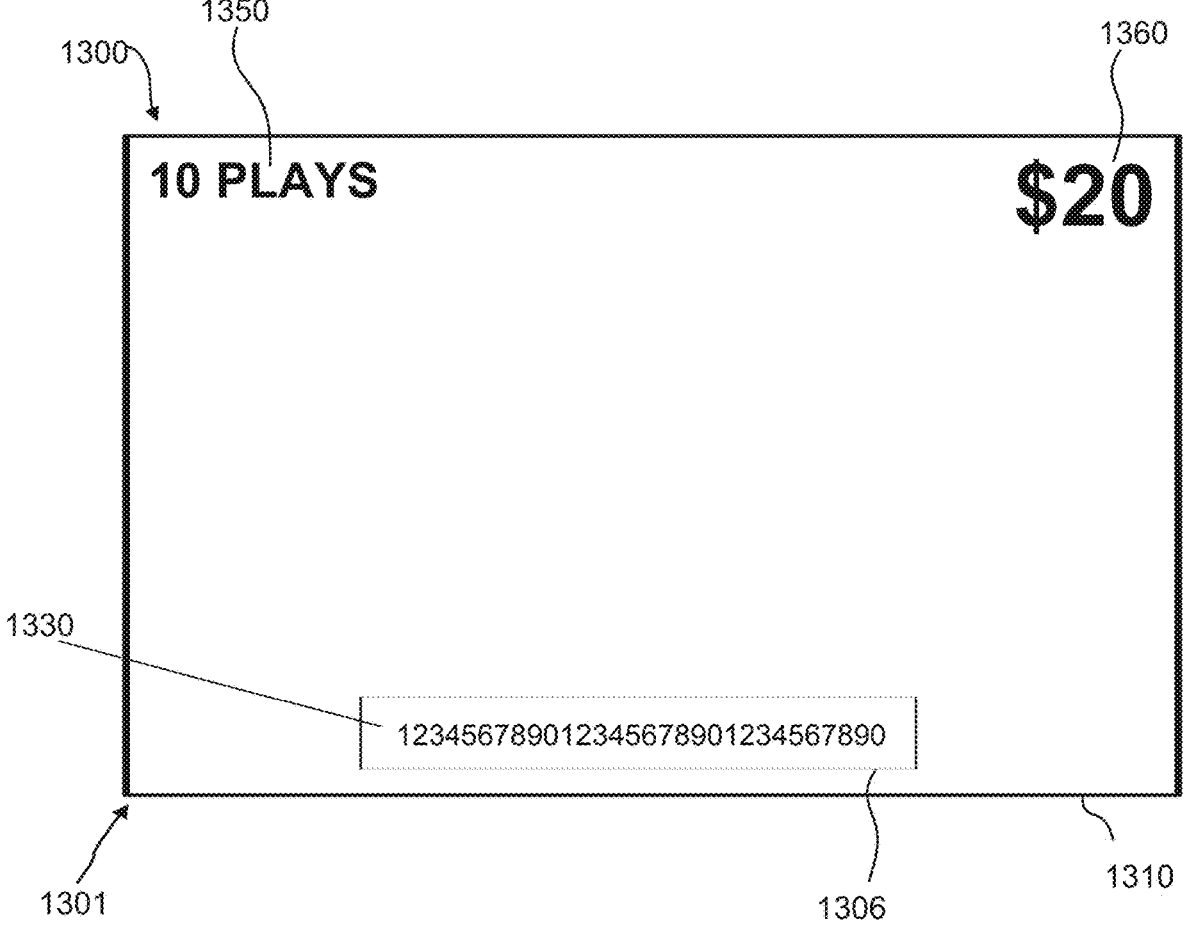
FIG. 13 illustrates a front-view of a stored-value lottery card according to an embodiment of the disclosure.
Figure 14:
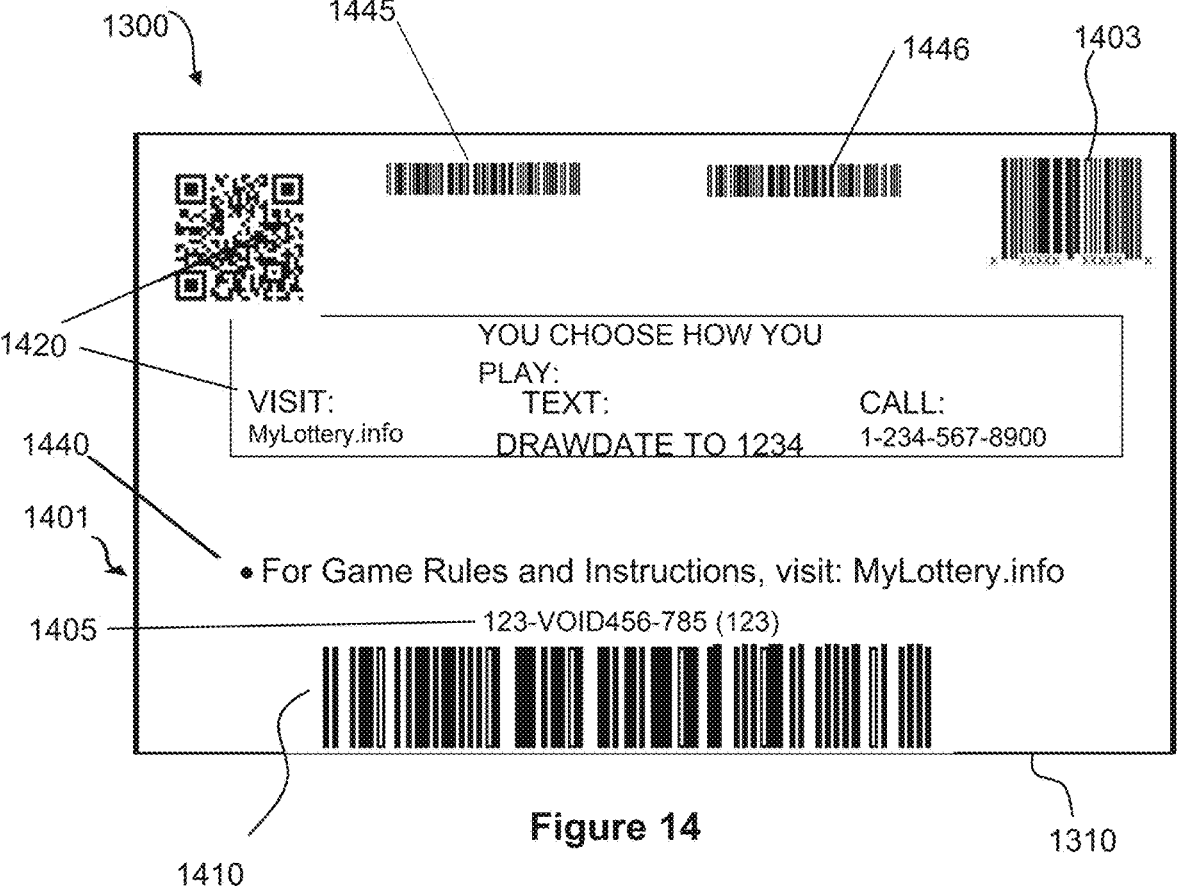
FIG. 14 illustrates a rear-view of the stored-value lottery card of FIG. 13.

In some embodiments, the UCSL device is configured similarly to a stored-value card. Referring to FIGS. 13 and 14, an embodiment of a UCSL device in the form of a stored-value lottery card 1300 is shown; particularly, a front-view 1301 and a rear-view 1401 are shown, respectively. In various embodiments, the stored-value lottery card 1300 includes a substrate 1310 of a suitable material, for example, a cardstock, a cardboard, a chipboard, another paper material, a plastic, or combinations thereof, such as a paper material having a plastic coating.

In the embodiment of FIGS. 13 and 14, the stored-value lottery card 1300 comprises various indicia which, in various embodiments, may be machine-readable (such as via a scanner or card reader), human-readable, or both. For example, in various embodiments, the indicia may comprise a magnetic stripe, a bar-code (e.g., a linear barcode such as a UCC 128 barcode or a matrix barcode, such as a quick-response code (e.g., a QR Code®—QR Code® is a registered trademark of Denso Wave Incorporated) a number, a combination of letters and numbers, or combinations thereof.

For example, in the embodiment of FIGS. 13 and 14, the stored-value lottery card 1300 includes a unique account code 1405. As shown in FIG. 14, the unique account code 1405 is shown as a series of twelve numerals. The unique account code 1405 may also be encoded in a machine-readable barcode, although in other embodiments unique account code 1405 may comprise another interpretable indicia. As will be further explained, the unique account code 1405 may associate the UCSL stored-value lottery card 1300 with a user-portal 1760 which allows the holder of the UCSL stored-value lottery card 1300 to assign, modify, and/or establish various attributes of the UCSL stored-value lottery card 1300 for participation in future lottery-based activities.

In the embodiment of FIGS. 13 and 14, the stored-value lottery card 1300 also includes an activation code 1410. As shown in FIG. 14, the activation code 1410 comprises a machine-readable barcode, although in other embodiments an activation code 1410 may comprise a magnetic stripe or any other suitable interpretable configuration. As will be further explained, the activation code 1410 may be unique, for example, with respect to the particular stored-value lottery card 1300 with which it is associated.

Also in the embodiment of FIGS. 13 and 14, the stored-value lottery card 1300 comprises enrollment indicia 1420 such as a QR Code®, a website, a call-number, a text-number (SMS), or combinations thereof suitable to direct the user to a specific endpoint (e.g., user-portal 1760), such as a website, mobile/smartphone application, or an interactive voice response (IVR) system, via which the user is enabled to configure a their UCSL stored-value lottery card 1300 (e.g., via UCSL stored-value lottery card 1300 associated account 1770) for upcoming, anticipated, and/or desired lottery game participations and/or entries, as will be disclosed herein.

Also, in the embodiment of FIGS. 13 and 14, the stored-value lottery card 1300 includes an enrollment security code 1330. The enrollment security code 1330 is obscured from view until after the UCSL stored-value lottery card 1300 is purchased. The enrollment security code 1330 may be used to track or authenticate the stored-value lottery card 1300 and/or may be used by the UCSL stored-value lottery card 1300 purchaser or holder to gain access to the specific endpoint (e.g., user-portal 1760) accessible via enrollment indicia 1420. In some embodiments, the enrollment security code 1330 may be unique, for example, with respect to the particular stored-value lottery card 1300 and/or enrollment indicia 1420 with which it is associated.

In some embodiments, the stored-value lottery card 1300 may include a covering 1306 configured to obscure various of the information on the stored-value lottery card 1300, until removed. In various embodiments, the covering 1306 may be a continuous layer disposed over a given portion of the card or discontinuous and disposed over multiple portions of the card. The covering 1306 may include a material that may be suitably removed by a purchaser, such as a scratch-off material, an example of which may include, but is not limited to a latex film. The scratch-of material may obscure various information (e.g., the play-selections) from observation by both the UCSL stored-value lottery card 1300 distributor (e.g., a retailer) and the UCSL stored-value lottery card 1300 purchaser until after the UCSL stored-value lottery card 1300 has been sold. In some embodiments, the enrollment security code 1330 may be obscured by the covering 1306, prior to the covering 1306 being removed (e.g., prior to being "scratched-off").

Also, in the embodiment of FIGS. 13 and 14, the stored-value lottery card 1300 includes denomination indicia 1360, for example, the price or value of the stored-value lottery card 1300. In some embodiments, the denomination indicia 1360 may correlate to the number of plays in one or more lotteries. As an example, in the embodiment of FIGS. 13 and 14, the stored-value lottery card 1300 includes an indication of the number of plays 1350. As an example, as shown in FIG. 13, based upon each play being valued at $2, the UCSL stored-value lottery card 1300 has a $20 denomination and is configured to allow ten (10) plays, thus indicating that the stored-value lottery card 1300 has value sufficient to allow a user to participate in ten (10) plays.

Also, in some embodiments the stored-value lottery card 1300 may include redemption information. For example, in the embodiment of FIGS. 13 and 14, the stored-value lottery card 1300 includes both a low-tier redemption code 1445 and a high-tier redemption code 1446. In various embodiments, the low-tier redemption code 1445 and/or the high-tier redemption code 1446 may be utilized to redeem any winnings, for example, dependent upon the size and/or value of any potential winnings, e.g., a low-tier redemption code 1445 may be utilized to redeem prizes/winnings valued at under $600.00 whereas the high-tier redemption code 1446 may be utilized to redeem prizes/winnings valued at over $600.00. The demarcation of the value amounts for the low-tier redemption code 1445 and a high-tier redemption code 1446 may be determined on a game-by-game basis. In various embodiments, the low-tier redemption code 1445 and/or the high-tier redemption code 1446 may be machine-readable. Also, in the embodiment of FIGS. 13 and 14, the stored-value lottery card 1300 includes a Universal Product Code (UPC) 1403 associated with the UCSL stored-value lottery card 1300, for example, which may be utilized at a point of sale to determine the UCSL stored-value lottery card 1300 being transacted and its price.

Also in the embodiment of FIGS. 13 and 14, UCSL stored-value lottery card 1300 may include various user instructions 1440, for example, related to rules for game-play, instructions for entry in a lottery, and the like.

In various embodiments, as shown in FIGS. 13 and 14, the UCSL stored-value lottery card 1300 may be configured for play in a Powerball® lottery game (Powerball® is a registered trademark of Multi-State Lottery Association) and/or a Mega Millions® lottery game (Mega Millions® is a registered trademark of Illinois Department of the Lottery).

In an embodiment, the UCSL stored-value lottery card 1300 may be embodied as an electronic stored-value card which may be purchased, activated, and loaded into a user's electronic wallet 1775 via the scanning and/or interpretation of purchase and activation indicia (e.g., 1403 and 1410) at a point of sale 1702 and identification of the UCSL stored-value lottery card 1300 by the user for placement of the UCSL stored-value lottery card 1300 into the user's electronic wallet 1775.

Figure 15:
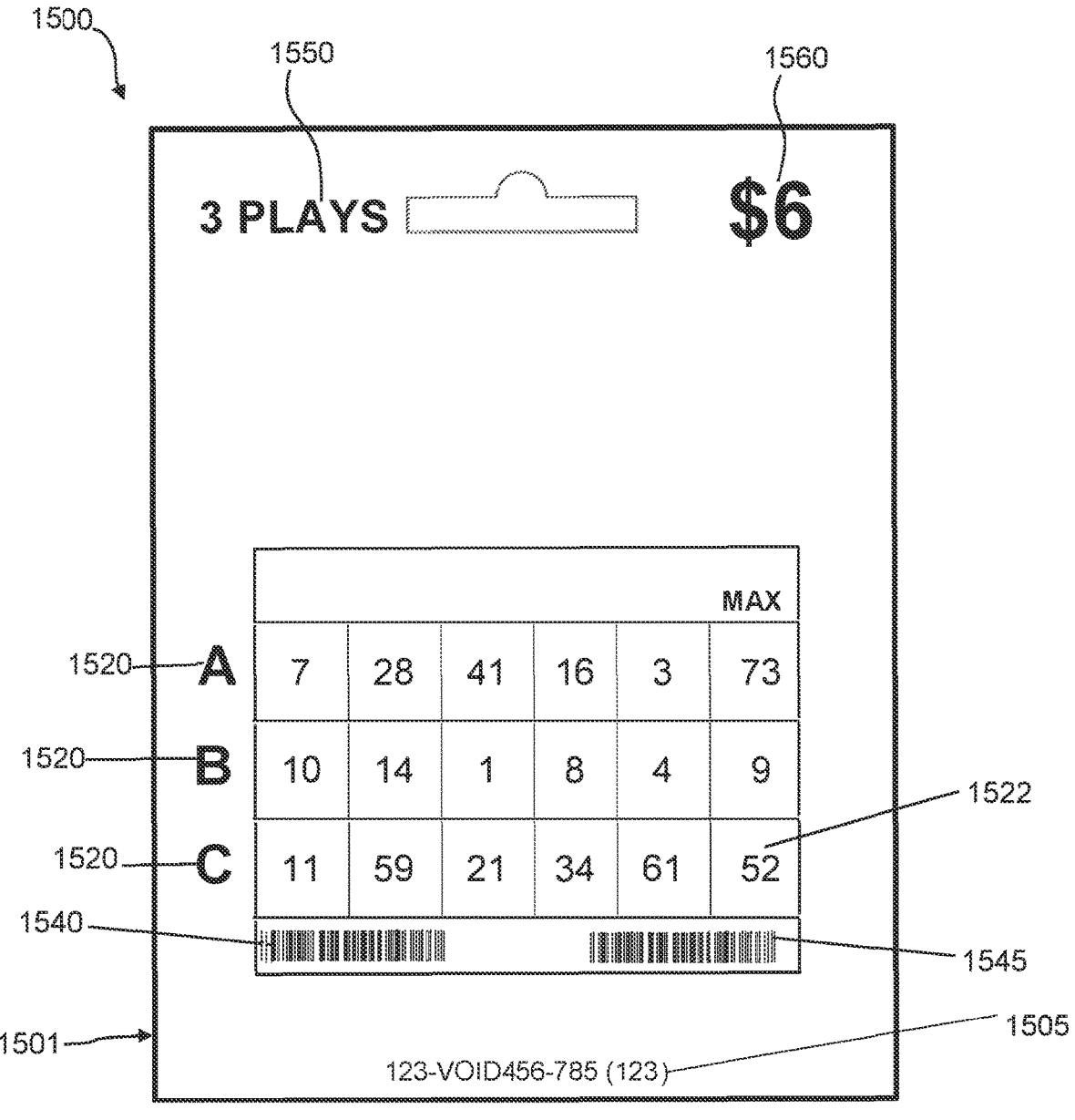
FIG. 15 illustrates a front-view of a pre-printed lottery ticket according to an embodiment of the disclosure.
Figure 16:
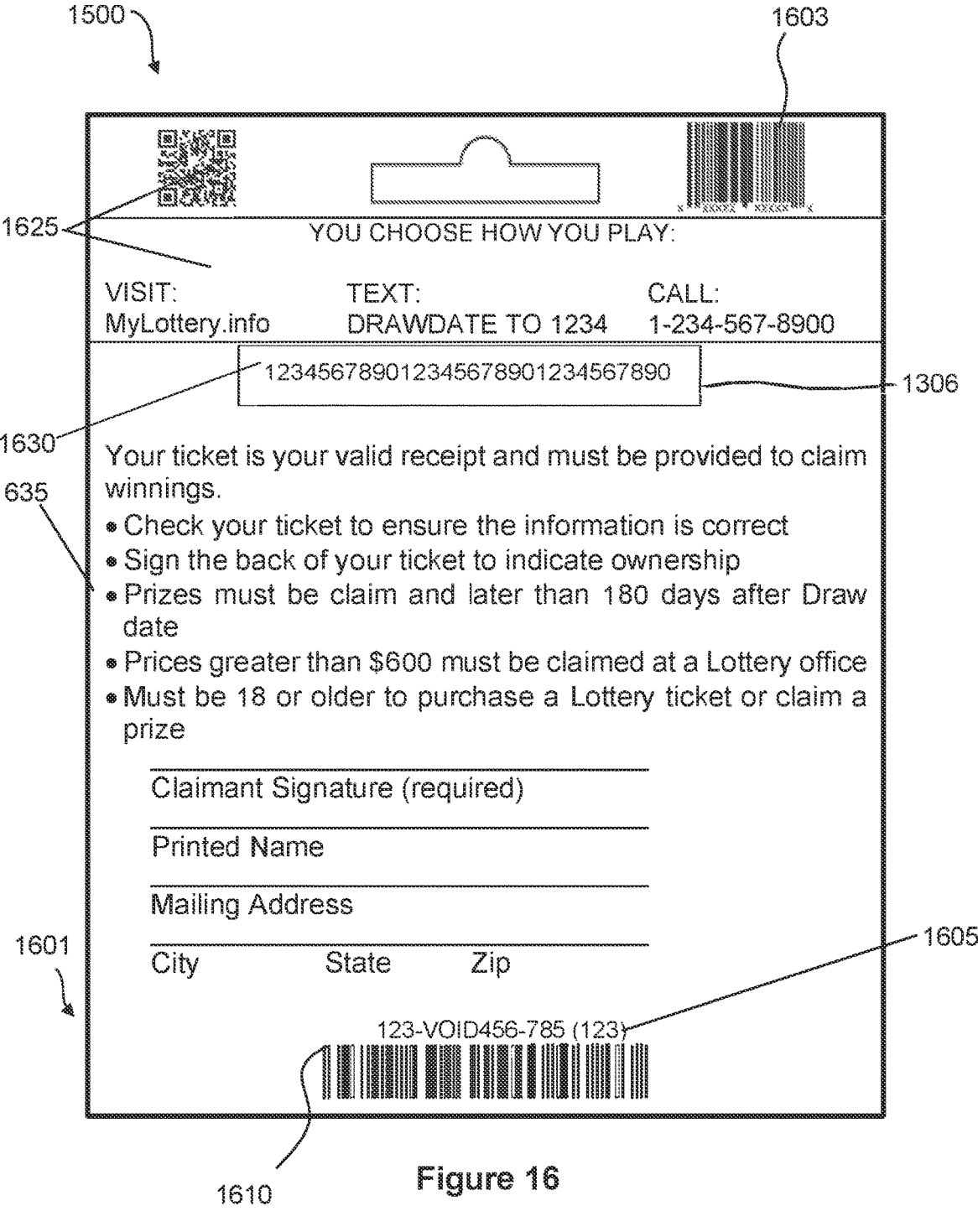
FIG. 16 illustrates a rear-view of a pre-printed lottery ticket according to an embodiment of the disclosure.

Also, in some embodiments the UCSL device is configured similarly to a pre-printed lottery ticket. Referring to FIGS. 15 and 16, an embodiment of a UCSL device in the form of a pre-printed lottery ticket 1500 is shown; particularly, a front-view 1501 and a rear-view 1601 are shown, respectively.

In the embodiment of FIGS. 15 and 16, and as similarly disclosed with respect to FIGS. 13 and 14, the pre-printed lottery ticket 1500 similarly comprises various indicia which, in various embodiments, may be machine-readable (such as via a scanner or card reader), human-readable, or both. Particularly, the pre-printed lottery ticket 1500 similarly includes a unique ticket identifier 1505, an activation code 1610, enrollment indicia 1625, an enrollment security code 1630, and various user instructions 1635. Similarly, the enrollment security code 1630 may be obscured by the covering 1306, prior to the covering being removed (e.g., prior to being "scratched-off").

Also, in the embodiment of FIGS. 15 and 16, the pre-printed lottery ticket 1500 comprises pre-printed play-selections 1520 which will later be determined to be either winning or losing. For example, a pre-printed play-selection may be determined to be either winning or losing based upon a drawing or other event taking place at a time after purchase; enrollment of the pre-printed lottery ticket into a subscription (e.g., user-selected play regime) plan 1705; and designation of attributes for the pre-printed lottery ticket

1500 and/or for the pre-printed play-selections 1520. As will be disclosed, after a pre-printed lottery ticket 1500 is purchased and enrolled into a subscription plan 1705, the lottery "plays" printed on the draw-type pre-printed lottery ticket may be compared to subsequently drawn numbers (of user-selected or designated lotteries) to determine if one or more of the pre-printed play-selections 1520 constitute winning entries.

In the embodiment of FIGS. 15 and 16, the pre-printed lottery ticket 1500 is imprinted with various indicia (such as certain numbers, symbols, words and the like). Particularly, in the embodiment of FIGS. 15 and 16, the pre-printed lottery ticket 1500 is imprinted with multiple play-selections 1520; in other embodiments, a pre-printed lottery ticket 1500 may include only a single play-selection 1520. Each play-selection 1520 constitutes a separate and distinct play for a game. In the embodiment of FIG. 15, the pre-printed lottery ticket 1500 includes three play-selections 1520, although in various other embodiments, the draw-type pre-printed lottery ticket 1500 includes any suitable number of play-selections 1520, for example, one, two, four, five, six, seven, eight, nine, ten, or more play-selections 1520.

Each of the play-selections 1520 includes a plurality of game attributes 1522 and each attribute 1522 may include, for example, a number, a letter, a symbol, or an illustration. The attributes 1522 may be randomly selected. The attributes 1522 for the play-selection may be generated using, for example, a Random Number Generator (RNG).

In various embodiments, as shown in FIGS. 15 and 16, the configuration for each play-selection 1520 may be dependent upon the game or lottery for which the pre-printed lottery ticket 1500 is intended. For example, in some embodiments, the pre-printed lottery ticket 1500 may be configured for play in a Powerball® lottery game. In an embodiment where the pre-printed lottery ticket 1500 configured for play in a Powerball® lottery game, each play-selection 1520 may include six attributes 1522, particularly, a first, second, third, fourth, fifth, and sixth attribute 1522. Each of the first, second, third, fourth, and fifth attributes 1522 may be a number selected from sixty-nine (69) possibilities and the sixth attribute 1522 may be a number independently selected from twenty-six (26) possibilities.

In an alternative embodiment, the pre-printed lottery ticket 1500 may be configured for play in a Mega Millions® lottery game. In an embodiment where the pre-printed lottery ticket 1500 configured for play in a Mega Millions lottery game, each play-selection 1520 may include six attributes 1522, particularly, a first, second, third, fourth, fifth, and sixth attribute 1522. Each of the first, second, third, fourth, and fifth attributes 1522 may be a number selected from seventy (70) possibilities and the sixth attribute 1522 may be a number independently selected from twenty-five (25) possibilities.

In some embodiments, the play-selections may be obscured by a virtual covering, for example, which may also be disposed over a given play-selection 1520 or two or more play-selections or disposed over a given attribute 1522 or two more attributes 1522.

Also, in some embodiments the pre-printed lottery ticket 1500 may include redemption information. For example, in the embodiment of FIGS. 15 and 16, the pre-printed lottery ticket includes both a low-tier redemption code 1540 and a high-tier redemption code 1545. In various embodiments, the low-tier redemption code 1540 and/or the high-tier redemption code 1545 may be utilized to redeem any winnings, for example, dependent upon the size and/or value of any potential winnings, e.g., a low-tier redemption code

1540 may be utilized to redeem prizes/winnings valued at under $600.00 whereas the high-tier redemption code 1545 may be utilized to redeem prizes/winnings valued at over $600.00. The demarcation of the value amounts for the low-tier redemption code 1540 and a high-tier redemption code 1545 may be determined on a game-by-game basis. In various embodiments, the low-tier redemption code 1540 and/or the high-tier redemption code 1545 may be machine-readable.

Also, and as similarly disclosed with respect to FIGS. 13 and 14, the pre-printed lottery ticket 1500 may include denomination indicia 1560, a UPC 1603 which may be utilized at a point of sale to determine the UCSL pre-printed lottery ticket being transacted and its price, and an indication of the number of plays 1550. In some embodiments, the denomination indicia 1560 and number of plays 1550 may correlate to the number play-selections 1520 presented on the ticket. As an example, in the embodiment of FIGS. 15 and 16, based upon each play being valued at $2, the pre-printed lottery ticket 1500 has a $6 denomination and is configured to allow three (3) plays, particularly, each of the three (3) play selections 1520.

In an embodiment, the UCSL pre-printed lottery ticket 1500 may be embodied as an electronic/virtual lottery ticket which may be purchased, activated, and loaded into a user's electronic wallet 1775 via the scanning and/or interpretation of purchase and activation indicia (e.g., 1603 and 1610) at a point of sale 1702 and identification of the UCSL pre-printed lottery ticket 1500 by the user for placement of the UCSL pre-printed lottery ticket 1500 into the user's electronic wallet 1775.

Also disclosed herein are embodiments related to a system for processing a UCSL device, such as the stored-value lottery card 1300 of FIGS. 13 and 14 and/or the pre-printed lottery ticket 1500 of FIGS. 15 and 16. In some embodiments, an environment in which a UCSL device is processed may include users, merchants, vendors, issuers, providers, and other interested parties. As described hereinbelow, one or more components of the UCSL device processing system, individually or collectively, may be configured to perform various functions related to a UCSL device. These functionalities include and relate to the activation of a UCSL device; the use of a UCSL device to enroll in a user-configurable lottery subscription plan 1705; the entry, based upon the user-configured lottery subscription plan 1705, in a lottery; the provision of lottery entry confirmation to a user of a UCSL device; the notification of the winnings associated with an entry in a lottery; the addition of UCSL device to an electronically-maintained data file (e.g., an "electronic wallet" or "e-wallet") 1775 of the user; or combinations thereof.

Figure 17:
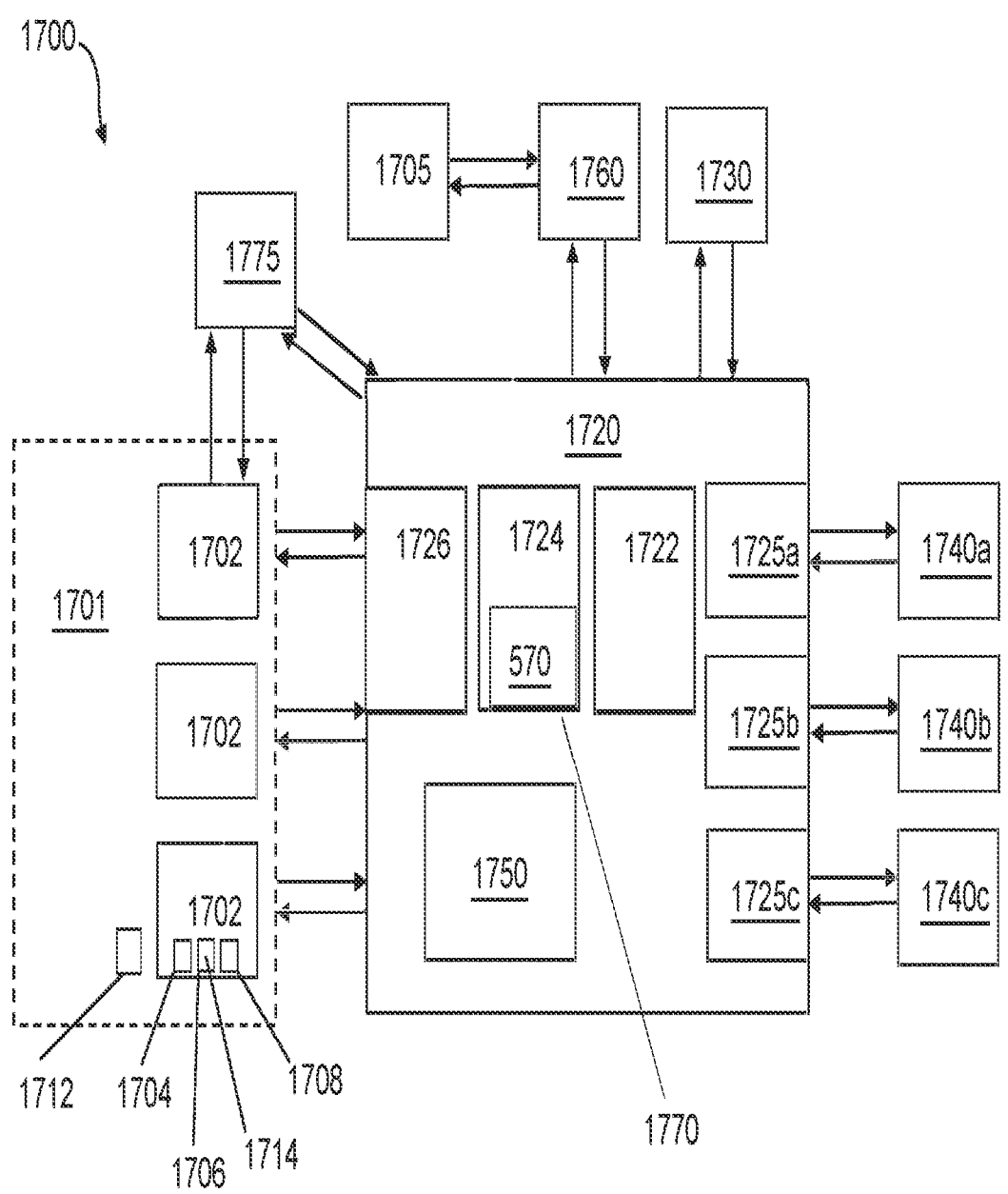
FIG. 17 illustrates a lottery system and/or environment in which a user-configurable lottery subscription device may be enrolled in a lottery at point of sale (POS) according to an embodiment of the disclosure.

FIG. 17 illustrates an embodiment of a UCSL device processing system 1700 for processing stored-value lottery cards 1300 and/or pre-printed lottery tickets 1500. The lottery ticket processing system 1700 generally includes one or more point of sale terminals 1702 (POSs) disposed at retailer 1701, although in alternative embodiments, a consumer's device may be a point of sale, such as in the context of a virtual transaction. In the embodiment of FIG. 17, the UCSL device processing system 1700 also includes a lottery system 1720 communicably coupled to the point of sale terminal 1702 and at least one central gaming system (CGS) (e.g., at least one of 1740*a*, 1740*b*, and 1740*c*) communicably coupled to the lottery system 1720. In various embodiments, various components of the system of FIG. 17 may be operably connected via one or more networks (e.g., broadband, optical, Wi-Fi, Bluetooth, NFC, cellular, satellite, cloud, card processing network, banking network, a local area network, the World Wide Web for Internet, non-cellular mobile phone network, a land-line network, Public Switched Telephone Network (PSTN), a dedicated communication line, other networks for transferring electronic information, or combinations thereof). The communication between various components may be secured using various encryption techniques.

In some embodiments, the POS terminals 1702 disposed at the retailer 1701 may include a processing unit 1704, memory unit 1706 and I/O interface(s) 1708 for communicating with devices external to the POS terminal 1702. Additionally or alternatively, while the embodiment of FIG. 17 illustrates POS terminals 1702 disposed at the retailer 1701, in some other embodiments, other types of terminals may be used in place or along with conventional POS terminals, for example, network terminals which may include PCs, laptops, handheld devices, mobile phones, or other devices. Network terminals may, for example, be made available in kiosks to provide retailers access to the lottery system 1720 and the associated functionality.

In some embodiments, the processing unit 1704 can comprise an electronic input device, a register or terminal, a computer processing unit ("CPU"), a personal computer, a personal digital assistant (e.g., smart phone), or other means of communicating with the I/O interface(s) 1708. In some embodiments, the processing unit 1704 may incorporate a "store-and-forward" functionality. Generally, the store-and-forward functionality may operate during activation of a stored-value card such that, if connectivity between the POS terminal 1702 and a stored-value processing system is lost during activation of the stored-value card, the processing unit 1704 will store the activation request for the stored-value card and communicate the activation request when connectivity is regained, thus allowing the activation to go forward. In some embodiments, the processing unit 1704 may be configured to allow the store-and-forward functionality to be disabled or suppressed.

The I/O interface(s) 1708 generally comprises one or more interpretation units such as a bar code scanner, magnetic strip reader, optical character recognition device, biometric recognition device, numerical keyboard (e.g., for entering an identification number), or other device configured to interrogate, interpret, capture, or input the data encoded in or on the authentication token. For example, the I/O interface(s) 1708 may comprise a barcode scanner for scanning and/or retrieving machine-readable (e.g., barcode information, such as Universal Product Code information or other information) disposed on a ticket. In some embodiments, the POS terminal 1702 may also be connected to a printer 1712, for example, for printing a receipt 114 of the transaction. The POS terminal 1702 includes instructions 1714 stored in the memory unit 1706, which when executed by the processor unit 1704, cause the POS terminal 1702 to provide certain functionality, as disclosed herein.

In the embodiment, the lottery system 1720 generally includes a processing unit 1722, one or more memory units 1724, and one or more I/O interface(s) 1726 for communicating with components external to the lottery system 1720, a communications module 1750 capable of storing information and transmitting information according to the desired communication method (in some embodiments the communication module may reside within lottery system 1720 and in other embodiments the communication module 1750 may be communicatively coupled to lottery system 1720 but not necessarily residing within lottery system 1720), and one or more application programming interfaces (APIs) (e.g., 1725*a*, 1725*b*, and 1725*c*) that are each configured to allow the lottery system 1720 to interface and/or interact with a particular central gaming systems (e.g., 1740*a*, 1740*b*, 1740*c*). The memory unit(s) 1724 may store (i) instructions that when executed by the processing unit, cause the lottery system 1720 to provide certain functionality and/or (ii) user accounts 1770 and associated data, as disclosed herein.

In some embodiments, the lottery system 1720 may be configured for communication with one or more information datastores 1730, for example, which may individually or collectively include an entry for each of the UCSL devices offered for sale the retailer 1701 or multiple similar retailers.

Also, in some embodiments, the lottery system 1720 may be configured for communication with at least one CGS (e.g., at least one of 1740*a*, 1740*b*, and 1740*c*). Generally, lottery jurisdictions (e.g., a states) use various CGSs to manage the drawings associated with a lottery. In various embodiments, the lottery system 1720 is configured to utilize one or more application programming interfaces (APIs) that are each configured to allow the lottery system 1720 to interface and/or interact with a particular CGS (e.g., 1740*a*, 1740*b*, 1740*c*). For example, in the embodiment of FIG. 17 the lottery system 1720 utilizes each of a first API 1725*a*, a second API 1725*b*, and a third API 1725*c* to interface and/or interact with each of a first CGS 1740*a*, a second CGS 1740*b*, and a third CGS 1740*c*. For example, one of the first API 1725*a*, second API 1725*b*, or third API 1725*c* may allow the lottery system 1720 to enter the play-selections into a particular draw for a particular lottery with one of the first CGS 1740*a*, the second CGS 1740*b*, or the third CGS 1740*c*.

Also, in some embodiments, the lottery system 1720 may be configured to provide a user-portal 1760, for example, by which a user (e.g., a purchaser, a player, and a lottery-card/ticket holder) may access certain functionality (e.g., subscription plan attributes, designations, and selections), as will be discussed herein. In various embodiments, the user-portal 1760 may comprise a webpage, an application (such "app" residing on a user device such as a smart-phone), or an IVR, all of which provide access to the subscription plan 1705.

Also disclosed herein are embodiments of methods related to processing a transaction with respect to a UCSL device, for example, the stored-value lottery card 1300 of FIGS. 13 and 14 and/or the pre-printed lottery ticket 1500 of FIGS. 15 and 16. In various embodiments, the transaction being processed may be the activation of a UCSL device; the use of a UCSL device to enroll in a user-configurable lottery subscription plan 1705; the entry, based upon the user-configured lottery subscription plan 1705, in a lottery or lotteries; the provision of lottery entry confirmation to a user of a UCSL device; the notification of the winnings associated with an entry in a lottery; the addition of UCSL device to an electronically-maintained data file (e.g., an "electronic wallet" or "e-wallet") 1775 of the user; or combinations thereof.

Referring to FIG. 18A, an embodiment of a method 1800 for activation of a UCSL device is shown. The method 1800 of FIG. 18A is disclosed with reference to the stored-value lottery card 1300 of FIGS. 13 and 14, the pre-printed lottery card 1500 of FIGS. 15 and 16, and the UCSL device processing system 1700 of FIG. 17, though the method 1800 may be similarly carried-out with respect to alternative embodiments of UCSL device and/or other embodiments of the UCSL device processing systems.

In the embodiment of FIG. 18A, once the UCSL device 1300 has been manufactured, the UCSL device may be distributed to a retailer 1701.

At block 1801, the method 1800 begins when a purchaser selects the UCSL device (e.g., a stored-value lottery card 1300 or a pre-printed lottery ticket 1500), which may be displayed at the retailer 1701 and, at block 1802, the purchaser proceeds to the POS terminal 1702 and presents the UCSL device to the cashier to be scanned and purchased. At block 1803, at the POS terminal 1702, the activation code (e.g., activation code 1410 or activation code 1610) may be read, such as via the I/O interface(s) 1708 or, alternatively, manually input at the POS terminal 1702. At block 1804, the POS terminal 1702 displays the total due for the order. For example, the UPC associated with the UCSL device may be read, for example, to determine price for the UCSL device. At block 1805, the purchaser pays the amount due and at block 1806, the cashier then accepts the tender and updates the payment into the POS terminal 1702.

At block 1807, the POS terminal 1702 generates a transaction request, particularly, an activation request, and communicates the activation request to the lottery system 1720. The activation request may comprise, in addition to information uniquely identifying the UCSL device being purchased (e.g., activation code 1410 or activation code 1610), information identifying the retailer 1701, information identifying the POS terminal 1702, information identifying the jurisdiction (e.g., the state) in which the UCSL device is being purchased, or combinations thereof.

Upon receipt of the activation request, at block 1808, the lottery system 1720 may access one or more records associated with the UCSL device referenced in the activation request and determine the validity of the activation request received from the POS terminal 1702. In various embodiments, the lottery system 1720 may determine the validity of the activation request based upon (i) whether or not the UCSL device referenced in the activation request has been previously activated; (ii) whether or not a retailer associated with the UCSL device referenced in the activation request is consistent with the retailer referenced in the activation request; (iii) whether or not a POS terminal associated with the UCSL device referenced in the activation request is consistent with the POS terminal 1702 referenced in the activation request; (iv) whether or not a jurisdiction associated with the UCSL device referenced in the activation request is consistent with the jurisdiction referenced in the activation request; (v) whether or not the geographic location of the POS terminal associated with the purchase of the UCSL device corresponds to a geographic location approved for the sale of the UCSL device, or (vi) combinations thereof.

Upon a determination that the activation request is valid, at block 1809, the lottery system 1720 updates one or more records associated with the UCSL device referenced in the activation request to indicate that the UCSL device has been validly purchased and is active and, at block 1810, responds to the POS terminal 1702 with a response to the request indicating success or failure of the activation. If successful, the purchase transaction is complete. If unsuccessful, the POS terminal may indicate the failure and the funds tendered by the purchaser may be returned.

Following a successful purchase transaction, the purchaser may use a UCSL device to enroll in a user-configurable lottery subscription.

At block 1811, the purchaser may utilize the enrollment indicia (e.g., enrollment indicia 1420 or 1625) to access the user-configurable lottery subscription plan 1705 via the user-portal 1760. For example, where the enrollment indicia utilized is a QR® code, when the QR® code is scanned by a user using a mobile device capable of scanning a QR® code, the user's device would be directed to the user-configurable lottery subscription via the user-portal 1760 (e.g., a particular web-site or other network endpoint). Alternatively, where the enrollment indicia utilized is a SMS number, URL address, or phone-number, the user would similarly utilize the enrollment indicia the access the user-configurable lottery subscription plan 1705 via the user-portal 1760, such as via a website, IVR, or SMS.

In some embodiments, at block 1812, security information associated with the UCSL device is provided to the user-configurable lottery subscription. For example, upon accessing the user-configurable lottery subscription plan 1705, the user-configurable lottery subscription plan 1705 may then prompt the user to remove the covering obscuring the enrollment security code (1330 or 1630) and to enter the enrollment security code (1330 or 1630), such as in embodiments where the user-configurable lottery subscription plan 1705 was accessed by scanning a QR® code, typing in a URL, dialing a phone-number, or transmitting an SMS message. In embodiments where the user-configurable lottery subscription plan 1705 was accessed by scanning a QR® code, security information may have been encoded in the QR® code and there may be no need to enter security code (1330 or 1630).

As shown in FIG. 18B, at block 1813, the enrollment security code (1330 or 1630) may be validated by 1720 to ensure that the UCSL device is active, for example, by accessing one or more records associated with the UCSL device. If the status indicated inactive, the lottery system 1720 may display a message informing the user that the code entered was inactive, and that they should check the code and try again. Until the enrollment security code (1330 or 1630) is validated, the lottery system 1720 will not allow the configuration to proceed.

At block 1814, for example, where the user may be required (e.g., in accordance with gaming laws) to configure the lottery subscription plan criteria (1901-1910) only in a certain state (for example the state in which the UCSL device was purchased), the lottery system 1720 may utilize a geolocation service to determine if the user is accessing the user portal 1760 from the correct state to allow the system to be configured, and if not, would display an error message explaining why the USCLE could not be configured at that time. The lottery system 1720 may also prompt the user to enter their full name and/or contact information, for purposes of complying with lottery rules.

At block 1815, the user-configurable lottery subscription plan 1705 presents the user with options allowing the user to configure one or more lottery-play criteria and stores the user configurations in a designated criteria database 1900, for example, in association with the UCSL device. Generally, the lottery-play criteria relate to the way in which a user participates a lottery. For example, the lottery-play criteria may be configured to cause a user to participate in a lottery based upon the satisfaction of various criteria. In some embodiments, the particular lottery-play criteria that may be configured may be dependent upon the configuration of the UCSL device.

Figure 19:
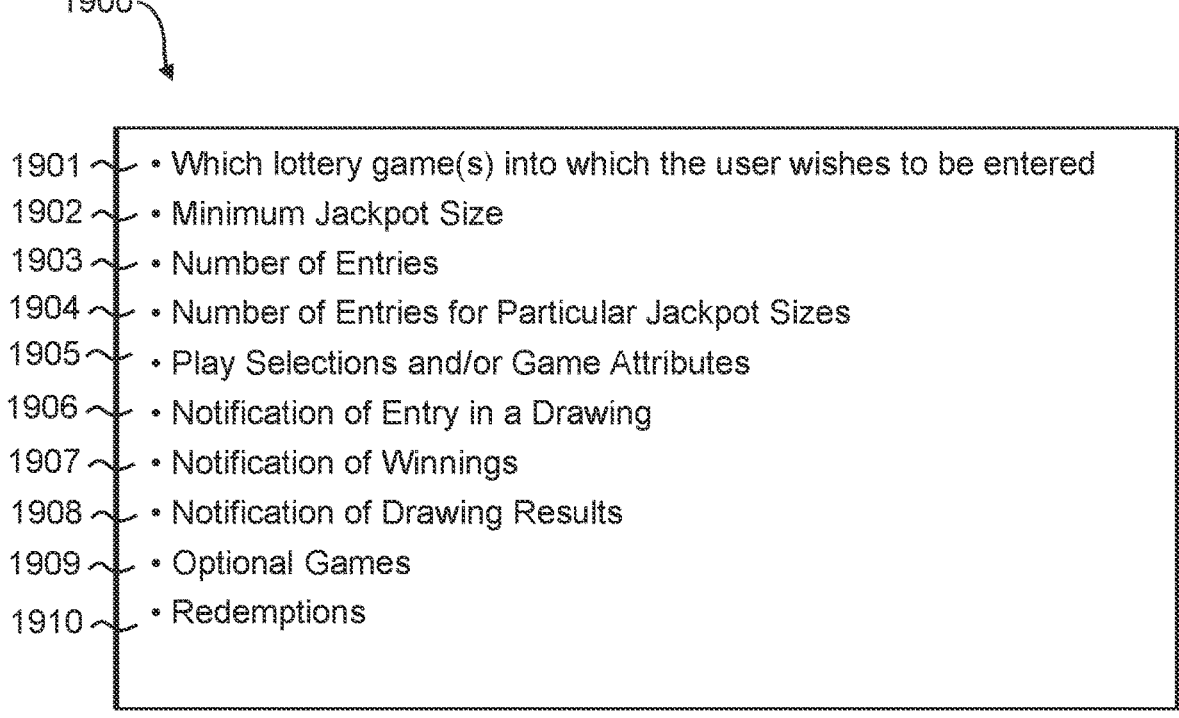
FIG. 19 illustrates various user-selectable or designatable subscription plan attributes associated with a user-configurable lottery subscription device.

FIG. 19 illustrates examples of lottery-play criteria (e.g., user-selectable and/or designatable attributes) (1901-1910) under a subscription plan 1705. For example, in an embodiment where the UCSL device comprises a stored-value lottery card 1300, examples of lottery-play criteria (e.g., user-selectable and/or designatable attributes) (1901-1910) may include:

Which lottery game(s) into which the user wishes to be entered 1901. For example, the user may configure their participation for only Powerball®, only Mega Millions®, both Powerball® and Mega Millions®, or any other type of game.

Minimum Jackpot Size 1902. For example, the user may configure their participation in the lottery such that they will only be entered into lottery drawings where they jackpot size is estimated to be at least some amount, as configurable by the user.

Number of Entries 1903. For example, the user may configure their participation such that they will be entered for a particular number of entries, when designated.

Number of Entries for Particular Jackpot Sizes 1904. For example, the user could specify how many draws they wish to enter for particular jackpot thresholds. For example, the user may choose to enter only 1 entry for any drawing where the jackpot size is greater than $40M but less than $100M, and 3 entries for any draw where the jackpot size is equal to or greater than $100M but less than $400M, and 10 entries for any jackpot greater than $1B.

Play Selections and/or Game Attributes (e.g., numbers to be played) 1905. The user could specify whether or not they wanted to use their own numbers. In an embodiment where the user desired to select their own numbers, the system would prompt the user to enter their selected play numbers. In an embodiment where the UCSL stored-value lottery card 1300 is configured for play in a Powerball® lottery game, each play-selection will be similar to those described in relation to the attributes illustrated in FIG. 15, e.g., each play-selection 1520 may include six attributes 1522, particularly, a first, second, third, fourth, fifth, and sixth attribute 1522. Each of the first, second, third, fourth, and fifth attributes 1522 may be a number selected from sixty-nine (69) possibilities and the sixth attribute 1522 may be a number independently selected from twenty-six (26) possibilities. In an embodiment where the UCSL stored-value lottery card 1300 is configured for play in a Mega Millions® lottery game, each play-selection, e.g., play selection 1520 may include six attributes 1522, particularly, a first, second, third, fourth, fifth, and sixth attribute 1522. Each of the first, second, third, fourth, and fifth attributes 1522 may be a number selected from seventy (70) possibilities and the sixth attribute 1522 may be a number independently selected from twenty-five (25) possibilities. Alternatively, the user could select Quick Pick numbers to be generated and played on their behalf. Additionally, the user may desire to use the same numbers for every play, or may choose to use difference numbers for different plays.

Notification of Entry in a Drawing 1906. The user may specify if, and how, they wish to be notified that they have been entered in a drawing.

Notification of Drawing Results 1907. The user may specify if, and how, they wish to be notified of the results of a drawings, such as the winning numbers of a drawings. For example, a user may elect to receive a SMS message containing the winning numbers upon the drawing results. Such a SMS message might also include information related to their entries, such as the user's numbers.

Notification of Winnings 1908. The user may specify if, and how, they wish to be notified of any winnings.

Optional Games 1909. The user could specify their desire of playing optional side games such as PowerBall's "Powerplay"® product, or Mega Million's "Multiplier"® product.

Redemptions 1910. The user could specify the desired method for paying out low tier winnings (e.g., under $600), for example, traditional payout from any authorized lottery terminal, a physical redeemable winnings voucher, various electronic methods, including a digital gift card (e.g., a gift card associated with the user's E-Wallet), a credit to an existing debit card, PayPal®, Venmo®, a redeemable winnings voucher, or some other electronic payment method.

Similarly, where the UCSL device comprises the pre-printed lottery ticket 1500, examples of lottery-play criteria may include:

Which lottery game(s) into which the user wishes to be entered 1901. For example, the user may configure their participation for only Powerball®, only Mega Millions®, both Powerball® and Mega Millions®, or any other type of game.

Minimum Jackpot Size 1902. For example, the user may configure their participation in the lottery such that they will only be entered into lottery drawings where they jackpot size is estimated to be at least some amount, as configurable by the user.

Number of Entries 1903. For example, the user may configure their participation such that they will be entered for a particular number of entries, when designated.

Number of Entries for Particular Jackpot Sizes 1904. For example, the user could specify how many draws they wish to enter for particular jackpot thresholds. For example, the user may choose to enter only 1 entry for any drawing where the jackpot size is greater than $40M but less than $100M, and 3 entries for any draw where the jackpot size is equal to or greater than $100M but less than $400M, and 10 entries for any jackpot greater than $1B.

Notification of Entry in a Drawing 1906. The user may specify if, and how, they wish to be notified that they have been entered in a drawing.

Notification of Drawing Results 1907. The user may specify if, and how, they wish to be notified of the results of a drawings, such as the winning numbers of a drawings. For example, a user may elect to receive a SMS message containing the winning numbers upon the drawing results. Such a SMS message might also include information related to their entries, such as the user's numbers.

Notification of Winnings 1908. The user may specify if, and how, they wish to be notified of any winnings.

Optional Games 1909. The user could specify their desire of playing optional side games such as PowerBall's "Powerplay"® product, or Mega Million's "Multiplier"® product.

Redemptions 1910. The user could specify the desired method for paying out low tier winnings (e.g., under $600), for example, traditional payout from any authorized lottery terminal, a physical redeemable winnings voucher, various electronic methods, including a digital gift card (e.g., a gift card associated with the user's E-Wallet), a credit to an existing debit card, PayPal®, Venmo®, a redeemable winnings voucher, or some other electronic payment method.

At block 1816, the user-configurable lottery subscription plan 1705 may prompt the user to create an account 1770, for example, which would allow the user to access their settings in the future, which would allow the user to access the configuration screen following the initial set-up, if the user desires to modify a previous setting. For example, the account 1770 could allow a user to link its UCSL stored-value lottery card 1300 and/or UCSL pre-printed lottery ticket 1500 to another payment account, which in turn could be utilized to keep the user's UCSL stored-value lottery card 1300 and/or UCSL pre-printed lottery ticket 1500 funded, e.g., if the user's UCSL stored-value lottery card 1300 was initially purchased with $50.00 worth of game plays, the account 1770 could be configured to reload the UCSL stored-value lottery card 1300 to its original level whenever the value of the UCSL stored-value lottery card 1300 was reduced to a pre-selected amount, e.g., $5.00. Alternatively, if the user's UCSL pre-printed lottery ticket 1500 was initially purchased with $50.00 worth of game plays, the account 1770 could be configured to reauthorize the UCSL pre-printed lottery ticket 1500 for its original amount whenever the UCSL pre-printed lottery ticket 1500 is entered into a drawing by requesting that the account 1770 initiate the appropriate funds transfer to the appropriate funds recipient and notify the system 1720 that a funds transfer sufficient to increase the value of UCSL pre-printed lottery ticket 1500 back to its original amount has been initiated. The account 1770 could be created by entering an email address and password.

At block 1817, the user-configurable lottery subscription plan 1705 may prompt the user to confirm their desired subscription settings, the lottery system 1720 stores the subscription settings, and the lottery system 1720 may send a confirmation email to the user, indicating the configuration settings.

Following a successful enrollment in the user-configurable lottery subscription, the user may be entered in one or more lotteries.

At block 1818, at a specified time or interval prior to any drawing, the lottery system 1720 would receive information related to the upcoming drawings (e.g., jackpot size) for all relevant lottery draws via an API or such other service. At block 1819, the lottery system 1720 would determine which users should be entered into the upcoming drawing, based upon the received information. For example, the lottery system 1720 may compare the lottery-play criteria for each user-configurable lottery subscription plan 1705 with the information pertaining to the upcoming drawing. If the lottery system 1720 determines that all of the criteria set by a user are predicted to be fulfilled by the upcoming drawing, the lottery system 1720 will determine that the user should be entered in the upcoming drawing.

If the lottery system 1720 determines that the user should be entered in the upcoming drawing, the lottery system 1720 will cause the user to be entered into the drawing, at block 1820.

In one embodiment, the lottery system 1720 may interact with the relevant CGS, such as via an API or some other similar method, to cause the user's game selections to be entered into the next drawing, and the corresponding confirmation would be stored by the system. For example, the lottery system 1720 will determine the play selections associated with the user's enrollment, for example, which may be stored in the one or more records associated with the user enrollment and/or the UCSL device. In embodiments where the UCSL device is a stored-value lottery card 1300, the user may have selected their own play selections. Alternatively, where the UCSL device is a pre-printed lottery ticket 1500, the play selection will be one or more of the play selections 1520 included on the pre-printed lottery ticket 1500. The lottery system 1720 may also determine the CGS responsible for administering the lottery for the jurisdiction associated with the user's enrollment (e.g., the first CGS 1740*a*), for example, which may also be stored in the one or more records associated with the user's enrollment. The lottery system 1720 may also interact with the first CGS 1740*a*, via the first API 1725*a*, to enroll the play selections in the drawing for the lottery.

If the entry in the drawing is successful, the lottery system 1720 may receive an entry confirmation from the first CGS 1740*a*, which may include an indication of the drawing (e.g., the date and/or time of the drawing) in which the play selections were entered. Alternatively, if the entry in the drawing is unsuccessful, the lottery system 1720 may either receive an indication from the first CGS 1740*a* that the entry was not successful or fail to receive an entry confirmation within a predetermined time-period, thus indicating that the entry was unsuccessful. The lottery system 1720 may store the entry confirmation received from the first CGS 1740*a*.

If the entry in the drawing is successful, the lottery system 1720 may create a graphical representation of a lottery ticket—including the name of the game, the numbers and other ticket information including the date, the estimated jackpot size and any other relevant draw information—and communicate (e.g., by email other digital communication, such as SMS) the graphical representation of the ticket to the user, as a confirmation of the entry.

In another embodiment, the lottery system 1720 may interact with a lottery retailer, such as via an API or some other similar method, to obtain a lottery ticket meeting the user's game selections. For example, upon determining that certain play selections should be entered into an upcoming drawing, the lottery system 1720 may cause a ticket to be purchased from a lottery terminal within an authorized lottery retailer's premises. The resulting ticket that would be printed from the terminal, for example, on traditional lottery ticket stock, and would be identical in all respects, except for the particular draw information, to any other lottery ticket printed within that lottery jurisdiction, for that lottery game. The ticket would then be scanned or mimicked, and an image or other identifier of the ticket would be delivered to the user. The actual paper ticket would be kept in a secure (e.g., restricted, authorized-access, waterproof, and/or fireproof) location by the retailer or another party authorized to secure and retain the paper ticket (e.g., an authorized courier). In such an embodiment, shortly after the lottery drawing, the system 1720 would determine any winning tickets and would notify users of this invention of a win. Low-tier prizes (under $600) could be paid out electronically, such as a via closed loop gift card, an open loop gift card, transfer of funds to a PayPal® or Venmo® account, or a credit to any existing debit or credit previously identified by the owner of the winning ticket. In the event of a high-tier win (or if so desired by the user/owner of the ticket for a low-tier prize win), the user's/owner's actual ticket which had been retained by the retailer or authorized courier would be delivered to the user via secure messenger (or the user/owner could be notified so that the user/owner could retrieve the actual paper ticket at the location of the retailer or authorized courier). Upon receipt of the actual physical ticket by the user/owner, the user/owner could then present, in person, the actual physical ticket for redemption/prize collection at the appropriate redemption authority's location.

Following entry into one or more lotteries, the user can receive notifications and winnings as specified in the user-configurable lottery subscription.

For example, at block 1821, the lottery system 1720 may determine if the user's entry in the drawing constitutes a winning entry. For example, shortly after the drawing for that particular game, the lottery system 1720 would receive information from the relevant CGS indicating the winning entries, and the lottery system 1720 would make a determination if any of the users had winning entries. The lottery system 1720 may provide a notification comprising the winning attributes to the user, for example, via a desired communication channel, as specified by the user.

In some embodiments, the lottery system 1720 may be configured to also provide the user with an option to claim a prize associated with the ticket. For example, the user may be prompted as to whether or not the user wishes to be notified as to whether or not the ticket is a winning ticket. In some embodiments where the ticket is determined to have a redeemable value (e.g., by virtue of the ticket being a winning ticket), the lottery system 1720 may provide the user with options to redeem the lottery ticket, which may depend upon the amount and nature of the redeemable value.

In an embodiment, if the ticket was a low-tier winner, it would be paid out electronically according to the payout instructions the user had created in the configuration table. For example, the lottery system 1720 could generate a stored-value card containing the prize amount associated with the ticket, where the stored-value card could be delivered to the user electronically or by mail. Alternatively, the lottery system 1720 could add a stored-value account to the user's electronic wallet 1775; alternatively, the lottery system 1720 could direct the user to an authorized physical location (e.g., a lottery office) to redeem the lottery ticket (for example, if the redemption value exceeds a winnings threshold). Additionally or alternatively, the lottery system 1720 could present the user with the option to redeem the winnings in the form of additional lottery tickets (e.g., which may be presented virtually to the user) for play in a future lottery game. Additionally or alternatively, the lottery system 1720 could pay out the low-tier winning amount via a credit to an existing debit card, transfer of funds to a PayPal® or Venmo® account, or via some other electronic payment method.

Alternatively, if the ticket was a high-tier winner, the winning ticket holder would claim their prize by visiting a local lottery claim center and present the UCSL device for examination prior to claim.

In some embodiments, the user's enrollment may enable the user to participate in additional drawings, for example, where game selection that have been purchased remain unplayed after a drawing. For example, when the lottery system 1720 next determines that an entry for a particular drawing should be entered into that drawing, the lottery system 1720 repeat the process for any remaining game selections as previously disclosed.

In an embodiment where the user has chosen their own game selections via the user-configurable lottery subscription plan 1705, the lottery system 1720 may retrieve the stored game selections selected by the user and enter that game selection into the drawing. Alternatively, wherein the user has not chosen their own game selections (such as where the game selections are pre-printed, for example, where the UCSL device comprises a pre-printed lottery ticket 1500), the lottery system 1720 would retrieve the next, unused game selections (e.g., the second row) and enter that game selection into the drawing. This would continue, until all game selections for the UCSL device have been played or the entire value associated with the UCSL has been used.

In some embodiments disclosed herein are various devices, for example, a gaming device that may be configured to allow for a game to be accessed, loaded, or funded. In some embodiments, a gaming device may be configured to allow a user to access, for example, via a user device, one or more particular games; additionally or alternatively, in some embodiments a gaming device may be configured to allow a user to load one or more particular games onto a device, for example, a user device; additionally or alternatively, in some embodiments, a gaming device may be configured to allow a user to fund one or more games, for example, which may be played via a user device.

Figure 20:
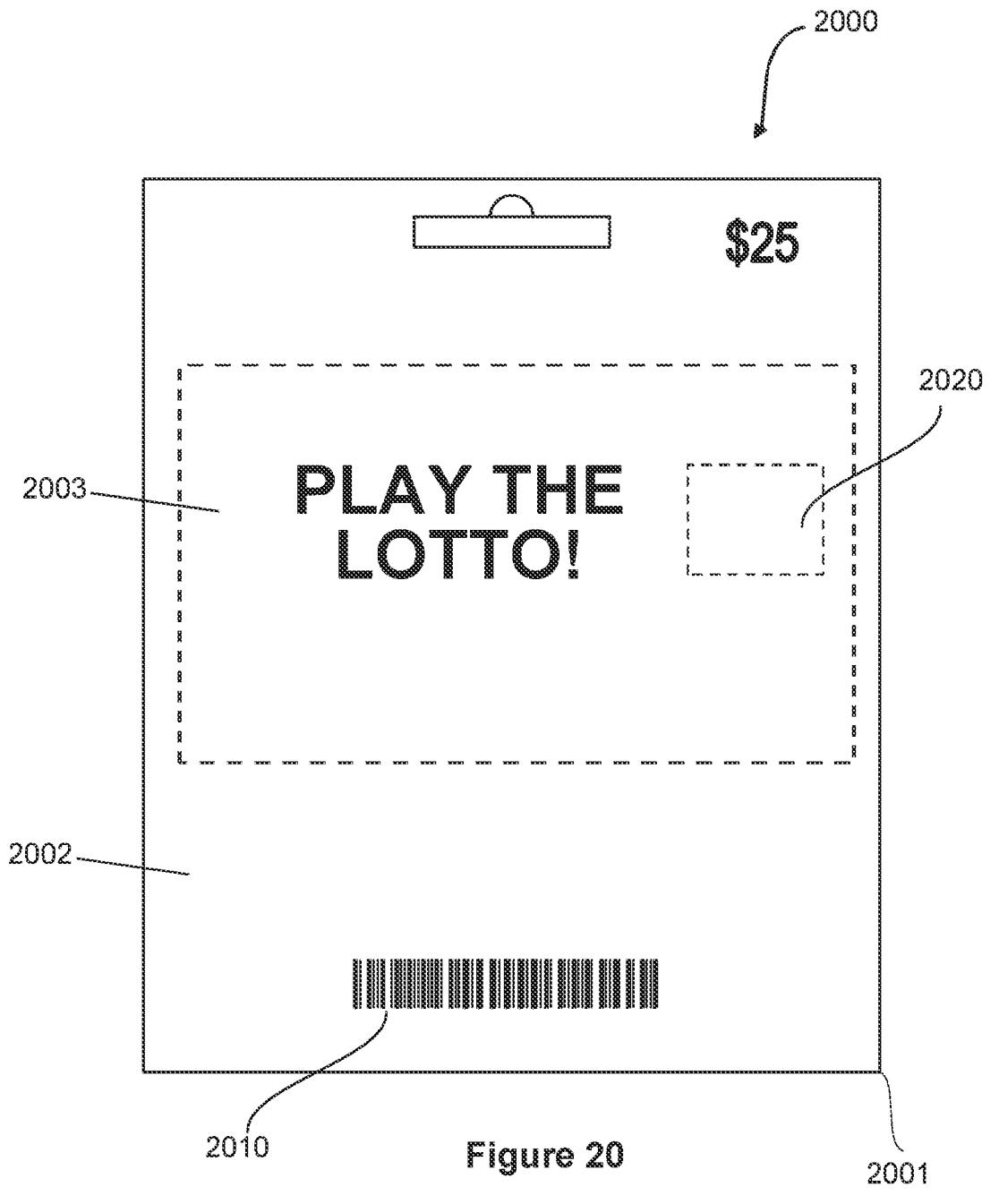
FIG. 20 illustrates an embodiment of a gaming device according to an embodiment of the disclosure.

Referring to FIG. 20, an embodiment of a gaming device 2000 is illustrated. In the embodiment of FIG. 20, the gaming device 2000 comprises a chit 2001. In the embodiment of FIG. 20, the chit 2001 is configured as a stand-alone component, for example, the chit 2001 may be configured for display in a retail establishment, for example, comprising a hanging cut-out. In the embodiment of FIG. 20, the chit 2001 may comprise a suitable material, for example, a cardstock, a cardboard, a chipboard, another paper material, a plastic, or combinations thereof, such as a paper material having a plastic coating. In some embodiments, the chit 2001 may include a packaging component 2002 and a removable card component 2003, for example, which may be integrated into and removable from the packaging component 2002, for example, following purchase and activation. Additionally or alternatively, in some embodiments the chit 2001 may serve as the packaging component 2002.

As similarly disclosed with respect to various other embodiments herein, the gaming device 2000 may comprise an activation code 2010 which may be machine-readable (such as via a scanner or card reader), human-readable, or both. For example, in various embodiments, the activation code 2010 may comprise a magnetic stripe, a bar-code (e.g., a linear barcode such as a UCC 128 barcode or a matrix barcode, such as a quick-response (e.g., a QR Code®), a number, a combination of letters and number, or combinations thereof. As will be further explained, the activation code 2010 may be unique, for example, with respect to the particular gaming device 2000 with which it is associated.

Also, the gaming device 2000 may comprise a user device-interface 2020, which may generally be configured to allow various data or information, as will be explained herein, to be stored by the gaming device 2000 and conveyed between the gaming device 2000 and a user device, for example, a PC, laptop, handheld device, mobile phone, or other device. In various embodiments, the user device-interface 2020 may comprise a contactless communication protocol device, examples of which may include near-field communication (NFC) and radio-frequency identification (RFID). Additionally or alternatively, the user device-interface 2020 may comprise a code that is readable via the user device, for example, via an optical reader, optical scanner, or camera of the user device, examples of which include a bar-code (e.g., a linear barcode such as a UCC 128 barcode or a matrix barcode, such as a quick-response code (e.g., a QR Code® —QR code is a registered trademark of Denso Wave Incorporated). Additionally or alternatively, the user device-interface may comprise a code that is readable by a user and can be input into the user device via a user interface, for example, a number, a combination of letters and numbers. In the embodiment of FIG. 20, the user device-interface 2020 is illustrated as a contactless communication protocol device, such as an NFC chip, although other configurations may be employed in alternative embodiments.

Figure 21A:
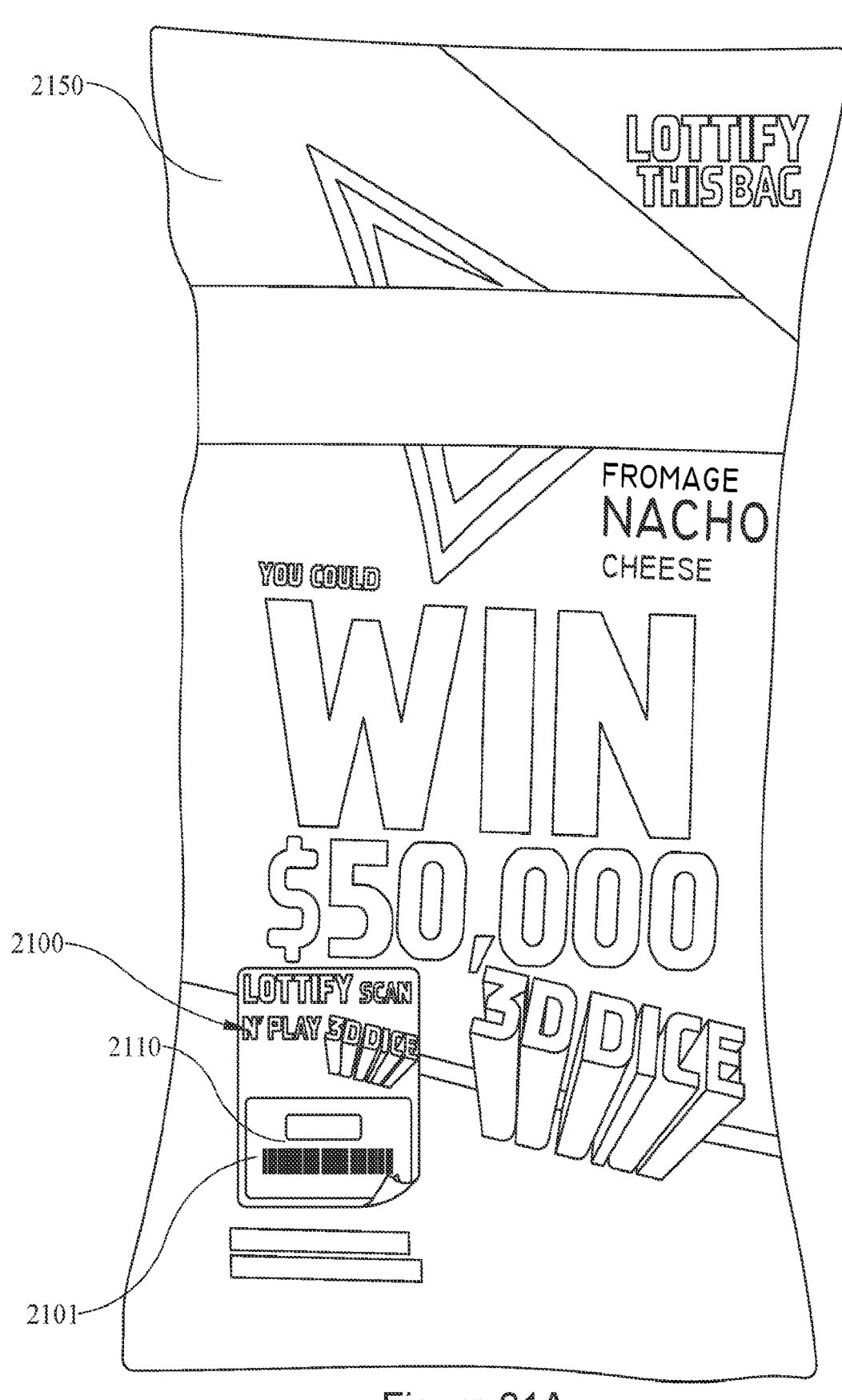
Figure 21B:
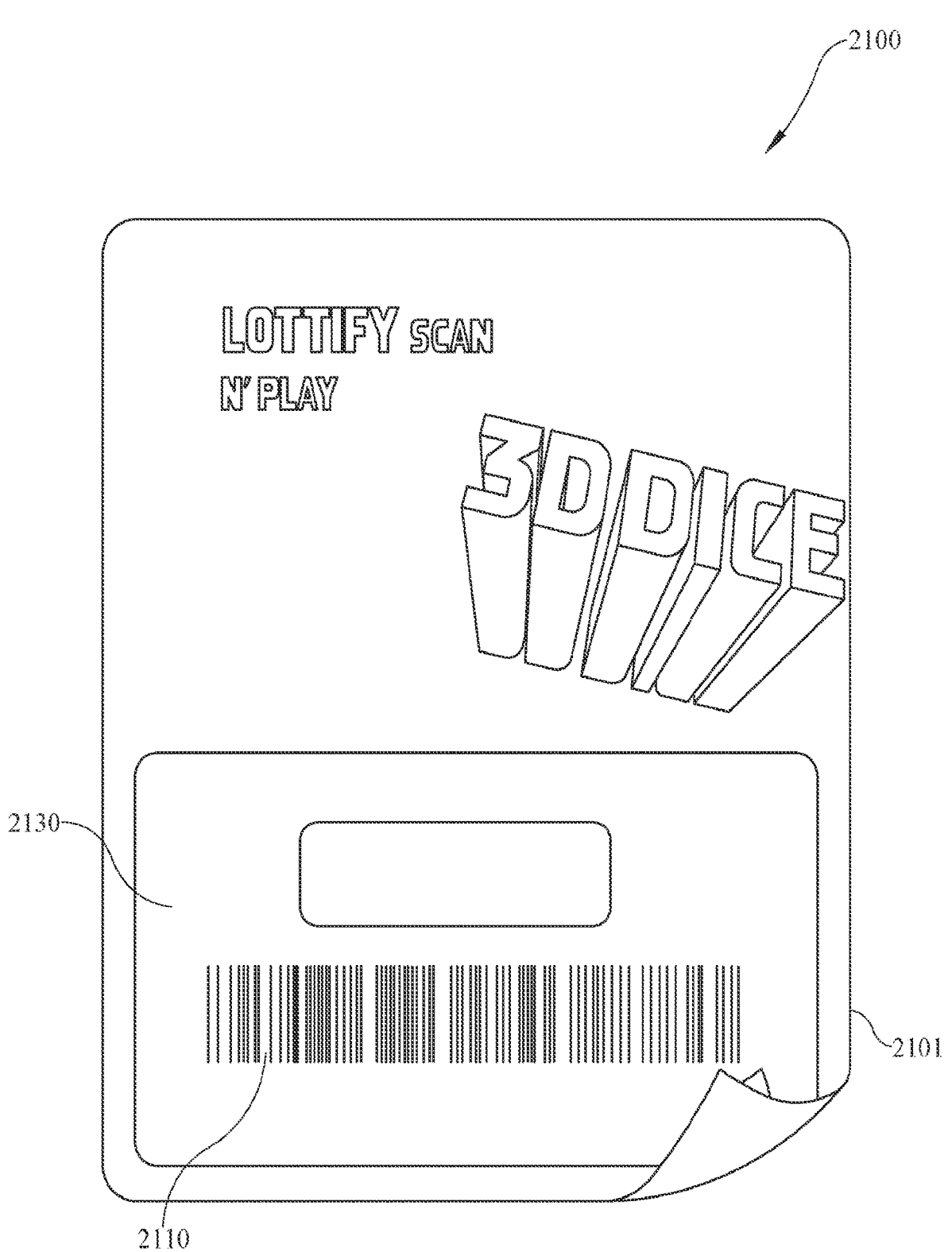

Also, referring to FIGS. 21A, 21B, and 21C, another embodiment of a gaming device 2100 is illustrated. In the embodiment of FIGS. 21A, 21B, and 21C, the gaming device 2100 may be generally configured to be associated with a consumer product 2150. In some embodiments, the gaming device 2100 comprises a chit 2101 configured for attachment to the consumer product 2150; for example, the chit 2101 may comprise a sticker or adhesive allowing the chit 2101 to be attached to the consumer product 2150. Alternatively, in some embodiments the gaming device 2100 may be incorporated into the consumer product 2150, such as incorporated into packaging for the consumer product 2150. Examples of consumer products with which a gaming device 2100 may be associated may include consumables such as convenience goods, for example, cold drinks, candy, ice-cream, bottled water, magazines, small-serving-size food-items, and the like; other examples include gift cards.

In the embodiment of FIGS. 21A, 21B, and 21C and as similarly disclosed with respect to various other embodiments herein, the gaming device 2100 may comprise an activation code 2110 which may be machine-readable (such as via a scanner or card reader), human-readable, or both, for example, a magnetic stripe, a bar-code (e.g., a linear barcode such as a UCC 128 barcode or a matrix barcode, such as a quick-response (e.g., a QR codes), a number, a combination of letters and number, or combinations thereof. The activation code 2110 may be unique, for example, with respect to the particular gaming device 2100 with which it is associated.

Also in the embodiments of FIGS. 21A, 21B, and 21C, and as similarly disclosed with respect to various other embodiments herein, the gaming device 2100 may comprise a user device-interface 2120 generally configured to allow various data or information, as will be explained herein, to be conveyed between the gaming device 2100 and a user device. In the embodiment of FIGS. 21A, 21B, and 21C, the user device-interface 2120 is illustrated as a QR Code®, for example, which may be readable via an optical reader, optical scanner, or camera of the user device, although other configurations may be employed in alternative embodiments.

In some embodiments, the gaming device 2100 comprises a covering 2130 configured to obscure the user device-interface 2120 such that the user device-interface 2120 cannot be viewed or accessed until the covering 2130 has been removed, such as until after the gaming device has been sold and activated. In various embodiments, the covering 2130 may include a material that may be suitably removed by a purchaser, such as a removable sticker or a scratch-off material such as a latex film. In the embodiment of FIGS. 21A, 21B, and 21C, the covering 2130 comprises a removable sticker having the activation code 2110 disposed thereon.

Referring to FIG. 22A, an embodiment of a method 2200 for activation of a gaming device is shown. The method 2200 of FIG. 22A is disclosed with reference to the gaming device 2000 of FIG. 20 and the gaming device 2100 of FIGS. 21A, 21B, and 21C, though the method 2200 may be similarly carried-out with respect to alternative embodiments of gaming devices.

In the embodiment of FIG. 22A, once the gaming device 2000 or the gaming device 2100 has been manufactured, it may be distributed to a retailer.

Figure 22B:
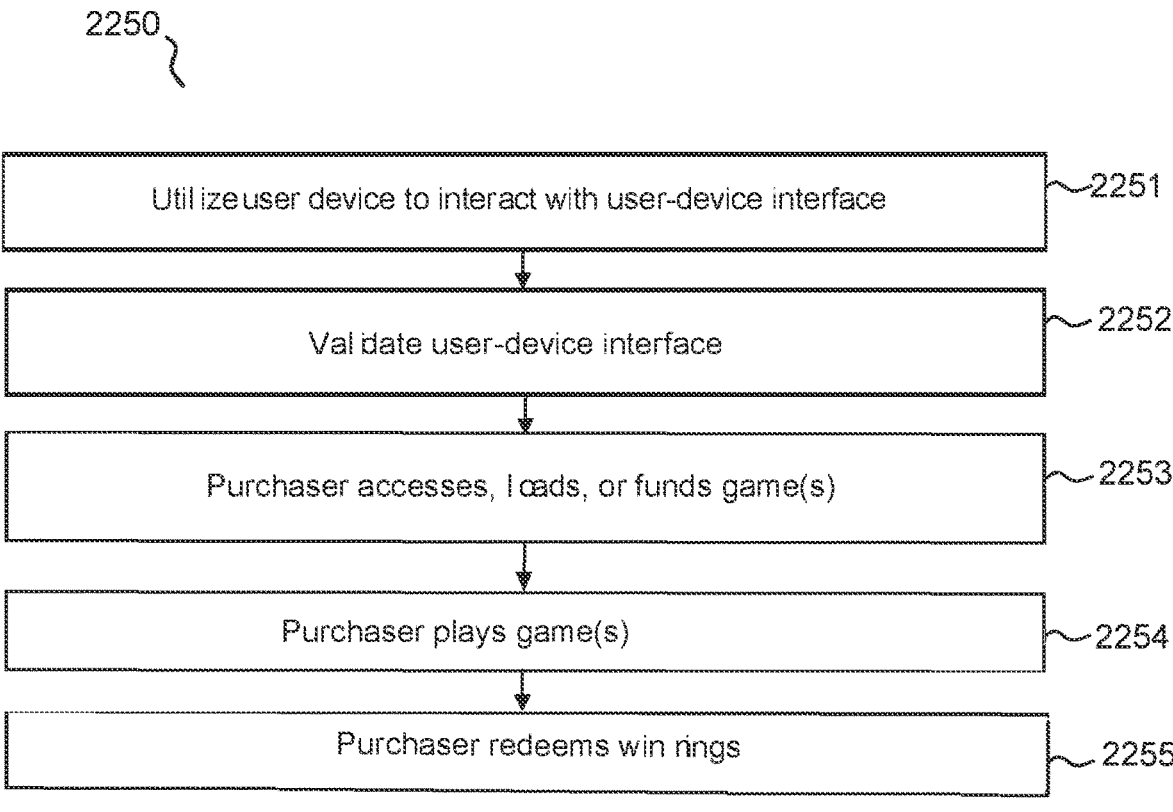

At block 2201, the method 2200 begins when a purchaser selects the gaming device 2000 or, in the embodiment of FIGS. 22A and 22B, a consumer product 2150 having the gaming device 2100 associated therewith, which may be displayed at the retailer. At block 1802, the purchaser proceeds to the POS terminal and presents the gaming device to the cashier to be scanned and purchased. At block 2203, at the POS terminal, the activation code (e.g., activation code 2010 or activation code 2110) may be read, such as via an I/O interface(s) or, alternatively, manually input at the POS terminal. At block 2204, the POS terminal displays the total due for the order. For example, the UPC associated with the gaming device may be read, for example, to determine price for the gaming device. At block 2205, the purchaser pays the amount due and at block 2206, the cashier then accepts the tender and updates the payment into the POS terminal.

At block 2207, the POS terminal generates a transaction request, particularly, an activation request, and communicates the activation request to the lottery system (e.g., lottery system 520 or 1720). The activation request may comprise, in addition to information uniquely identifying the gaming device being purchased (e.g., activation code 2010 or activation code 2110), information identifying the retailer, information identifying the POS terminal, information identifying the jurisdiction (e.g., the state) in which the gaming device is being purchased, or combinations thereof.

Upon receipt of the activation request, at block 2208, the lottery system may access one or more records associated with the gaming device referenced in the activation request and determine the validity of the activation request received from the POS terminal. In various embodiments, the lottery system may determine the validity of the activation request based upon (i) whether or not the gaming device referenced in the activation request has been previously activated; (ii) whether or not a retailer associated with the gaming device referenced in the activation request is consistent with the retailer referenced in the activation request; (iii) whether or not a POS terminal associated with the gaming device referenced in the activation request is consistent with the POS terminal referenced in the activation request; (iv) whether or not a jurisdiction associated with the gaming device referenced in the activation request is consistent with the jurisdiction referenced in the activation request; (v) whether or not the geographic location of the POS terminal associated with the purchase of the gaming device corresponds to a geographic location approved for the sale of the gaming device, or (vi) combinations thereof.

Upon a determination that the activation request is valid, at block 2209, the lottery system updates one or more records associated with the gaming device referenced in the activation request to indicate that the gaming device has been validly purchased and is active and, at block 2210, responds to the POS terminal with a response to the request indicating success or failure of the activation. If successful, the purchase transaction is complete. If unsuccessful, the POS terminal may indicate the failure and the funds tendered by the purchaser may be returned.

In some embodiments, for example, where the user device-interface 2020 comprises a contactless communication protocol device, for example, NFC or RFID, upon receipt of the response indicating success or failure of the activation of the gaming device, the cashier may be instructed to take one or more additional actions to complete the activation. For example, in some embodiments, the cashier may be instructed to scan the NFC of RFID device of the gaming device, for example, via a NFC or RFID reader/scanner to communicate the activation to the NFC of RFID device of the gaming device, for example, so that the NFC of RFID device of the gaming device is made active and usable, as will be disclosed herein, by the purchaser.

Also, in embodiments where a covering (e.g., covering 2130) obscures any part of the gaming device, the covering may be removed upon completion of the purchase and activation.

Following a successful purchase transaction, the purchaser may use a gaming device to access, load, or fund a game. Referring to FIG. 22A, an embodiment of a method 2250 for activation of a gaming device is shown.

At block 2251, the purchaser may utilize their user device to interact with the user device-interface (e.g., user device-interface 2020 or 2120). For example, in various embodiments, the user may utilize an application or program residing on their user device to scan or read information or data from the user device interface. Alternatively, in some embodiments the user may enter a code into the user device, for example, via an application or program residing on their user device or into a portal accessed via the user device.

At block 2252, in some embodiments, the user device-interface (e.g., user device-interface 2020 or 2120) may be validated by a lottery system to ensure that the gaming device is active, for example, by accessing one or more records associated with the gaming device. If the status indicated inactive, the lottery system 1720 may display a message informing the user that the gaming device was inactive. Until the user device is validated, the lottery system may not allow accessing, loading, and/or funding one or more games.

Upon validation, at block 2253, the purchaser may be allowed to access, load, or fund one or more games. For example, in some embodiments, the user device-interface may be configured to cause the user device to access one or more games referenced via the user device-interface. For example, the upon an interaction between the user device-interface and the user device, as disclosed herein, the user device may be caused to access a game. For example, the information or data obtained from the user device-interface may serve as an access key to a gaming portal.

Additionally or alternatively, in some embodiments, the user device-interface may be configured to cause the user device to load (e.g., download and install software for) one or more games stored via the user device-interface, such as where the user device interface comprises an NFC chip. Additionally or alternatively, in some embodiments, the user device-interface may be configured to cause the user device to load (e.g., download and install software for) one or more games stored remotely, such as via an internet connection.

Additionally or alternatively, in some embodiments, the user device-interface may be configured to cause the user device to apply a value (such as a number of plays or an amount that can be wagered) to a user's account such that the user may utilize the value to play one or more games.

In various embodiments, the game being accessed, loaded, or funded, can be any wagering-type game capable of being played virtually (e.g., via the user device), examples of which include the virtual lottery tickets disclosed herein. Other examples may include virtual manifestations of lotteries, blackjack, poker, craps, slot machines, roulette, bingo, and dice.

At block 2254, the purchaser may play one or more games via their user device and may obtain prize-winnings. At block 2255, the user device may be configured to also provide the user with an option to claim a prize resulting from play of the gaming device. For example, where the winnings have a low-tier value, the winnings would be paid out electronically, such as by a stored-value card containing the prize amount to be delivered to the user electronically or by mail or added a stored-value account to the user's electronic wallet; alternatively, the user device could direct the user to an authorized physical location (e.g., a lottery office) to redeem the lottery ticket (for example, if the redemption value exceeds a winnings threshold). Additionally or alternatively, the user could have the option to redeem the winnings in the form of additional lottery tickets (e.g., which may be presented virtually to the user) for play in a future game.

In an embodiment, a customer (e.g., a user, a player, and/or a participant) may receive a separate redeemable winnings voucher which may be used to convert representations of value associated with the results of a customer's: (1) entry in a lottery game; (2) playing an electronic gaming machine (EGM); (3) playing a casino-styled non-electronic game; (4) playing a coin operated amusement machine (COAM); (5) playing a virtual game on a user device; (6) wagering; (7) or combinations thereof, into a customer-useable form of value. Customer-useable forms of value can include lottery tickets, credits for an EGM, cash, stored-value cards, loyalty tokens (e.g., points, miles, stays), or combinations thereof.

Examples and embodiments of a redeemable winnings voucher will be provided below in the context of a mobile point of sale application for the redemption of game winnings associated with a user's interaction with an EGM.

EGMs, such as COAMs, which are redemption devices which are also games of luck and/or skill, may allow a successful customer to carry over points won on one play to a subsequent play or plays.

Without the instantly disclosed redeemable winnings voucher, when a customer decides to leave and has credits remaining on an EGM, the credits are converted to a cash value and are output as a ticket voucher via the printer where the cash value is typically printed on the ticket. The printed ticket voucher can then be redeemed for its cash value.

There are several noted problems associated with redeeming a printed ticket voucher for cash. First, the customer holding the ticket voucher must often times traverse a crowded casino floor to locate a cashier booth. Second, upon finding the cashier booth, the customer seeking to redeem his printed ticket voucher must wait in a slowly moving queue for his turn to interact with the cashier. Third, the customer seeking to redeem his printed ticket voucher must be willing to accept the redemption amount in cash. Disclosed herein are embodiments of a mobile point of sale redemption system for lotteries, EGMs, and/or COAMs which address and solve each of these aforementioned problems. Also disclosed herein are embodiments of methods of utilizing a mobile point of sale redemption system which addresses and solves each of these aforementioned problems.

In an embodiment, a lottery, an EGM, and/or COAM mobile point of sale redemption system may comprise a mobile point of sale application (MPOS), a redemption clerk, a central gaming system (CGS), a redeemable winnings voucher, and a stored-value card providing device.

In an embodiment, the MPOS may be loaded on and/or accessed via personal computers, laptops, handheld devices, tablets, mobile phones, other electronic devices, or combinations thereof.

In an embodiment, the redemption clerk may be an employee or contractor of the entity which provides redemption services for lotteries', EGMs', and/or COAMs' redeemable winnings vouchers. In another embodiment, the redemption clerk may be a kiosk, a personal computer, a laptop, a handheld device, a tablet, a mobile phone, other electronic devices, or combinations thereof. For example, the redemption clerk may access the MPOS to satisfy a redeemable winnings voucher holder's request for redemption. In an embodiment, a kiosk may comprise the redemption clerk and the MPOS.

In an embodiment, the CGS may comprise a state agency or bureau which establishes, authorizes, manages, regulates, and polices a jurisdiction's lottery and/or electronic gaming activities which provide winnings which are redeemable as cash or cash equivalents. In an embodiment, the CGS may comprise a third party provider which has contracted with and/or has been engaged by said state agency or bureau to provide gaming and redemption services.

For example, in an embodiment, a COAM located in a casino, gaming parlor, or convenience store would be under the authority of a CGS and not merely the casino, gaming parlor, or convenience store; the casino, gaming parlor, or convenience store would provide access to the COAM, but not independently control the COAM.

In an embodiment, a redeemable winnings voucher would be provided to a customer upon that customer's request. The redeemable winnings voucher would allow the customer to convert its current account value/points/winnings, e.g. representations of value, for the customer's game, into cash, a cash equivalent, or other customer-useable value. The customer's representations of value may comprise electronic gaming points, electronic gaming virtual values, electronic gaming monetary amounts, coin operated amusement machine points, coin operated amusement machine monetary amounts, lottery winnings values, lottery account values, casino account values, virtual account values, or combinations thereof.

In an embodiment, cash equivalent may comprise a gift card, an open-loop stored-value card, a closed-loop stored value card, or combinations thereof. In an embodiment the redeemable winnings voucher may be printed out and may comprise identifiers which identify: (1) the redemption amount (e.g., a dollar value); (2) a unique redemption ID; (3) the player's name and/or other identifying information; (4) a game ID; (5) the date; (6) the time; or (7) combinations thereof.

In an EGM/COAM embodiment, the redeemable winnings voucher would be provided by the EGM/COAM to a customer upon that customer's request. The redeemable winnings voucher would allow the customer to convert its current account value/points/winnings at that EGM/COAM into cash or a cash equivalent. In an embodiment, cash equivalent may comprise a gift card, an open-loop stored-value card, a closed-loop stored value card, or combinations thereof. In an embodiment the redeemable winnings voucher may be printed out by the EGM/COAM and may comprise identifiers which identify: (1) the redemption amount (e.g., a dollar value); (2) a unique redemption ID; (3) the player's name and/or other identifying information; (4) an EGM/COAM device ID; (5) the date; (6) the time; or (7) combinations thereof.

In an embodiment the redeemable winnings voucher may be a physical item which is physically printed out by the EGM/COAM and provided to the customer in the form of a chit, ticket, receipt, or combinations thereof.

In an embodiment, the redeemable winnings voucher may be a virtual item, such as a virtual redeemable winnings voucher, which is provided to the customer via delivery to the customer's mobile phone (or other smart, personal device) or via delivery of a link to, and/or address and authorization to access, a website to the customer's mobile phone (or other smart, personal device), wherein accessing the website will provide the customer with the virtual redeemable winnings voucher. In an embodiment, the virtual redeemable winnings voucher may be delivered to the customer's mobile phone (or other smart, personal device) by a communication via a broadband, optical, Wi-Fi, Bluetooth, NFC, cellular, satellite, or other network.

In an embodiment, the stored-value card providing device may be the redemption clerk, wherein the redemption clerk accesses a supply of unactivated and unloaded stored-value cards. In an embodiment, the stored-value card providing device may be a third party-controlled database which maintains a volume of unactivated and unloaded electronic stored-value cards. In an embodiment, the redemption clerk may access a supply of physical unactivated and unloaded stored-value cards or a database of unactivated and unloaded electronic stored-value cards.

FIG. 23 illustrates a method for providing a customer with a stored-value card which has been activated and loaded with funds representing the customer's request to cash out points from a game. Particularly, FIG. 23 illustrates a method 2300 for providing a COAM customer 2350 with a stored-value card 2323 which has been activated and loaded with funds representing the COAM customer's request to cash out points from a COAM device's game. While FIG. 23 is presented in the context of a COAM customer requesting a redeemable winning voucher for a COAM game, it is understood that the below process is equally applicable to a lottery customer, EGM customer, wagering customer, or other customer and such customer's request for a redeemable winnings voucher.

At 2301, a COAM customer 2350 (i.e., a player) makes a cash out request 2314 to a COAM device 2360, the COAM device 2360 being an EGM on which the COAM customer 2350 was playing a game and accumulating electronic points and/or credits. At 2302, the COAM device 2360 receives the cash out request 2314 and formulates a cash out message 2315 which will be sent to the CGS 2370. The cash out message 2315 may comprise information which identifies the points and/or credits to be converted into cash or cash equivalents (the redemption amount 2317), the COAM customer 2350, the COAM device 2360, or combinations thereof. The COAM device 2360 sends the cash out message 2302 to the CGS 2370. At 2303, the CGS 2370 receives the cash out message 2315 and processes the cash out message 2315. AT 2304, the CGS 2370 confirms the requested redemption amount 2317 (by determining that the requested redemption amount corresponds to an indication of actual value maintained in a database accessible by the CGS) and creates a unique redemption ID 2316, associates the unique redemption ID 2316 with the redemption amount 2317 and sends the unique redemption ID 2316 to the COAM device 2360 as a voucher message 2318. The COAM device 2360 receives the voucher message 2318 and provides the COAM customer 2350 with a redeemable winnings voucher 2319. As shown in FIG. 1, at 2305, the COAM device 2360 provides customer 2350 a redeemable winnings voucher 2319. In an embodiment, the COAM device 2360 prints out a physical redeemable winnings voucher 217 for the COAM customer 2350 to possess. In another embodiment, the COAM device 2360 may provide the COAM customer 2350 with a virtual redeemable winnings voucher 227, the provision being made by the COAM device 2360 to a mobile phone or other smart device of the COAM customer 2350. In another embodiment, the COAM device prints out a physical redeemable winnings voucher 217 for the COAM customer 2350 and provides the COAM customer 2350 with a virtual redeemable winnings voucher 227. The redeemable winnings voucher 2319 (e.g., physical redeemable winnings voucher 217 and/or virtual redeemable winnings voucher 227) may comprise one or more indicia, the one or more indicia which encodes and/or may convey information which identifies the redemption amount 2317, the unique redemption ID 2316, the COAM customer 2350, the COAM device 2360, or combinations thereof. In various embodiments, the indicia may be machine-readable (such as via a scanner or card reader), human-readable, or both. For example, in various embodiments, the indicia may comprise a magnetic stripe, a barcode (e.g., a linear barcode such as a UCC 128 barcode or a matrix barcode, such as a quick-response code (e.g., a QR Code®—QR Code® is a registered trademark of Denso Wave Incorporated)) a number, a combination of letters and number, or combinations thereof.

As is also shown in FIG. 1, at 2306, the COAM customer 2350 may present the redeemable winnings voucher 2319 to a redemption clerk 2380. At 2307, the redemption clerk 2380 interprets the indicia on the redeemable winnings voucher 2319, e.g. scans a barcode redeemable winnings voucher 2319. The interpreted indicia is used by MPOS 2390 to validate the redeemable winnings voucher 2319. At 2308, The MPOS 2390 communicates the redemption amount 2317 and the unique redemption ID 2316 to the CGS 2370. At 2309, the CGS 2370 confirms the redeemable winnings voucher 2319 by confirming the redemption amount 2317 and the unique redemption ID 2316 are properly associated and sends a message to the MPOS 2390 which includes an amount of funds 210 to load onto a stored-value card 2323 corresponding to the information associated with the redeemable winnings voucher 2319. At 2310, the MPOS 2390 prompts the redemption clerk 2380 to activate and load a stored-value card 2323 with the funds 210. At 2311, the redemption clerk 2380 uses the MPOS 2390 to activate the stored-value card 2323 and to load funds 210 onto the stored-value card 2323. The stored-value card 2323 is activated and loaded based on the message directly received by the MPOS from the CGS 2370. At 2312, the activation of the stored-value card 2323 is confirmed. At 113, the activated and loaded stored-value card 2324 is presented to COAM customer 2350. The activated and loaded stored-value card 2324 may be physically provided to the customer; virtually provided to the customer via delivery to an electronic wallet, email, text account, or other electronically maintained account of the customer; or both physically and virtually delivered to the customer.

Figure 24:
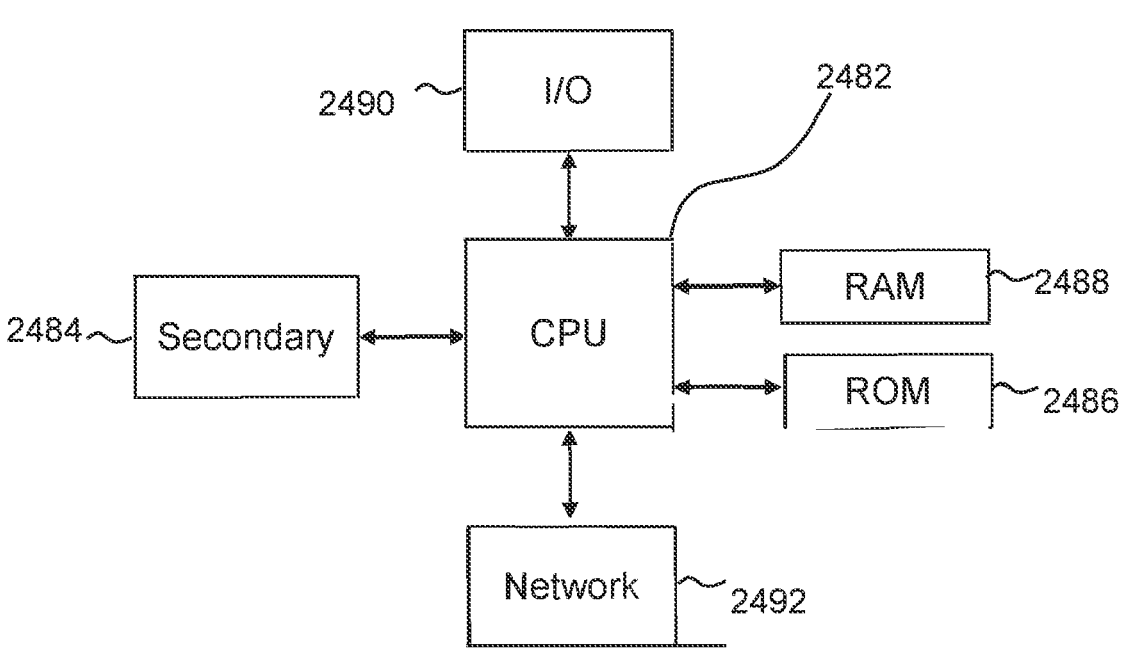
FIG. 24 illustrates a particular machine suitable for implementing the several embodiments of the disclosure.

All of, or a portion of, the system described above may be implemented on any particular machine, or machines, with sufficient processing power, memory resources, and throughput capability to handle the necessary workload placed upon the computer, or computers. FIG. 24 illustrates a computer system 2480 suitable for implementing all, or a portion of, one or more embodiments disclosed herein. The computer system 2480 includes a processor 2482 (which may be referred to as a central processor unit or CPU) that is in communication with memory devices including secondary storage 2484, read only memory (ROM) 2486, random access memory (RAM) 2488, input/output (I/O) devices 2490, and network connectivity devices 2492. The processor 2482 may be implemented as one or more CPU chips.

It is understood that by programming and/or loading executable instructions onto the computer system 2480, at least one of the CPU 2482, the RAM 2488, and the ROM 2486 are changed, transforming the computer system 2480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 2484 is typically comprised of one or more disk drives or tape drives and is used for non-volatile storage of data and as an over-flow data storage device if RAM 2488 is not large enough to hold all working data. Secondary storage 2484 may be used to store programs which are loaded into RAM 2488 when such programs are selected for execution. The ROM 2486 is used to store instructions and perhaps data which are read during program execution. ROM 2486 is a non-volatile memory device which typically has a small memory capacity relative to the larger memory capacity of secondary storage 2484. The RAM 2488 is used to store volatile data and perhaps to store instructions. Access to both ROM 2486 and RAM 2488 is typically faster than to secondary storage 2484. The secondary storage 2484, the RAM 2488, and/or the ROM 2486 may be referred to in some contexts as computer readable storage media and/or non-transitory computer readable media.

I/O devices 2490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 2492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 2492 may enable the processor 2482 to communicate with the Internet or one or more intranets. With such a network connection, it is contemplated that the processor 2482 might receive information from the network or might output information to the network in the course of performing the above-described method steps. Such information, which is often represented as a sequence of instructions to be executed using processor

2482, may be received from and outputted to the network, for example, in the form of a computer data signal embodied in a carrier wave.

Such information, which may include data or instructions to be executed using processor 2482 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 2482 executes instructions, codes, computer programs, scripts which it accesses from hard disk, floppy disk, optical disk (these various disk-based systems may all be considered secondary storage 2484), ROM 2486, RAM 2488, or the network connectivity devices 2492. While only one processor 2482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 2484, for example, hard drives, floppy disks, optical disks, and/or other device, the ROM 2486, and/or the RAM 2488 may be referred to in some contexts as non-transitory instructions and/or non-transitory information.

In an embodiment, the computer system 2480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 2480 to provide the functionality of a number of servers that is not directly bound to the number of computers in the computer system 2480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 2480, at least portions of the contents of the computer program product to the secondary storage 2484, to the ROM 2486, to the RAM 2488, and/or to other non-volatile memory and volatile memory of the computer system 2480. The processor 2482 may process the executable instructions and/or data structures in part by directly accessing the computer program product, for example by reading from a CD-ROM disk inserted into a disk drive peripheral of the computer system 2480. Alternatively, the processor 2482 may process the executable instructions and/or data structures by remotely accessing the computer program product, for example by downloading the executable instructions and/or data structures from a remote server through the network connectivity devices 2492. The computer program product may comprise instructions that promote the loading and/or copying of data, data structures, files, and/or executable instructions to the secondary storage 2484, to the ROM 2486, to the RAM 2488, and/or to other non-volatile memory and volatile memory of the computer system 2480.

In some contexts, the secondary storage 2484, the ROM 2486, and the RAM 2488 may be referred to as a non-transitory computer readable medium or a computer readable storage media. A dynamic RAM embodiment of the RAM 2488, likewise, may be referred to as a non-transitory computer readable medium in that while the dynamic RAM receives electrical power and is operated in accordance with its design, for example during a period of time during which the computer 2480 is turned on and operational, the dynamic RAM stores information that is written to it. Similarly, the processor 2482 may comprise an internal RAM, an internal ROM, a cache memory, and/or other internal non-transitory storage blocks, sections, or components that may be referred to in some contexts as non-transitory computer readable media or computer readable storage media.

Figure 25A:
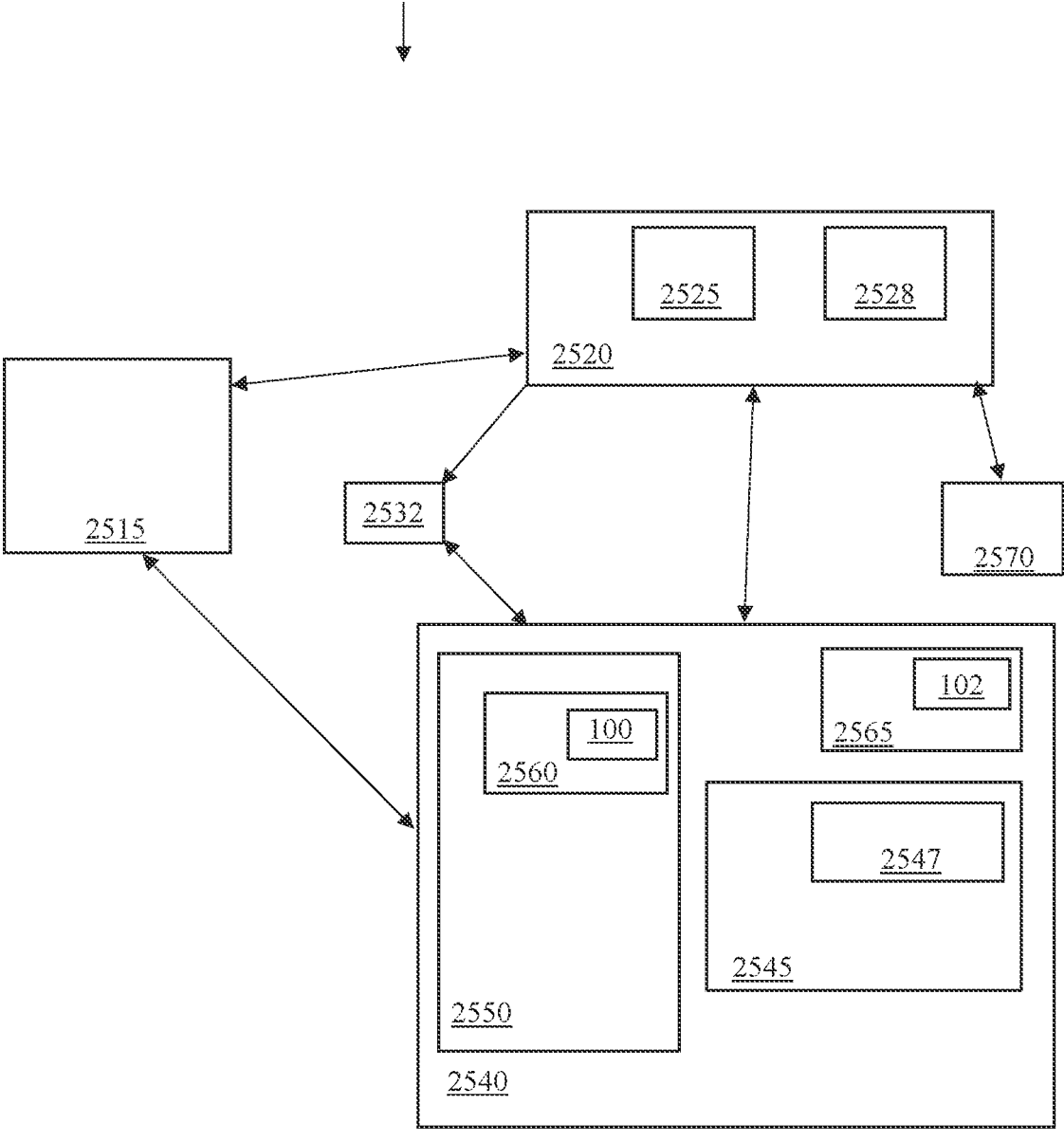
FIGS. 25A-C illustrate various embodiments of a system for completing a remotely ordered lottery ticket transaction via a physical point of sale payment.
Figure 25B:
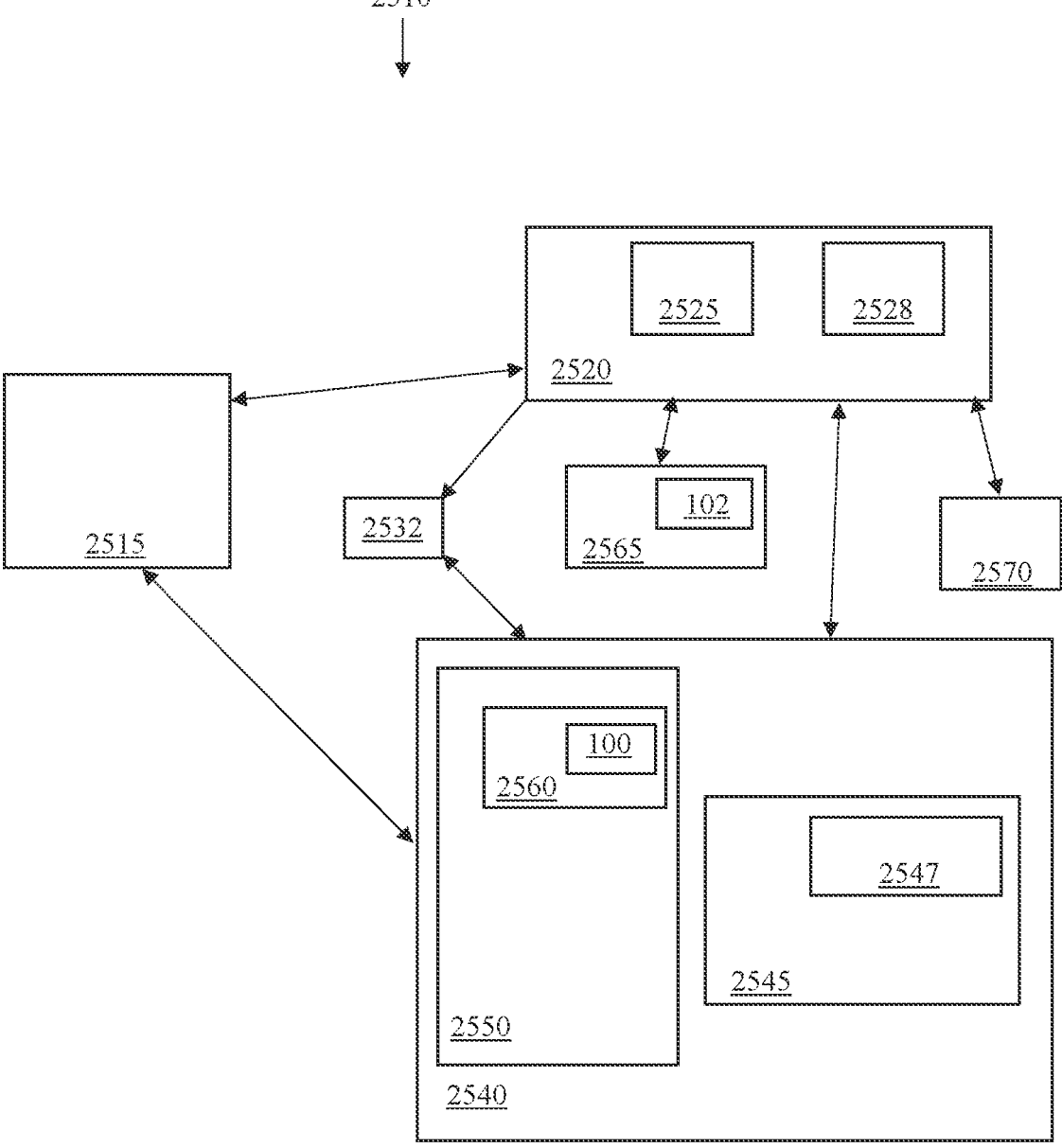
Figure 25C:
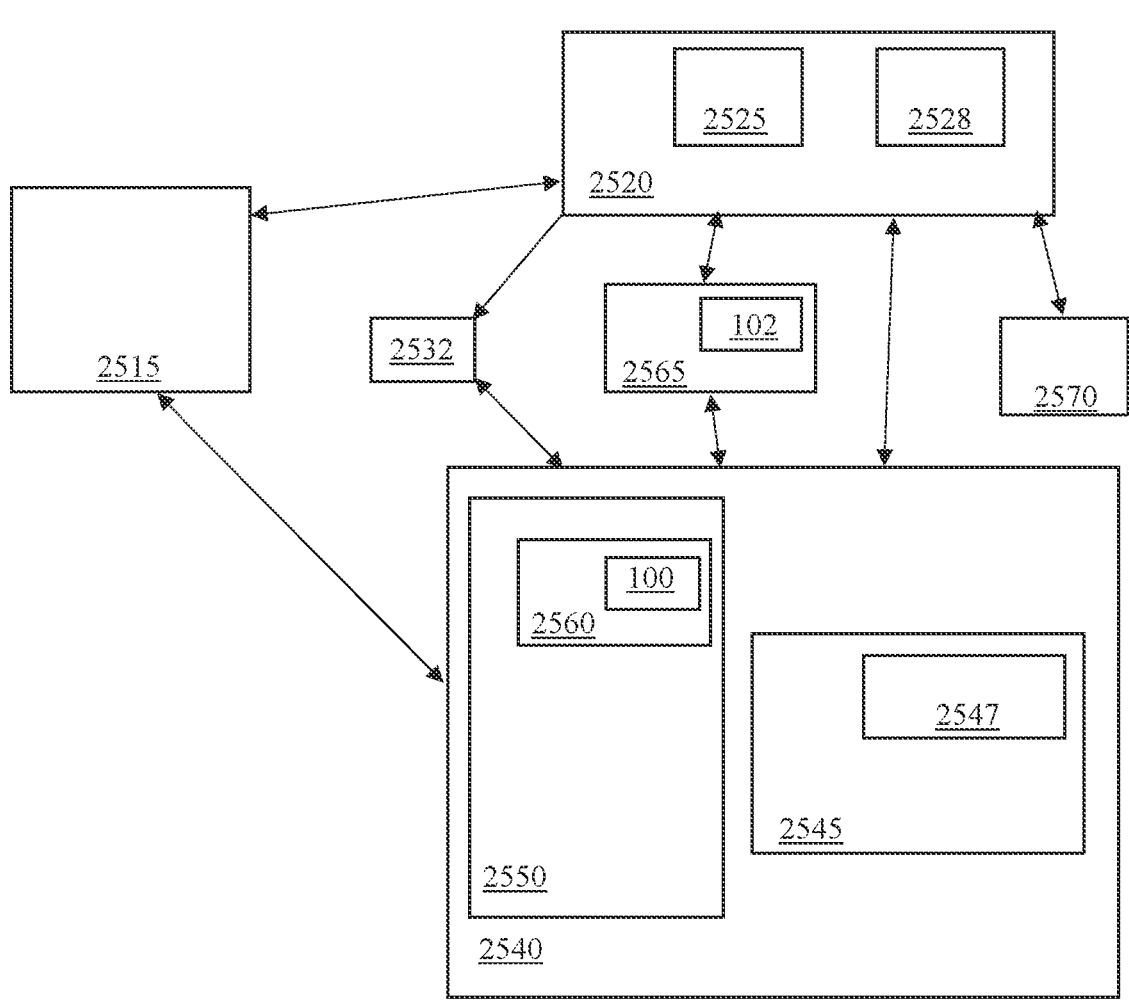

FIGS. 25A-C are schematic illustrations of embodiments of a remote lottery ticket purchasing system 2510 according to the disclosure. Embodiments of the disclosed system for providing a remotely ordered lottery ticket 2501 comprise a remotely ordered lottery ticket provider 2540 (wherein the remotely ordered lottery ticket provider 2540 also comprises a physical point of sale 2550, a remotely ordered lottery ticket provider's processing device 2545, and an online ordering portal 2547), a user device 2515, a fulfillment computer device 2520, e.g., a microprocessor system configured to integrate with the online ordering portal 2547 (wherein the fulfillment computer device 2520 also comprises a location determination component 2525 and a transaction completion authorization component 2528), an inventory of draw-type pre-printed lottery tickets 2560, an electronically stored inventory of virtual draw-type pre-selected lottery tickets 2565, a lottery ticket approved sales location database 2570, a remotely ordered lottery ticket 2501 (e.g., a draw-type pre-printed lottery ticket 100 and/or a virtual draw-type pre-selected lottery ticket 102), or combinations thereof. In some embodiments the user device 2515 may also function as the physical point of sale 2550, e.g., when the user device is located in an approved geographic location for the sale of a remotely ordered lottery ticket 2501. In the context of the disclosed remote lottery purchasing system 2510 the terms "remote" and "remotely" are to be understood to mean that a request for a remotely ordered lottery ticket 2501 is initiated at and/or transmitted from a geographic location which is separated from the remotely ordered lottery ticket provider 2540 component which provides the remotely ordered lottery ticket 2501. The distance between the geographic location of the request for a remotely ordered lottery ticket 2501 and the geographic location of the remotely ordered lottery ticket provider 2540 component which provides the remotely ordered lottery ticket 2501 may be in the range of 0.1 m-10 m, 10 m-100 m, 100 m-1,000 m, 1,000 m-10,000 m, 10,000 m-to 100,000 m, 100,000 m-1,000,000 m, 1,000,000 m-10,000,000 m, or 10,000,000 m-20,000,000 m.

The components of the remote lottery ticket purchasing system 2510 may be operably connected via one or more networks (e.g., broadband, optical, Wi-Fi, Bluetooth, NFC, cellular, satellite, cloud, card processing network, banking network, a local area network, the World Wide Web for Internet, non-cellular mobile phone network, a land-line network, Public Switched Telephone Network (PSTN), a dedicated communication line, other networks for transferring electronic information, or combinations thereof). Particularly, the user device 2515 may be operably connected to the fulfillment computer device 2520 and/or the remotely ordered lottery ticket provider 2540 via the network, and vice-versa.

The user device 2515 may comprise a personal computer, a tablet, a smartphone, a cloud computing system, a server, or combinations thereof. The device 2532 used by the user or consumer to complete the purchase the remotely ordered lottery ticket 2501 may be the same or different device from the user device 2515. In an embodiment, the user or consumer may purchase a remotely ordered lottery ticket 2501 using the user device 2515 (e.g., via a merchant's online ordering portal by activating a hyperlink associated with the desired remotely ordered lottery ticket 2501, selecting an icon associated with the desired remotely ordered lottery ticket 2501, or other common methods for placing a desired item for purchase into an online virtual shopping cart). In additional or alternative embodiments, the user may enter information required or requested for ordering a remotely ordered lottery ticket 2501 using the user device 2515. In an embodiment, the user may scan an intelligent code, e.g., a QR code, for a remotely ordered lottery ticket 2501 using the user device 2515. In an additional or alternative embodiment, the user may scan a barcode for a remotely ordered lottery ticket 2501 using the user device 2515. In an additional or alternative embodiment, the user may enter a product identification number for a remotely ordered lottery ticket 2501 using the user device 2515.

The fulfillment computer device 2520 may have any suitable configuration for performing the functions disclosed herein (e.g., a personal computer, a tablet, a smartphone, a cloud computing system, a server, or combinations thereof). The fulfillment computer device 2520 is configured to communicate with remotely ordered lottery ticket provider's processing device 2545 (e.g., of a merchant, retailer, wholesaler, or other authorized remotely ordered lottery ticket provider 2540).

The fulfillment computer device 2520 is configured to accomplish the embodiments of the methods disclosed herein. In embodiments, the fulfillment computer device 2520 of FIGS. 25A-C is configured to a receive a request 2521 for a remotely ordered lottery ticket 2501 (directly from a user device 2515 or from a remotely ordered lottery ticket provider 2540 (e.g., a merchant, a grocer, a retailer, a wholesaler, a convenience store, etc.), wherein the remotely ordered lottery ticket provider 2540 receives the request 2521 via a computer and/or communications component (e.g., via a remotely ordered lottery ticket provider's processing device 2545); to integrate with an online order portal 2547 and associated online sales system computer devices, e.g., a remotely ordered lottery ticket provider's processing device 2545; to determine if the request 2521 is a proper request 2522 (e.g., via a determination that the request 2521 was received from a user device 2515 located in an approved location for the sale of the remotely ordered lottery ticket 2501 by comparing the geographic location of the user device 2515 submitting the request 2521 to approved geographic locations for the sale of the requested lottery ticket 2501 stored in a database of approved geographic locations for lottery tickets available for sale 2570); to communicate to the user device 2515 and/or the remotely ordered lottery ticket provider 2540 the validity of the request, e.g., whether the request 2521 is a proper request 2522; to receive a purchase verification 2530 for the remotely ordered lottery ticket 2501 from the physical point of sale 2550 of the remotely ordered lottery ticket 2501; to provide (or facilitate the provision of) the remotely ordered lottery ticket 2501; to provide an authorization 2531 to receive the remotely ordered lottery ticket 2501, e.g., to a remotely ordered lottery ticket provider's processing device 2545 or to a purchaser's device 2532 (which could be provided to user device 2515 or to another device of the purchaser 2516), wherein when the authorization 2531 is provided to the remotely ordered lottery ticket provider's processing device 2545, the remotely ordered lottery ticket provider 2540 will provide the remotely ordered lottery ticket 2501 to the purchaser to complete the instant purchase transaction, and wherein when the authorization 2531 is provided to the purchaser's device 2532, the authorization must be presented at the physical point of sale 2550 for verification prior to the remotely ordered lottery ticket provider 2540 completing activation of the remotely ordered lottery ticket 2501 and then providing the remotely ordered lottery ticket 2501 in an activated state to the purchaser 2516 at the physical point of sale 2550 to complete the instant purchase transaction; to provide a virtual draw-type pre-selected lottery ticket 102 comprises selecting the virtual draw-type pre-selected lottery ticket 102 from an electronically stored inventory of virtual draw-type pre-selected lottery tickets 2565 and communicating and/or transmitting an activated virtual draw-type pre-selected lottery ticket 102 to a purchaser's device 2532 (which could be the user device 2515 (or to another device of the purchaser 2516)), when said device is at the physical point of sale 2550, as provision of a virtual draw-type pre-selected lottery ticket 102 is further described herein, wherein the fulfillment computer device 2520 provides the activated virtual draw-type pre-selected lottery ticket 102 to the purchaser 2516 upon verification, by a transaction completion authorization component 2528, that payment for the virtual draw-type pre-selected lottery ticket 102 has been received by the remotely ordered lottery ticket provider 2540 at the physical point of sale 2550; to facilitate the provision of a virtual draw-type pre-selected lottery ticket 102 comprises selecting the virtual draw-type pre-selected lottery ticket 102 from an electronically stored inventory of virtual draw-type pre-selected lottery tickets 2565 by the fulfillment computer device 2520, communicating and/or transmitting the virtual draw-type pre-selected lottery ticket 102 to the remotely ordered lottery ticket provider's processing device 2545, wherein, upon receipt of the authorization 2531, the remotely ordered lottery ticket provider's processing device 2545 has the virtual draw-type pre-selected lottery ticket 102 activated and communicates and/or transmits the activated virtual draw-type pre-selected lottery ticket 102 to a purchaser's device 2532 (which could be the user device 2515 (or to another device of the purchaser 2516)) as provision of a virtual draw-type pre-selected lottery ticket 102 is further described herein; to facilitate the provision of a draw-type pre-printed lottery ticket 100 comprises providing the authorization 2531 to the remotely ordered lottery ticket provider 2540 so that the remotely ordered lottery ticket provider 2540 may have the draw-type pre-printed lottery ticket 100 activated and provide the activated draw-type pre-printed lottery ticket 100 to the purchaser 2516 at the physical point of sale 2550, wherein the activated draw-type pre-printed lottery ticket 100 is selected by the remotely ordered lottery ticket provider 2540 from an inventory of draw-type pre-printed lottery tickets 2560.

FIG. 26 is a flowchart depicting certain steps in an embodiment of a remotely ordered lottery ticket 2501 purchase transaction utilizing the remote lottery ticket purchasing system 2510 as depicted in FIG. 25A. As illustrated in FIG. 26, at Step 2610, the fulfillment computer device 2520 is configured to receive a request 2521 for a remotely ordered lottery ticket 2501 (directly from a user device 2515 or from a remotely ordered lottery ticket provider 2540 (e.g., via a remotely ordered lottery ticket provider's device 2545)). The a remote lottery ticket purchasing system 2510 contemplates that, and comprises, the fulfillment computer device 2520 is configured to integrate with remotely ordered lottery ticket provider's online ordering functionality, e.g., an online ordering portal 2547, such that upon the receipt of a request 2521 directly from a user device 2515, the fulfillment computer device 2520 communicates said request 2521 to the remotely ordered lottery ticket provider 2540. In an embodiment, the request 2521 may only comprise a request for one or more remotely ordered lottery tickets 2501. In an embodiment the request 2521 may comprise other products and/or services provided by the remotely ordered lottery ticket provider 2540. In an embodiment, the request 2521 may only comprise a request for one or more remotely ordered lottery tickets 2501 but may be associated with other requests for products and/or services provided by the remotely ordered lottery ticket provider 2540.

At Step 2620, the fulfillment computer device 2520 determines whether the request 2521 is a proper request 2522. To determine whether the request is a proper request, the location confirmation component 2525 of the fulfillment computer device 2520 compares the geographic location of the user device 2515 making the request 2521 (geographic location information of the user device 2515 is provided as part of the request 2521) with the approved geographic locations for the sale of the remotely ordered lottery ticket 2501. The fulfillment computer device 2520 accesses at least one database 2570 which includes approved geographic locations for lottery tickets available for sale via the remote lottery ticket purchasing system 2510. The at least one database 2570 which includes approved geographic locations for lottery tickets available for sale via the remote lottery ticket purchasing system 2510 may be a database maintained solely by the remote lottery ticket purchasing system 2510 or may be a database maintained by a third party, e.g., a state lottery commission, which is accessible by the fulfillment computer device 2520. If the request 2521 is determined to be a proper request 2522, the process continues to Step 2630. If the request 2521 is determined to be improper, a message 2523 is communicated to the user device 2515 that the requested remotely ordered lottery ticket 2501 is not available for purchase based on the location of the user device 2015.

At Step 2630, the fulfillment computer device 2520 communicates to the remotely ordered lottery ticket provider 2540, e.g., to the remotely ordered lottery ticket provider's processing device 2545, the request 2521 and/or that the request is valid, i.e. a proper request 2522.

At Step 2640, the fulfillment computer device 2520 receives purchase verification 2530 for the remotely ordered lottery ticket 2501, wherein purchase verification 2530 comprises the remotely ordered lottery ticket provider 2540 has received proper payment for the remotely ordered lottery ticket 2501 at the physical point of sale 2550 of the remotely ordered lottery ticket 2501, e.g., the physical point of sale 2550 being real property legally used by the remotely ordered lottery ticket provider 2540 to complete purchase transactions.

At Step 2650, the fulfillment computer device 2520 provides an authorization 2531 to receive the remotely ordered lottery ticket 2501. In an embodiment, authorization 2531 is provided to the remotely ordered lottery ticket provider's processing device 2545 which facilitates the remotely ordered lottery ticket provider's 2540 completing activation of the remotely ordered lottery ticket 2501 and the provision of the remotely ordered lottery ticket 2501 in an activated state to the purchaser 2516 to complete the instant purchase transaction, e.g., the remotely ordered lottery ticket provider 2540 verifies, at the physical point of sale 2550, that the purchaser 2516 is authorized to receive the remotely ordered lottery ticket 2501 (via e.g., order number confirmation, purchaser identity confirmation, or combinations thereof).

In an embodiment, authorization 2531 is provided to the purchaser's device 2532. When the authorization 2531 is provided to the purchaser's device 2532, the authorization 2531 must be presented at the physical point of sale 2550 for verification prior to the remotely ordered lottery ticket provider 2540 completing activation of the remotely ordered lottery ticket 2501 and then providing the remotely ordered lottery ticket 2501 in an activated state to the purchaser 2516.

At Step 2660, the remotely ordered lottery ticket 2501 is provided to the purchaser 2516. In an embodiment, the remotely ordered lottery ticket provider's processing device 2545 has received the authorization 2531 from the fulfillment computer device 2520 and selects a virtual draw-type pre-selected lottery ticket 102 from an electronically stored inventory of virtual draw-type pre-selected lottery tickets 2565 to fulfill the request 2531. The selected virtual draw-type pre-selected lottery ticket 102 is activated. In an embodiment, activation of the virtual draw-type pre-selected lottery ticket 102 is performed and/or accomplished via any of the methods further described herein. The activated virtual draw-type pre-selected lottery ticket 102 is communicated and/or transmitted the purchaser 2516 (e.g., to purchaser's device 2532 at the physical point of sale 2550 or to user device 2515 remote from the physical point of sale 2550) upon verification that the purchaser 2516 is authorized to receive the activated virtual draw-type pre-selected lottery ticket 102 (via e.g., order number confirmation, purchaser identity confirmation, or combinations thereof) to complete the instant purchase transaction, as provision of a virtual draw-type pre-selected lottery ticket 102 is further described herein. In an embodiment, the remotely ordered lottery ticket provider's processing device 2545 has received the authorization 2531 from purchaser's device 2532 and selects a virtual draw-type pre-selected lottery ticket 102 from an electronically stored inventory of virtual draw-type pre-selected lottery tickets 2565 to fulfill the request 2531. The selected virtual draw-type pre-selected lottery ticket 102 is activated. In an embodiment, activation of the virtual draw-type pre-selected lottery ticket 102 is performed and/or accomplished via any of the methods further described herein. The activated virtual draw-type pre-selected lottery ticket 102 is communicated and/or transmitted the purchaser 2516 (e.g., to purchaser's device 2532 at the physical point of sale 2550 or to user device 2515 remote from the physical point of sale 2550) to complete the instant purchase transaction, as provision of a virtual draw-type pre-selected lottery ticket 102 is further described herein. In an embodiment, the remotely ordered lottery ticket provider 2540 has received the authorization 2531 and selects a draw-type pre-printed lottery ticket 100 from an inventory of draw-type pre-printed lottery tickets 2560 to fulfill the request 2531. In an embodiment, activation of the draw-type pre-printed lottery ticket 100 is performed and/or accomplished via any of the methods further described herein. The activated draw-type pre-printed lottery ticket 100 is then provided to the purchaser 2516 at the physical point of sale 2550 upon purchaser identification verification (i.e., if authorization 2531 was received from the fulfillment computer device 2520).

FIG. 27 is a flowchart depicting certain steps in an embodiment of a remotely ordered lottery ticket 2501 purchase transaction utilizing the remote lottery ticket purchasing system 2510 as depicted in FIG. 25B. As illustrated in FIG. 27, at Step 2710, the fulfillment computer device 2520 is configured to receive a request 2521 for a remotely ordered lottery ticket 2501 (directly from a user device 2515 or from a remotely ordered lottery ticket provider 2540 (e.g., via a remotely ordered lottery ticket provider's device 2545)). The a remote lottery ticket purchasing system 2510 contemplates that, and comprises, the fulfillment computer device 2520 is configured to integrate with remotely ordered lottery ticket provider's online ordering functionality, e.g., an online ordering portal 2547, such that upon the receipt of a request 2521 directly from a user device 2515, the fulfillment computer device 2520 communicates said request 2521 to the remotely ordered lottery ticket provider 2540. In an embodiment, the request 2521 may only comprise a request for one or more remotely ordered lottery tickets 2501. In an embodiment the request 2521 may comprise other products and/or services provided by the remotely ordered lottery ticket provider 2540. In an embodiment, the request 2521 may only comprise a request for one or more remotely ordered lottery tickets 2501 but may be associated with other requests for products and/or services provided by the remotely ordered lottery ticket provider 2540.

At Step 2720, the fulfillment computer device 2520 determines whether the request 2521 is a proper request 2522. To determine whether the request is a proper request, the location confirmation component 2525 of the fulfillment computer device 2520 compares the geographic location of the user device 2515 making the request 2521 (geographic location information of the user device 2515 is provided as part of the request 2521) with the approved geographic locations for the sale of the remotely ordered lottery ticket 2501. The fulfillment computer device 2520 accesses at least one database 2570 which includes approved geographic locations for lottery tickets available for sale via the remote lottery ticket purchasing system 2510. The at least one database 2570 which includes approved geographic locations for lottery tickets available for sale via the remote lottery ticket purchasing system 2510 may be a database maintained solely by the remote lottery ticket purchasing system 2510 or may be a database maintained by a third party, e.g., a state lottery commission, which is accessible by the fulfillment computer device 2520. If the request 2521 is determined to be a proper request 2522, the process continues to Step 2630. If the request 2521 is determined to be improper, a message 2523 is communicated to the user device 2515 that the requested remotely ordered lottery ticket 2501 is not available for purchase based on the location of the user device 2015.

At Step 2730, the fulfillment computer device 2520 communicates to the remotely ordered lottery ticket provider 2540, e.g., to the remotely ordered lottery ticket provider's processing device 2545, the request 2521 and/or that the request is valid, i.e. a proper request 2522.

At Step 2740, the fulfillment computer device 2520 receives purchase verification 2530 for the remotely ordered lottery ticket 2501, wherein purchase verification 2530 comprises the remotely ordered lottery ticket provider 2540 has received proper payment for the remotely ordered lottery ticket 2501 at the physical point of sale 2550 of the remotely ordered lottery ticket 2501, e.g., the physical point of sale 2550 being real property legally used by the remotely ordered lottery ticket provider 2540 to complete purchase transactions.

At Step 2750, the fulfillment computer device 2520 provides an authorization 2531 to receive the remotely ordered lottery ticket 2501. In an embodiment, authorization 2531 is provided to the remotely ordered lottery ticket provider's processing device 2545 which facilitates the remotely ordered lottery ticket provider's 2540 completing activation of the remotely ordered lottery ticket 2501 and the provision of the remotely ordered lottery ticket 2501 in an activated state to the purchaser 2516 to complete the instant purchase transaction, e.g., the remotely ordered lottery ticket provider 2540 verifies, at the physical point of sale 2550, that the purchaser 2516 is authorized to receive the remotely ordered lottery ticket 2501 (via e.g., order number confirmation, purchaser identity confirmation, or combinations thereof).

In an embodiment, authorization 2531 is provided to the purchaser's device 2532. When the authorization 2531 is provided to the purchaser's device 2532, the authorization 2531 must be presented at the physical point of sale 2550 for verification prior to the remotely ordered lottery ticket provider 2540 completing activation of the remotely ordered lottery ticket 2501 and then providing the remotely ordered lottery ticket 2501 in an activated state to the purchaser 2516 to complete the instant purchase transaction.

At Step 2760, if remotely ordered lottery ticket 2501 is a virtual draw-type pre-selected lottery ticket 102, the remotely ordered lottery ticket provider's processing device 2545 requests that the fulfillment computer device 2520 select a virtual draw-type pre-selected lottery ticket 102 from an electronically stored inventory of virtual draw-type pre-selected lottery tickets 2565 to fulfill the request 2531. In an embodiment, the virtual draw-type pre-selected lottery ticket 102 is communicated and/or transmitted from the fulfillment computer device 2520 to the remotely ordered lottery ticket provider's processing device 2545. The selected virtual draw-type pre-selected lottery ticket 102 is activated. In an embodiment, activation of the virtual draw-type pre-selected lottery ticket 102 is performed and/or accomplished via any of the methods further described herein. In an embodiment, the virtual draw-type pre-selected lottery ticket 102 is held by the fulfillment computer device

2520 for communication and/or transmission from the fulfillment computer device 2520 to purchaser's device 2532 (which could be the user device 2515 (or to another device of the purchaser 2516)) upon fulfillment computer device's 2520 receipt of purchaser identification verification from the remotely ordered lottery ticket provider 2540. The selected virtual draw-type pre-selected lottery ticket 102 which is held by the fulfillment computer device 2520 is activated. In an embodiment, activation of the virtual draw-type pre-selected lottery ticket 102 is performed and/or accomplished via any of the methods further described herein. In an embodiment, the remotely ordered lottery ticket provider 2540 selects a draw-type pre-printed lottery ticket 100 from an inventory of draw-type pre-printed lottery tickets 2560 to fulfill the request 2531. The selected the draw-type pre-printed lottery ticket 100 is activated. In an embodiment, activation of the draw-type pre-printed lottery ticket 100 is performed and/or accomplished via any of the methods further described herein.

At Step 2770, the remotely ordered lottery ticket 2501 is provided to the purchaser 2516. In an embodiment, the remotely ordered lottery ticket provider's processing device 2545 has received the authorization 2531 and communicates and/or transmits the activated virtual draw-type pre-selected lottery ticket 102 to purchaser 2516 (e.g., to purchaser's device 2532 at the physical point of sale 2550 or to user device 2515 remote from the physical point of sale 2550) to complete the instant purchase transaction, as provision of a virtual draw-type pre-selected lottery ticket 102 is further described herein. In an embodiment, the fulfillment computer device 2520 communicates and/or transmits the activated virtual draw-type pre-selected lottery ticket 102 to purchaser 2516 (e.g., to purchaser's device 2532 at the physical point of sale 2550 or to user device 2515 remote from the physical point of sale 2550) to complete the instant purchase transaction, upon fulfillment computer device's 2520 receipt of purchaser identification verification from the remotely ordered lottery ticket provider 2540. In an embodiment, the remotely ordered lottery ticket provider 2540 has received the authorization 2531 from the purchaser 2516, has selected a draw-type pre-printed lottery ticket 100 from an inventory of draw-type pre-printed lottery tickets 2560 to fulfill the request 2531, and has activated the draw-type pre-printed lottery ticket 100. The activated draw-type pre-printed lottery ticket 100 is then provided to the purchaser 2516 at the physical point of sale 2550.

FIG. 28 is a flowchart depicting certain steps in an embodiment of a remotely ordered lottery ticket 2501 purchase transaction utilizing the remote lottery ticket purchasing system 2510 as depicted in FIG. 25C. As illustrated in FIG. 28, at Step 2810, the fulfillment computer device 2520 is configured to receive a request 2521 for a remotely ordered lottery ticket 2501 (directly from a user device 2515 or from a remotely ordered lottery ticket provider 2540 (e.g., via a remotely ordered lottery ticket provider's device 2545)). The a remote lottery ticket purchasing system 2510 contemplates that, and comprises, the fulfillment computer device 2520 is configured to integrate with remotely ordered lottery ticket provider's online ordering functionality, e.g., an online ordering portal 2547, such that upon the receipt of a request 2521 directly from a user device 2515, the fulfillment computer device 2520 communicates said request 2521 to the remotely ordered lottery ticket provider 2540. In an embodiment, the request 2521 may only comprise a request for one or more remotely ordered lottery tickets 2501. In an embodiment the request 2521 may comprise other products and/or services provided by the remotely ordered lottery ticket provider 2540. In an embodiment, the request 2521 may only comprise a request for one or more remotely ordered lottery tickets 2501 but may be associated with other requests for products and/or services provided by the remotely ordered lottery ticket provider 2540.

At Step 2820, the fulfillment computer device 2520 determines whether the request 2521 is a proper request 2522. To determine whether the request is a proper request, the location confirmation component 2525 of the fulfillment computer device 2520 compares the geographic location of the user device 2515 making the request 2521 (geographic location information of the user device 2515 is provided as part of the request 2521) with the approved geographic locations for the sale of the remotely ordered lottery ticket 2501. The fulfillment computer device 2520 accesses at least one database 2570 which includes approved geographic locations for lottery tickets available for sale via the remote lottery ticket purchasing system 2510. The at least one database 2570 which includes approved geographic locations for lottery tickets available for sale via the remote lottery ticket purchasing system 2510 may be a database maintained solely by the remote lottery ticket purchasing system 2510 or may be a database maintained by a third party, e.g., a state lottery commission, which is accessible by the fulfillment computer device 2520. If the request 2521 is determined to be a proper request 2522, the process continues to Step 2630. If the request 2521 is determined to be improper, a message 2523 is communicated to the user device 2515 that the requested remotely ordered lottery ticket 2501 is not available for purchase based on the location of the user device 2015.

At Step 2830, the fulfillment computer device 2520 communicates to the remotely ordered lottery ticket provider 2540, e.g., to the remotely ordered lottery ticket provider's processing device 2545, the request 2521 and/or that the request is valid, i.e. a proper request 2522.

At Step 2840, the fulfillment computer device 2520 receives purchase verification 2530 for the remotely ordered lottery ticket 2501, wherein purchase verification 2530 comprises the remotely ordered lottery ticket provider 2540 has received proper payment for the remotely ordered lottery ticket 2501 at the physical point of sale 2550 of the remotely ordered lottery ticket 2501, e.g., the physical point of sale 2550 being real property legally used by the remotely ordered lottery ticket provider 2540 to complete purchase transactions.

At Step 2850, the fulfillment computer device 2520 provides an authorization 2531 to receive the remotely ordered lottery ticket 2501. In an embodiment, authorization 2531 is provided to the remotely ordered lottery ticket provider's processing device 2545 which facilitates the remotely ordered lottery ticket provider's 2540 completing activation of the remotely ordered lottery ticket 2501 and the provision of the remotely ordered lottery ticket 2501 in an activated state to the purchaser 2516 to complete the instant purchase transaction, e.g., the remotely ordered lottery ticket provider 2540 verifies, at the physical point of sale 2550, that the purchaser 2516 is authorized to receive the remotely ordered lottery ticket 2501 (via e.g., order number confirmation, purchaser identity confirmation, or combinations thereof). In an embodiment, authorization 2531 is provided to the purchaser's device 2532. When the authorization 2531 is provided to the purchaser's device 2532, the authorization 2531 must be presented at the physical point of sale 2550 for verification prior to the remotely ordered lottery ticket provider 2540 completing activation of the remotely ordered lottery ticket 2501 and then providing the remotely ordered lottery ticket 2501 in an activated state to the purchaser 2516 to complete the instant purchase transaction.

At Step 2860, in an embodiment, if remotely ordered lottery ticket 2501 is a virtual draw-type pre-selected lottery ticket 102, the remotely ordered lottery ticket provider's processing device 2545 requests that the fulfillment computer device 2520 select a virtual draw-type pre-selected lottery ticket 102 from an electronically stored inventory of virtual draw-type pre-selected lottery tickets 2565 to fulfill the request 2531. In an embodiment, the virtual draw-type pre-selected lottery ticket 102 is communicated and/or transmitted from the fulfillment computer device 2520 to the remotely ordered lottery ticket provider's processing device 2545. The selected virtual draw-type pre-selected lottery ticket 102 is activated. In an embodiment, activation of the virtual draw-type pre-selected lottery ticket 102 is performed and/or accomplished via any of the methods further described herein. In an embodiment, the virtual draw-type pre-selected lottery ticket 102 is held by the fulfillment computer device 2520 for communication and/or transmission from the fulfillment computer device 2520 to purchaser's device 2532 (which could be the user device 2515 (or to another device of the purchaser 2516)) upon fulfillment computer device's 2520 receipt of purchaser identification verification from the remotely ordered lottery ticket provider 2540. The selected virtual draw-type pre-selected lottery ticket 102 which is held by the fulfillment computer device 2520 is activated. In an embodiment, activation of the virtual draw-type pre-selected lottery ticket 102 is performed and/or accomplished via any of the methods further described herein. In an embodiment, if remotely ordered lottery ticket 2501 is a virtual draw-type pre-selected lottery ticket 102 and the remotely ordered lottery ticket provider's processing device 2545 has received the authorization 2531, the remotely ordered lottery ticket provider's processing device 2545 selects a virtual draw-type pre-selected lottery ticket 102 from an electronically stored inventory of virtual draw-type pre-selected lottery tickets 2565 to fulfill the request 2531. The selected virtual draw-type pre-selected lottery ticket 102 is activated. In an embodiment, activation of the virtual draw-type pre-selected lottery ticket 102 is performed and/or accomplished via any of the methods further described herein. In an embodiment, the remotely ordered lottery ticket provider 2540 selects a draw-type pre-printed lottery ticket 100 from an inventory of draw-type pre-printed lottery tickets 2560 to fulfill the request 2531. The selected the draw-type pre-printed lottery ticket 100 is activated. In an embodiment, activation of the draw-type pre-printed lottery ticket 100 is performed and/or accomplished via any of the methods further described herein.

At Step 2870, the remotely ordered lottery ticket 2501 is provided to the purchaser 2516. In an embodiment, the remotely ordered lottery ticket provider's processing device 2545 has received the authorization 2531 and communicates and/or transmits the activated virtual draw-type pre-selected lottery ticket 102 to purchaser 2516 (e.g., to purchaser's device 2532 at the physical point of sale 2550 or to user device 2515 remote from the physical point of sale 2550) to complete the instant purchase transaction, as provision of a virtual draw-type pre-selected lottery ticket 102 is further described herein. In an embodiment, by the fulfillment computer device 2520 communicates and/or transmits the activated virtual draw-type pre-selected lottery ticket 102 to purchaser 2516 (e.g., to purchaser's device 2532 at the physical point of sale 2550 or to user device 2515 remote from the physical point of sale 2550) to complete the instant purchase transaction, upon fulfillment computer device's

2520 receipt of purchaser identification verification from the remotely ordered lottery ticket provider 2540. In an embodiment, the remotely ordered lottery ticket provider 2540 has received the authorization 2531 from the fulfillment computer device 2520, has selected a draw-type pre-printed lottery ticket 100 from an inventory of draw-type pre-printed lottery tickets 2560 to fulfill the request 2531, and has activated the draw-type pre-printed lottery ticket 100. The activated draw-type pre-printed lottery ticket 100 is then provided to the purchaser 2516 at the physical point of sale 2550 upon purchaser identification verification. In an embodiment, the remotely ordered lottery ticket provider 2540 has received the authorization 2531 from the purchaser 2516, has selected a draw-type pre-printed lottery ticket 100 from an inventory of draw-type pre-printed lottery tickets 2560 to fulfill the request 2531, and has activated the draw-type pre-printed lottery ticket 100. The activated draw-type pre-printed lottery ticket 100 is then provided to the purchaser 2516 at the physical point of sale 2550.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed. The following numbered entries represent a non-exhaustive collection of exemplary embodiments of the instantly disclosed subject matter.

A first embodiment is a system for completing a transaction request via receiving payment at a point of sale comprising: a lottery ticket provider, wherein the lottery ticket provider is remote from an originating location of the transaction request and wherein the lottery ticket provider comprises: a processing device; a user device; a fulfillment computer device; a lottery ticket; and a lottery ticket approved sales location database.

A second embodiment is the system of the first embodiment, wherein the lottery ticket provider is configured to accept the transaction request from the user device.

A third embodiment is the system of the first embodiment or the second embodiment, wherein the user device is remote from the lottery ticket provider.

A fourth embodiment is any one of the systems of the first through third embodiments, wherein the lottery ticket provider further comprises the point of sale.

A fifth embodiment is any one of the systems of the first through fourth embodiments, wherein the point of sale is located at a physical location.

A sixth embodiment is any one of the systems of the first through fifth embodiments, wherein the user device is located at the physical location.

A seventh embodiment is any one of the systems of the first through sixth embodiments, wherein the fulfillment computer device comprises a location determination component.

An eighth embodiment is any one of the systems of the first through seventh embodiments, wherein the fulfillment computer device comprises a transaction completion authorization component.

A ninth embodiment any one of the systems of the first through eighth embodiments, wherein the lottery ticket is an instant-win-type lottery ticket.

A tenth embodiment any one of the systems of the first through ninth embodiments, wherein the lottery ticket is a draw-type pre-printed lottery ticket.

An eleventh embodiment is any one of the systems of the first through tenth embodiments, wherein the lottery ticket is a virtual draw-type pre-selected lottery ticket.

A twelfth embodiment is any one of the systems of the first through eleventh embodiments, wherein the draw-type pre-printed lottery ticket is maintained in an inventory comprising a plurality of draw-type pre-printed lottery tickets.

A thirteenth embodiment is any one of the systems of the first through twelfth embodiments, wherein the virtual draw-type pre-selected lottery ticket is maintained in an electronically stored inventory comprising a plurality of virtual draw-type pre-selected lottery tickets.

A fourteenth embodiment is any one of the systems of the first through thirteenth embodiments, wherein the user device comprises comprise a personal computer, a tablet, a smartphone, a cloud computing system, a server, or combinations thereof.

A fifteenth embodiment is any one of the systems of the first through fourteenth embodiments, wherein the lottery ticket provider is separated from the originating location of the transaction request by a distance in the range of 0.1 m to 10 m.

A sixteenth embodiment is any one of the systems of the first through fourteenth embodiments, wherein the lottery ticket provider is separated from the originating location of the transaction request by a distance in the range of 10 m to 100 m.

A seventeenth embodiment is any one of the systems of the first through fourteenth embodiments, wherein the lottery ticket provider is separated from the originating location of the transaction request by a distance in the range of 100 m to 1,000 m.

An eighteenth embodiment is any one of the systems of the first through fourteenth embodiments, wherein the lottery ticket provider is separated from the originating location of the transaction request by a distance in the range of 1,000 m to 10,000 m.

A nineteenth embodiment is any one of the systems of the first through fourteenth embodiments, wherein the lottery ticket provider is separated from the originating location of the transaction request by a distance in the range of 10,000 m to 100,000 m.

A twentieth embodiment is any one of the systems of the first through fourteenth embodiments, wherein the lottery ticket provider is separated from the originating location of the transaction request by a distance in the range of 100,000 m to 1,000,000 m.

A twenty-first embodiment is any one of the systems of the first through fourteenth embodiments, wherein the lottery ticket provider is separated from the originating location of the transaction request by a distance in the range of 1,000,000 m to 10,000,000 m.

A twenty-second embodiment is any one of the systems of the first through fourteenth embodiments, wherein the lottery ticket provider is separated from the originating location of the transaction request by a distance in the range of 10,000,000 m to 20,000,000 m.

A twenty-third embodiment is a method for completing a transaction request via receiving payment at a point of sale comprising: receiving, by a fulfillment computer device, the transaction request, wherein the transaction request originates from a location remote to the fulfillment computer; determining, by the fulfillment computer device, whether a lottery ticket associated with the transaction request may be provided to a purchaser; and sending, by the fulfillment computer device, an authorization for the activation of the lottery ticket associated with the transaction request.

A twenty-fourth embodiment is the method of the twenty-third embodiment further comprising: selecting, by the fulfillment computer device, a lottery ticket to provide to the purchaser.

A twenty-fifth embodiment is the method of the twenty-third embodiment of the twenty-fourth embodiment further comprising: sending, by the fulfillment computer device, an authorization to a lottery ticket provider to provide the lottery ticket to the purchaser.

A twenty-sixth embodiment is any one of the twenty-third through the twenty-fifth embodiments further comprising: providing, by the fulfillment computer device, the lottery ticket to the purchaser.

A twenty-seventh embodiment is any one of the twenty-third through the twenty-sixth embodiments further comprising: comparing, by the fulfillment computer device, approved locations for a sale of the lottery ticket to the location remote to the fulfillment computer, to determine whether the lottery ticket may be provided to the purchaser.

A twenty-eighth embodiment is any one of the twenty-third through the twenty-seventh embodiments further comprising: receiving, from a lottery ticket provider, a purchase verification for the lottery ticket.

What is claimed is:

1. A system for completing a transaction request via receiving payment at a point of sale comprising:
   - a lottery ticket provider, wherein the lottery ticket provider is remote from an originating location of the transaction request
   - a processing device;

- a user device;
   - a fulfillment computer device;
   - a lottery ticket;
   - a lottery ticket approved sales location database; and
   - a user-configurable subscription lottery (UCSL) device, wherein the UCSL device is configured to allow entry into one or more lotteries upon the fulfillment of one or more user-defined criteria, and wherein the lottery ticket is provided to a UCSL device user upon fulfillment of the one or more user-defined criteria.

2. The system of claim 1, wherein the lottery ticket provider is configured to accept the transaction request from the user device.

3. The system of claim 2, wherein the user device is remote from the lottery ticket provider.

4. The system of claim 3, wherein the lottery ticket provider further comprises the point of sale.

5. The system of claim 4, wherein the point of sale is located at a physical location.

6. The system of claim 5, wherein the user device is located at the physical location.

7. The system of claim 1, wherein the fulfillment computer device comprises a location determination component.

8. The system of claim 7, wherein the fulfillment computer device comprises a transaction completion authorization component.

9. The system of claim 1, wherein the lottery ticket is an instant-win-type lottery ticket.

10. The system of claim 1, wherein the lottery ticket is a draw-type pre-printed lottery ticket.

11. The system of claim 1, wherein the lottery ticket is a virtual draw-type pre-selected lottery ticket.

12. The system of claim 10, wherein the draw-type pre-printed lottery ticket is maintained in an inventory comprising a plurality of draw-type pre-printed lottery tickets.

13. The system of claim 11, wherein the virtual draw-type pre-selected lottery ticket is maintained in an electronically stored inventory comprising a plurality of virtual draw-type pre-selected lottery tickets.

14. The system of claim 1, wherein the user device comprises comprise a personal computer, a tablet, a smartphone, a cloud computing system, a server, or combinations thereof.

\* \* \* \* \*